(12) United States Patent
Murakami et al.

(10) Patent No.: US 7,471,360 B2
(45) Date of Patent: Dec. 30, 2008

(54) LIQUID CRYSTAL DISPLAY DEVICE

(75) Inventors: Takashi Murakami, Hachioji (JP); Hiroki Umeda, Hino (JP)

(73) Assignee: Konica Minolta Opto, Inc., Tokyo (JP)

( * ) Notice: Subject to any disclaimer, the term of this patent is extended or adjusted under 35 U.S.C. 154(b) by 309 days.

(21) Appl. No.: 11/508,867

(22) Filed: Aug. 24, 2006

(65) Prior Publication Data

US 2007/0046870 A1    Mar. 1, 2007

(30) Foreign Application Priority Data

Aug. 29, 2005  (JP) .............................. 2005-247309

(51) Int. Cl.
*G02F 1/1335* (2006.01)
*C09K 19/00* (2006.01)

(52) U.S. Cl. ..................... 349/117; 349/96; 428/1.31; 428/1.33

(58) Field of Classification Search ................. 349/117, 349/87, 94, 96, 102, 103, 119, 126, 194, 349/191, 192; 428/1.31, 1.33, 1.5, 1.54
See application file for complete search history.

(56) References Cited

U.S. PATENT DOCUMENTS

| | | | |
|---|---|---|---|
| 7,318,951 B2 * | 1/2008 | Nimura et al. | 428/1.1 |
| 7,410,679 B2 * | 8/2008 | Matsufuji | 428/1.3 |
| 2005/0106334 A1 * | 5/2005 | Kubo et al. | 428/1.31 |
| 2005/0243245 A1 * | 11/2005 | Taguchi et al. | 349/96 |
| 2007/0046870 A1 * | 3/2007 | Murakami et al. | 349/117 |

* cited by examiner

*Primary Examiner*—Brian M Healy
(74) *Attorney, Agent, or Firm*—Finnegan, Henderson, Farabow, Garrett & Dunner, L.L.P.

(57) ABSTRACT

A liquid crystal display device comprising a liquid crystal display in which polarizing plates A and B are provided so as to be held between a vertical orientation mode crystal cell and the corresponding liquid crystal cell, wherein the polarizing layer A comprises the polarizing plate protective films A1 and A2 and the polarizing layer B comprises the polarizing plate protective films B1 and B2, and at least one of the polarizing plate protective films A2 and B2 that are disposed at the liquid crystal cell side is a cellulose ester film Y that simultaneously satisfies the condition that retardation value Ro is 0 to 10 nm and Rt is −20 to 20 nm shown by the equation below, and at least one of the polarizing plate protective films A2 and B2 is the optical compensation film W which has an optically anisotropic layer.

9 Claims, 2 Drawing Sheets

FIG. 2 (a-1)
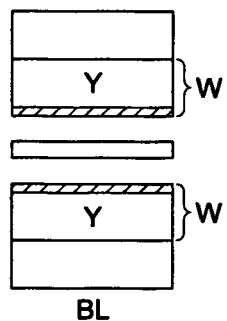
FIG. 2 (a-2)
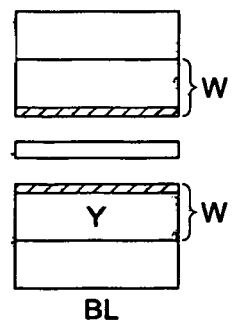
FIG. 2 (a-3)
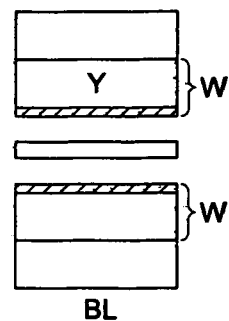
FIG. 2 (b-1)
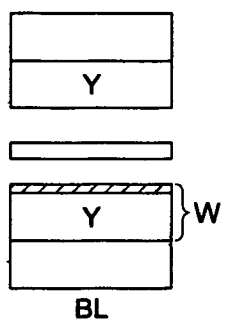
FIG. 2 (b-2)
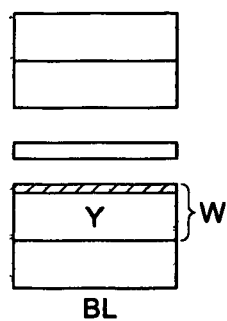
FIG. 2 (b-3)
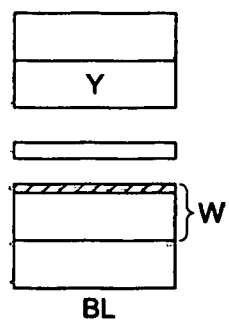
FIG. 2 (c-1)
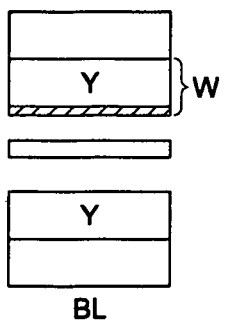
FIG. 2 (c-2)
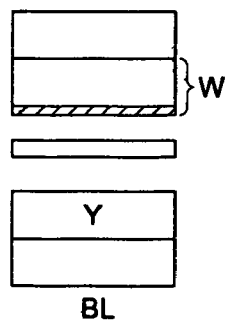
FIG. 2 (c-3)
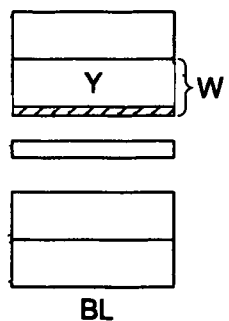

LIQUID CRYSTAL DISPLAY DEVICE

This application is based on Japanese Patent Application No. 2005-247309 filed on Aug. 29, 2005, in Japanese Patent Office, the entire content of which is hereby incorporated by reference.

BACKGROUND OF THE INVENTION

This invention relates to a liquid crystal display device and relates to a liquid crystal display device in which there is little color change even if there is environmental variation, there is little color changes even when the angle at the time of viewing changes, contrast is high, and there is little variation in visibility due to stretch spots.

There have been various requirements for the polarizing plate protective film used for the polarizing plate as a result of high performance and high definition liquid crystal devices. Of course, it is required, for example, to be durable in the sense that the properties of the polarizing plate protective films do not deteriorate with extended use, and to have excellent uniformity so that the properties do change under harsh environmental conditions.

An optical compensation film is used in order to expand the viewing angle of the liquid crystal display device, and examples of the materials used therefore include norbornene, polycarbonate, polysulfon, polyether sulfon, amorphous polyolefin and the like. In order to use these polymerized optical compensation films in combination with polarizing plates, they are generally adhered, and there is the disadvantage that there is a large number of laminated films and the cost is high. In addition to the fact that the manufacturing process is complex, there is a problem in that defective products are generated because at the time of adhesion, bubbles or foreign material are introduced and this causes wrinkling or the like.

To solve these problems, it is known that the optical compensation film which has cellulose resin as the main material can be adhered to the polarizing plate instead of the polarizing plate protective film, and as a result the manufacturing process for the polarizing film is shortened and production efficiency is excellent (See Patent Documents 1-5) for example.

In particular, in Patent Document 6, technology is disclosed in which a TAC film that has been manufactured by liquid casting is used, and a polymer layer is coated onto a film support and a desired phase difference is imparted by stretching the support at a high temperature and then the polarizing plate is adhered. However, although this technology has various excellent features as an optical compensation film, when the color changes due to environmental variation and visibility due to stretch spots are considered, it is clear that when the screen brightness is adjusted in accordance with the surrounding brightness at the time of image viewing in particular, there are changes in visibility such as contrast and color shifts.

[Patent Document 1] Japanese Patent Application Laid-Open No. 2002-71957 Publication

[Patent Document 2] Japanese Patent Application Laid-Open No. 2002-62430 Publication

[Patent Document 3] Japanese Patent Application Laid-Open No. 2001-249223 Publication

[Patent Document 4] Japanese Patent Application Laid-Open No. 2002-82226 Publication

[Patent Document 5] Japanese Patent Application Laid-Open No. 2002-98832 Publication

[Patent Document 6] Japanese Patent Application Laid-Open No. 2004-4474 Publication

SUMMARY OF THE INVENTION

Thus the object of this invention relates to a liquid crystal display device in which there is little color change even if there is environmental variation, there is little color changes even when the angle at the time of viewing changes, contrast is high, and there is little variation in visibility due to stretch spots.

This invention achieves the above objects using the following configuration.

(1) A liquid crystal display device comprising a liquid crystal display in which polarizing plates A and B are provided so as to be held between a vertical orientation mode crystal cell and the corresponding liquid crystal cell, wherein the polarizing layer A comprises the polarizing plate protective films A1 and A2 and the polarizing layer B comprises the polarizing plate protective films B1 and B2, and at least one of the polarizing plate protective films A2 and B2 that are disposed at the liquid crystal cell side is a cellulose ester film Y that simultaneously satisfies the condition that retardation value Ro is 0 to 10 nm and Rt is −20 to 20 nm shown by the equation below, and at least one of the polarizing plate protective films A2 and B2 is the optical compensation film W which has an optically anisotropic layer.

$$Ro = (nx - ny) \times d \qquad \text{Equation (a)}$$

$$Rt = ((nx + ny)/2 - nz) \times d \qquad \text{Equation (b)}$$

(In this formula Ro is the retardation value in the film surface, Rt is the retardation value in the film thickness direction; nx is the refractive index in the lag phase axis direction inside the film plane, ny is the refractive index in the advance phase axis direction inside the film plane, nz is the refractive index in the thickness direction (refractive index is measured at a wavelength of 590 nm) and d is the film thickness (nm)).

(2) The liquid crystal display device of (1), wherein the protective film A2 is arranged at an observation side from which the liquid crystal cell is observed and the protective film B2 is arranged at a back light side to face a back light, and wherein the cellulose ester film Y is arranged at the observation side as the protective film A2 and the optical compensation film W is arranged at the back light side as the protective film B2.

(3) The liquid crystal display device of (1), wherein at least one of the protective films A2 and B2 is the optical compensation film W in which the optical anisotropic layer is formed on the cellulose ester film Y.

(4) The liquid crystal device of (1), wherein at least one of the polarizing plate protective films A2 and B2 is a cellulose ester film Y which includes a polymer whose weight average molecular weight is between 500 and 30,000, that is obtained by polymerizing an ethylene based unsaturated monomer.

(5) The liquid crystal device of (1), wherein at least one of the polarizing plate protective films A2 and B2 is a cellulose ester film Y which includes an acrylic polymer whose weight average molecular weight is between 500 and 30,000.

(6) The liquid crystal device of (3), wherein the acrylic polymer includes 30 mass % or more of methyl ester acrylate monomer.

(7) The liquid crystal device of (3) or (4), wherein the acrylic polymer includes 2 to 20 mass % of an acrylate or an ester metacrylate monomer having a hydroxyl group.

(8) The liquid crystal device of any one of (3) to (5), wherein the acrylic polymer includes a polymer X whose weight average molecular weight is between 2,000 and 30,000 and a polymer Y whose weight average molecular weight is between 500 and 3,000.

(9) The liquid crystal device of (1), wherein the optical anisotropic layer is a layer formed by a liquid crystal compound or a layer formed by stretching which includes a polymer formed from at least one of a polyether ketone, a polyamide, a polyester, a polyimide, a polyamide imide, and a polyester imide.

In this invention, a liquid crystal display device is provided in which there is little color change even if there is environmental variation, there is little color changes even when the angle at the time of viewing changes, contrast is high, and there is little variation on visibility due to stretch spots.

BRIEF DESCRIPTION OF THE DRAWINGS

FIG. 2($a$-1) through FIG. 2($c$-3) is pattern diagrams showing various arrangement patterns of a cellulose ester film Y and an optical compensation film W having an optical anisotropic layer in the MVA mode liquid crystal display device.

DETAILED DESCRIPTION OF THE PREFERRED EMBODIMENT

Figure 1:
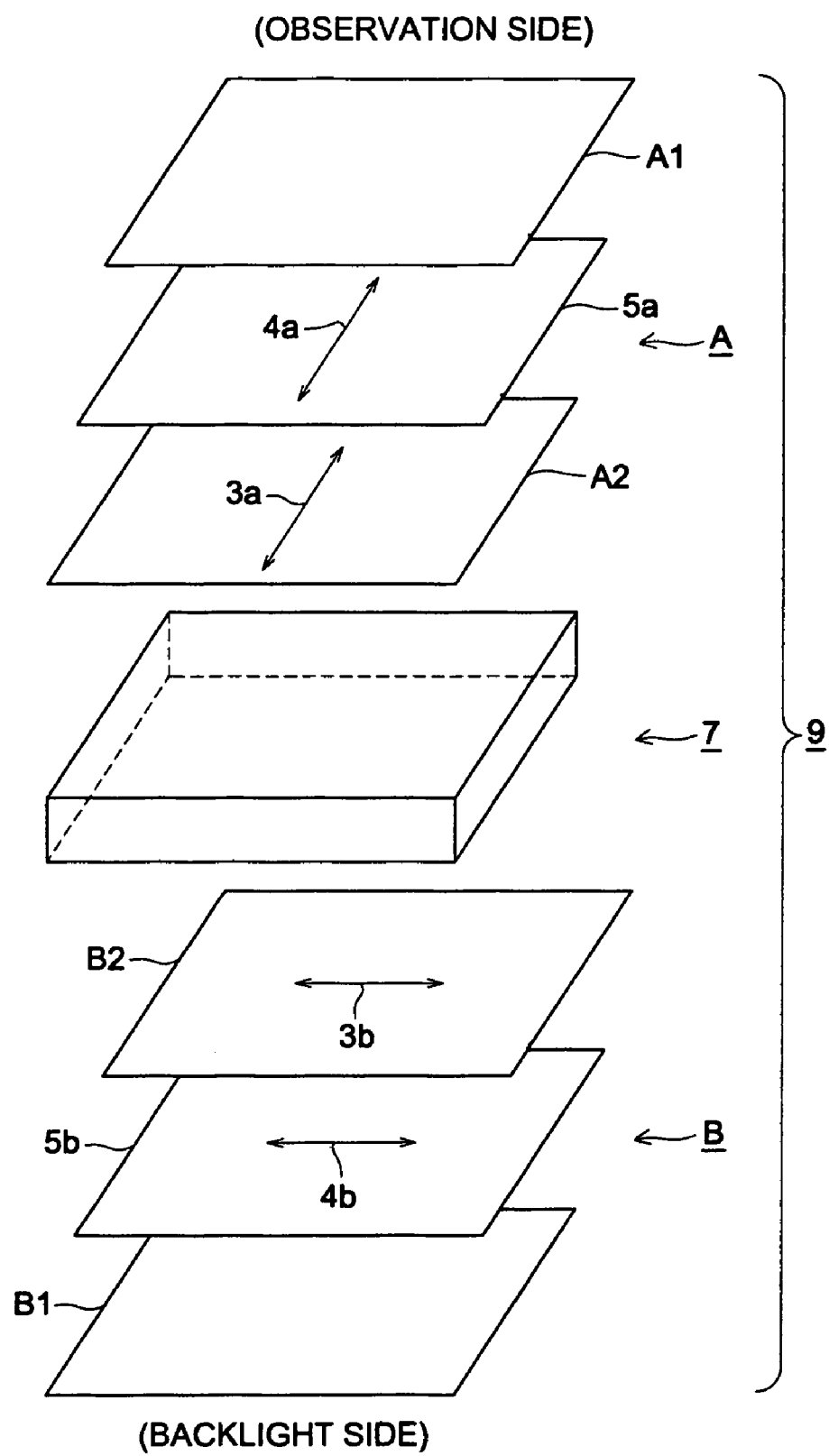
FIG. 1 is a schematic diagram showing the configuration of MVA mode liquid crystal display device of the present invention.

The following is a detailed description of the preferred embodiments for implementing this invention, but this invention is not to be limited thereby.

The liquid crystal display device of this invention is one in which polarizing plates A and B are provided so as to be held between a vertical orientation mode crystal cell and the corresponding liquid crystal cell, wherein the polarizing layer A comprises the polarizing plate protective films A1 and A2 and the polarizing layer B comprises the polarizing plate protective films B1 and B2, and at least one of the polarizing plate protective films A2 and B2 that are disposed at the liquid crystal cell side is a cellulose ester film Y that simultaneously satisfies the conditions that retardation value Ro is 0-10 nm and Rt is –20-20 nm as shown by the equations (a) and (b), and at least one of the polarizing plate protective films A2 and B2 is the optical compensation film W which has an optically anisotropic layer.

In view of the above problems, the present inventors did diligent investigation and discovered that a liquid crystal display device in which there is little color change even if there is environmental variation, there is little color changes even when the angle at the time of viewing changes, contrast is high, and there is little variation on visibility due to stretch spots can be obtained. This was obtained in the case where at least one of the polarizing plate protective films A2 and B2 that are disposed at the liquid crystal cell side is a polarizing plate protective films that has an optical anisotropic layer, and a polarizing plate protective film with reduced optical anisotropy and which simultaneously satisfies the condition that retardation value Ro is 0-10 nm and Rt is –20-20 nm is used for at least one of the opposing polarizing plate protective films A2 and B2, and this invention was thereby conceived.

Here, the compensation film W includes a structure in which the optically anisotropic layer is formed on the cellulose ester film Y.

FIG. 1 shows a schematic diagram of a MVA mode type liquid crystal display.

In FIG. 1, for example, a polarizing plate protective film A2 of a polarizing plate A is a cellulose ester film Y of the present invention, and a polarizing plate protective film B2 of a polarizing plate B is an optical compensation film W of the present invention. Further, the polarizing plate protective film A2 may be a cellulose ester film Y of the present invention, and the polarizing plate protective film B2 is an optical compensation film W of the present invention. Still further, at least one of the protective films A2 and B2 may the optical compensation film W in which the optical anisotropic layer is formed on the cellulose ester film Y. Also, both of the protective films A2 and B2 may the optical compensation film W in which the optical anisotropic layer is formed on the cellulose ester film Y.

Especially, a polarizing plate using an optical compensation film W of the present invention is used at a back light side of a liquid crystal cell of a big screen and a polarizing plate using a cellulose ester film Y is used at an obserbed-side of the liquid crystal cell, it demonstrates its excellent fade resistance. In addition to the above effect, there is an effect in an eye not getting tired with prolonged observation for a liquid crystal display of a big screen more than in 17 type, especially more than 30 type, because there is no distortion like a reflection of a mirror without causing distortion on a reflected figure of a fluorescent lamp due to color unevenness or waveform unevenness.

In FIG. 2($a$-1) through FIG. 2($c$-3), various configuration patterns of a cellulose ester film Y and a optical compensation film W, more concrete, a cellulose ester film Y and an optical anisotropic layer are shown.

In the embociments shown in FIG. 2($a$-1) to FIG. 2($a$-3), an optical anisotropic layer is arranged to each of both positions opposite to the both surfaces of a liquid crystal cell. Further, in FIG. (a-1), both of the film A2 and the film B2 are the cellulose ester film Y. In FIG. (a-2), the film B2 located at the back light side is the cellulose ester film Y. And, in FIG. (a-3), the film A2 located at the viewing side is the cellulose ester film Y.

In these embodiments, with the following relation: (FIG. (a-1)>FIG. (a-2)>FIG. (a-3)), the embodiment of FIG. (a-1) shows the excellent effect.

In the embodiments shown in FIG. 2($b$-1) to FIG. 2($b$-3), an optical anisotropic layer is arranged to a position opposite to the back light side surface of a liquid crystal cell. Further, in FIG. (b-1), both of the film A2 and the film B2 are the cellulose ester film Y. In FIG. (b-2), the film B2 located at the back light side is the cellulose ester film Y. And, in FIG. (b-3), the film A2 located at the viewing side is the cellulose ester film Y.

In these embodiments, with the following relation: (FIG. (b-1)>FIG. (b-2)>FIG. (b-3)), the embodiment of FIG. (b-1) shows the excellent effect.

In these embodiments shown in FIG. 2($c$-1) to FIG. (c-3), an optical anisotropic layer is arranged to a position opposite to the observed side surface of a liquid crystal cell. Further, in FIG. (c-1), both of the film A2 and the film B2 are the cellulose ester film Y. In FIG. (c-2), the film B2 located at the back light side is the cellulose ester film Y. And, in FIG. (c-3), the film A2 located at the viewing side is the cellulose ester film Y.

In these embodiments, with the following relation: (FIG. (c-1)>FIG. (c-2)>FIG. (c-3)), the embodiment of FIG. (c-1) shows the excellent effect.

As a whole, with the following relation: (FIG. (a-1)>FIG. (a-2)>FIG. (a-3)>FIG. (b-1)>FIG. (b-2)>FIG. (b-3)>FIG. (c-1)>FIG. (c-2)>FIG. (c-3)), the embodiment of FIG. (a-1) shows the most excellent effect.

The following is a detailed description of this invention.

First the optical compensation film W which is the polarizing plate protective film including the optically anisotropic layer will be described.

In this invention, the optically anisotropic layer is preferably a liquid crystal compound layer formed by a liquid crystal compound or a polymer layer formed by stretching which includes a polymer formed from at least one of a polyether ketone, a polyamide, a polyester, a polyimide, a polyamide imide, and a polyester imide.

Incidentally, in the case that both of the protective films A2 and B2 include respective optically anisotropic layers, the respective optically anisotropic layers may have the same material and the same optical characteristics such as the same retardation values Ro and Rt or may have different materials and different optical characteristics such as different retardation values Ro and Rt. For example, a C plate may be used for the anisotropic layer of the protective films A2 and an A plate may be used for the anisotropic layer of the protective films B2.

(The Polymer Layer)

The polymer layer in this invention is preferably provided by coating it onto a cellulose ester film described hereinafter or the cellulose ester film Y of this invention. The formation steps for the polymer layer are not particularly limited provided that they are done after a cellulose ester film which is the support is subjected to liquid casting or melt casting and formed as a film, and for example may be done continuously during the film formation steps. Also, after film formation, the cellulose ester film that has been unwound is fed and coated onto the polymer layer using a micro-gravure coater or an extrusion coater and then dried and then each support is subjected to stretching and drying by a stretching method which uses a tenter. A method in which the film melt film formation step and the polymer layer formation step/stretching step are separate is preferable.

In addition, another method is one in which a polymer layer coat is formed on a separate support and transferred to the cellulose ester film via an adhesive or the like.

The thickness of the polymer layer in this invention is preferably 1-20 μm, and if it is than 1 μm, imparting desired phase difference may be difficult, while if it is greater than 20 μm, the film becomes too thick and handling deteriorates due to cracking and bending. In view of thinness and imparting phase difference properties, the thickness of the polymer layer is preferably less than 15 μm or less, more preferably 12 μm or less and 2-10 μm is particularly preferable.

The polymer used in the polymer layer is preferably a heat resistant solid polymer which can form a layer with light transparency of 75% or more, and excellent light transparency of 85% or more is particularly preferable.

In the case where the optical anisotropic layer is a layer formed by a liquid crystal compound, the liquid crystal compound that is used is not particularly limited provided that it can be oriented on an orientation layer or it can be oriented without an orientation layer and it is required to impart optical anisotropy without light scattering in the visible region due to orientation.

In the case where the liquid crystal compound used in this invention is a high polymer crystal, examples include the structures described in Publication No. 2592694, Publication No. 2687035, Publication No. 2711585, Publication No. 2660601, Japanese Patent Application Laid-Open No. 10-186356, Japanese Patent Application Laid-Open No. 10-206637, and Japanese Patent Application Laid-Open No. 10-333134. Of these, those having optically positive birefringence are preferably used.

Preferable examples of the liquid crystal compound of this invention other than the high polymer liquid crystals include general rod-shaped liquid crystal compounds and liquid crystal compounds which have optical positive birefringence.

Liquid crystal compounds which have positive birefringence and include an unsaturated ethylene group are preferable in view of orientation fixing, and the compounds having the structures shown in Japanese Patent Application Laid-Open No. 9-281480 and Japanese Patent Application Laid-Open No. 9-281481 can be used, but this invention is not particularly limited.

In this invention, in view of coating layer forming properties and phase difference due to stretching and the like, a crystal compound selected from a polyether ketone, particularly polyarylether ketone, a polyamide, a polyester, a polyimide, a polyamide imide, and a polyester imide may be used singly or two or more may be mixed and used.

Specific examples of the polyether ketone, particularly polyarylether ketone, include those having repeating units represented by General Formula (1) below for example (Japanese Patent Application Laid-Open No. 2001-49110 Publication).

[Formula 1]

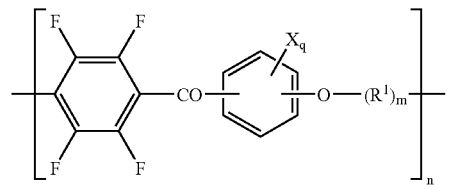

General Formula (1)

In the General Formula (1) below, X is a halogen, an alkyl group or an alkoxy group and the bonding number q to the benzene ring, or in other words the substitution number q of hydrogen atoms at the remaining positions where the p-tetrafluorobenzoylene group and the oxyalkylene group do not bond is an integer from 0-4. $R^1$ is a compound represented by the General Formula (2) below, and m is 0 or 1. Further, n represents the degree of polymerization and is preferably 2-5,000 and 5-500 is particularly preferable.

[Formula 2]

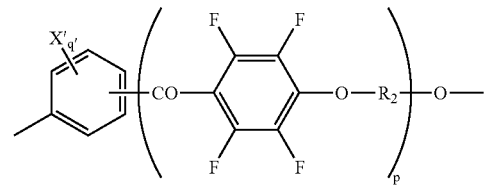

General Formula (2)

It is to be noted that examples of the halogen which is X in the General Formula (1) include a fluorine atom, a bromine atom, a chlorine atom, and an iodine atom, and fluorine is preferable. In addition, examples of the alkyl group include those having 1-6 carbon atoms, and of these a 1-4 straight chain or branched chain alkyl group such as a methyl group, an ethyl group, a propyl group and an isopropyl group, and a butyl group and of these, the methyl group, the ethyl group and halogenated alkyl groups thereof such as a trifluoromethyl group is favorable.

Further examples of the alkoxy group include, a straight chain or branched chain alkoxy group having 1-6 carbon atoms, and of these 1-4 carbon atoms such as a methoxy and an etoxy group and a propoxy group, an isoproxy group and a butoxy group, and of these, a methoxy group, an ethoxy group and a halogenated alkoxy groups thereof such a trifluoromethoxy group is preferable. Of the above, the fluorine atom is particularly preferable.

Meanwhile, in the General Formula (2), X' is a halogen, alkyl, or alkoky group, and the value of the bonding number q' is an integer from 0-4. The halogen, the alkyl group and the alkoxy group for X' are the same as those given for X.

Preferable X' include a fluorine atom, a methyl group or an ethyl group, an halogenated alkyl group thereof such as the trifluoromethyl, a methoxy or ethoxy group, a halogenated alkoxy group thereof such as trifluoromethoxy, and of these the fluorine atom is preferable.

It is to be noted that in X and X' in General Formula (1) may be the same or different. In addition, q or q' in General Formulae (1) and (2) is 2 or more and based on this, the 2 or more X or X' present in the molecule may independently be the same or different.

Particularly preferable $R^1$ is the group represented by the General Formula (3) below.

[Formula 3]

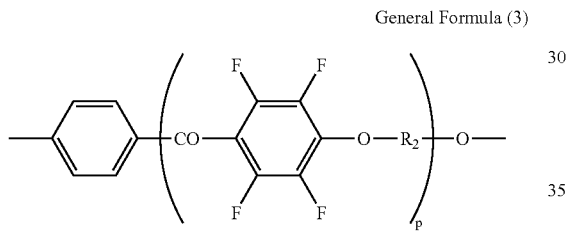

General Formula (3)

$R^2$ in General Formulae (2) and (3) above is a divalent aromatic group and P is 0 or 1. Examples of the divalent aromatic group include a (o, m or p-) phenyl group, naphthalene group, biphenyl group, anthracene group, (o, m or p-) terphenyl goup, a phenantrene group, a dibenzofuran group, a biphenyl ether group, a biphenyl sulfon group and the divalent aromatic groups represented by the formula below. It is to be noted that in the divalent aromatic group, the hydrogen directly bonded to the aromatic ring may be substituted by a halogen, an alkyl group or an alkoxy group.

[Formula 4]

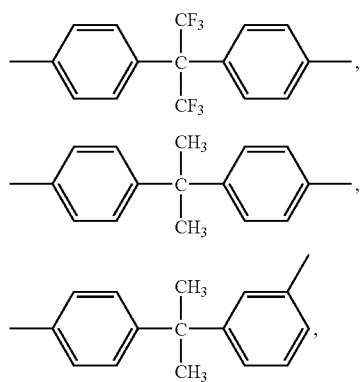

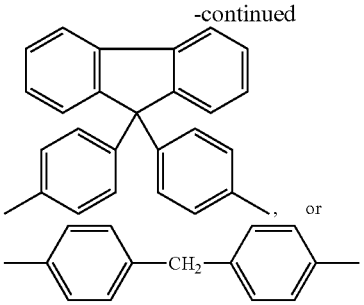

Preferable divalent aromatic groups ($R^2$) from above are shown by the formula below.

[Formula 5]

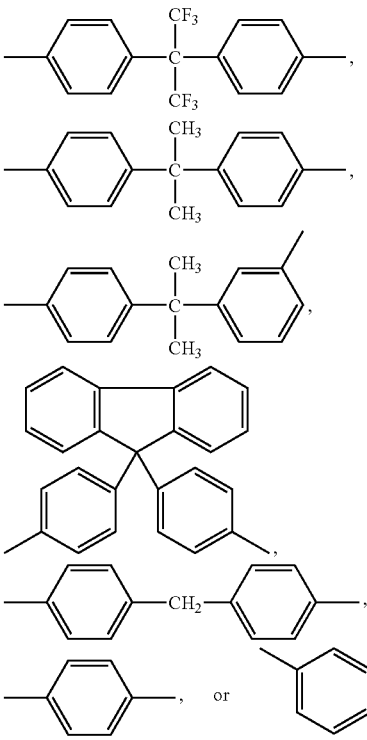

The polyarylether ketone shown in the General Formula (1) above may be formed from the same repeating units or may have 2 or 3 different repeating units. In the case of the latter, each of the units may exist in the block form or may be random.

Preferable polyarylether ketones from among those shown in the General Formula (1) above are represented by the General Formula (4) below.

[Formula 6]

General Formula (4)

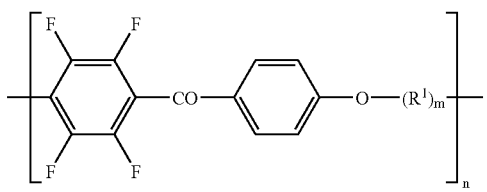

The preferable polyarylether ketone in the case where a polymer end group is included corresponds to the General Formula (1) and is represented by the General Formula (5) below, and those corresponding to the General Formula (4) are represented by the General Formula (6) below. These have fluorine atoms bonded at the p-tetrafluorobenzoylene group side and a hydrogen atom is bonded at the oxyalkylene group side.

[Formula 7]

General Formula (5)

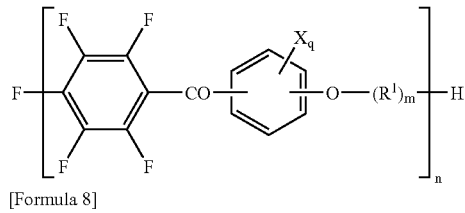

[Formula 8]

General Formula (6)

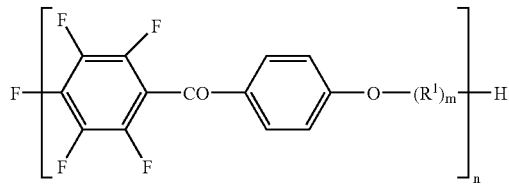

Meanwhile, specific examples of the polyamide or the polyester include those having repeating units represented by the General Formula (7) below.

[Formula 9]

General Formula (7)

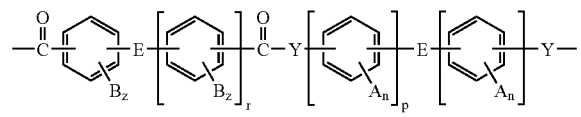

In the General Formula (7), B is a halogen, and alkyl group having 1-3 carbon atoms or a halogen compound thereof, a phenyl group substituted by one or more of these or an unsubstituted phenyl group. z is an integer from 0-3.

E is a covalent bond, an alkenyl group having 2 carbon atoms or a halogen compound thereof, a $CH_2$ group, a $C(CX_3)_2$ group, a CO group, an O atom, an S atom, an $SO_2$ group, an $Si(R)_2$ group, or an NR group. The X in the $C(CX_3)_2$ group is a hydrogen atom or a halogen, and the R in the $Si(R)_2$ group and the NR group is an alkyl group having 1-3 carbon atoms or halogen compounds thereof. It is to be noted that E is at the meta site or the para site with respect to the carbonyl group or the Y group. Also the halogen is a fluorine atom, a chlorine atom, an iodine atom, or a bromine atom (the same as in General Formula (7) hereinafter).

Furthermore, Y is an O atom or an NH group. A is a hydrogen atom, a halogen atom, an alkyl group having 1-3 carbon atoms or halogen compounds thereof, a nitro-group, a cyano group, a thioalkyl group having 1-3 carbon atoms, an alkoxy group having 1-3 carbon atoms or an halogen compound thereof, an aryl group or a halogen compound thereof, an alkyl ester group having 1-9 carbon atoms, an aryl ester group having 1-12 carbon atoms or substituted derivatives thereof, or aryl amide group having 1-12 carbon atoms or substituted derivatives thereof.

In addition, n is an integer from 0-4, p is an integer from 0-3, q is an integer from 1-3 and r is and an integer from 0-3. In a preferable polyamide or polyester, r and q are 1, and at least one of the biphenyl rings thereof has a repeating units represented by the General Formula (8) below substituted at the 2 site or the 2' site.

[Formula 10]

General Formula (8)

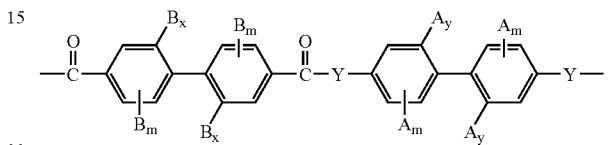

m in the General Formula (8) is an integer from 0-3, and is preferable 1 or 3, x and y are 0 or 1 and they are never both 0. It is to be noted that the other symbols are the same as the case for General Formula (7), but E is a para oriented covalent bond with respect to the carbonyl group or the Y group.

In the General Formulae (7) and (8), in the case where there is a plurality of B, E, Y, or A in the molecule, they may be the same or may be different. Similarly, z, n, m, x and y may be the same or different. It is to be noted that in that case, B, E, Y, A, z, n, m, x, y are respectively determined independently.

The polyamide or polyester represented by the General Formula (7) may be formed from the same repeated unit or may have 2 or 3 or more of different repeating units. In the case of the latter, each of the units may exist in the block form or may be random.

On the other hand, specific examples of the polyimide include a condensation polymerization product of 9,9-bis (amino aryl) fluorene and an aromatic tetracarbonate dihydride, and may have more than one of the repeating units represented by the General Formula (9) below.

[Formula 11]

General Formula (9)

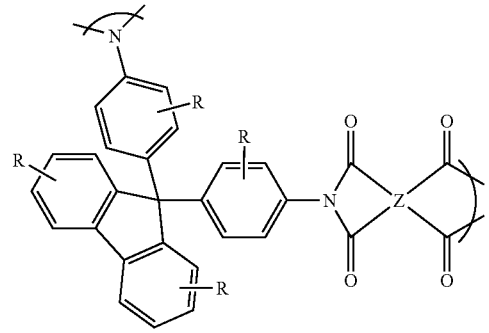

In the General Formula (9), R is a hydrogen atom, a halogen, a phenyl group, or an alkyl group containing a phenyl group that is substituted by an alkyl group having 1-4 halogens or 1-10 carbon atoms or containing 1-10 hydrogen atoms. The 4 Rs are each independently determined and a range of 0-4 of them can be substituted. The substitution groups are preferably those given above but some of them may be different. It is to be noted that the halogen is a fluorine atom, a chlorine atom, an iodine atom, and a bromine atom (this is the same for General Formula (9) below.

Z is a triple substituted aromatic group having 6-20 carbon atoms. Preferably, Z is a pyromellitic group or a polycyclic aromatic group such as a naphthalene group, fluorenelene group, a benzo fluororenelene and an anthracenelene group, or substituted derivatives thereof, or a group represented by General Formula (10) below. It is to be noted that examples of the substitution group in the substitution derivative of the polycyclic aromatic group include a halogen, alkyl groups having 1-10 carbon atoms or fluorine compounds thereof.

[Formula 12]

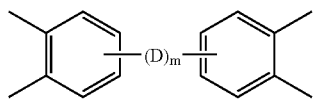

General Formula (10)

In the General Formula (10) above, D is a covalent bond, $C(R^2)_2$ group, a CO group, an O atom, an S atom, an $SO_2$ group, an $Si(C_2H_5)$ group, an $N(R^3)_2$ group, or a combination thereof and m is an integer from 1-10. It is to be noted that each $R^2$ above is independently a hydrogen atom or a $C(R^4)_3$ group. $R^3$ also is independently a hydrogen atom, an alkyl group having 1- about 20 carbon atoms or an aryl group having about 6 to about 20 carbon atoms. $R^4$ independently represents a hydrogen atom, a fluorine atom or a chlorine atom.

In addition, aside from the polyimide above, those including the unit represented by the General Formulae (11) and (12) may be given as examples. A polyimide having the unit represented by the General Formula (13) is preferable.

[Formula 13]

General Formula (11)

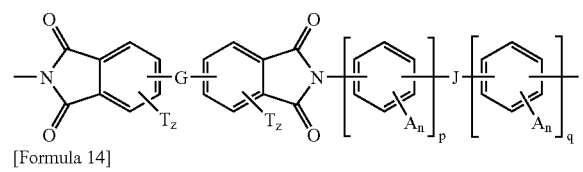

[Formula 14]

General Formula (12)

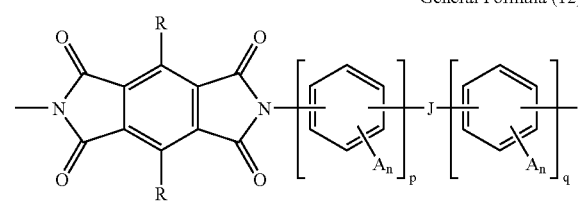

[Formula 15]

General Formula (13)

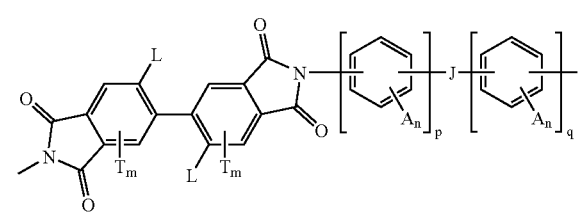

In the General Formulae (11), (12) and (13), T and L respectively is a halogen, an alkyl group having 1-3 carbon atom or a halogen compound thereof, a phenyl group substituted by one, or two or more of these, or an unsubstituted phenyl group. The halogen is a fluorine atom, a chlorine atom, an iodine atom, a bromine atom (this is same in General Formulae (11), (12) and (13) hereinafter). z is an integer from 0-3.

In addition, G and J respectively is a covalent bond or a linking bond, $CH_2$ group, a $C(CX_3)_2$ group, a CO group, an O atom, an S atom, an $SO_2$ group, a $Si(C_2H_5)_2$ group, or an $N(CH_3)$ group. The X in the $C(CX_3)_2$ group is a hydrogen atom or a halogen (this is same in General Formulae (11), (12) and (13) hereinafter).

A is a hydrogen atom, a halogen, an alkyl group or a halogenated compound thereof, a nitro group, a cyano group, a thioalkyl group, an alkoxy group or a halogenated compound thereof, an aryl group or a halogenated compound thereof, or an alkyl ester group or a substituted derivative thereof.

R is a hydrogen atom, a halogen, a phenyl group or a substituted phenyl group such as a halogenated compound thereof, or an alkyl group or substituted alkyl group such as a halogenated compound thereof. n is an integer from 0-4, p is an integer from 0-3, and q is an integer from 1-3.

It is to be noted that in General Formulae (11), (12) and (13), in the case where a plurality of T, A, R, and L respectively exist in the molecule, they may be the same or. may be different. Similarly, z, n, and m may be the same or may be different. In the case where they are different, T, A, R, L, z, n and m respectively are independently determined.

The polyimide represented by the General Formulae (9) (11), (12) and (13) may be formed of the same repeating units or may have 2 or 3 different repeating units. The repeating units may be a single dianhydride and/or diamine other than those above or formed by polymerizing 2 or more thereof. An aromatic diamine is particularly preferable as the diamine. In the latter case where the repeating units are different, each of the repeating units may exist in the block form or may be random.

Examples of the dianhydride forming the differing repeating units include pyromellitic dianhydride, 3,6-diphenyl pyromellitic dianhydride, 3,6-bis(trifluoromethyl)pyromellitic dianhydride, 3,6-dibromopyromellitic dianhydride, 3,6-dichloropyromellitic dianhydride, 3,3',4,4'-benzophenon tetracarbonate dianhydride, 2,3,3',4'-benzophenon tetracarbonate dianhydride, 2,2',3,3'-benzophenon tetracarbonate dianhydride, 3,3',4,4'-biphenyl carbonate dianhydride, bis(2,3-dicarbophenyl) methane dianhydride.

Other examples of the dianhydride above include bis(2,5, 6-trifluoro-3,4-dicarboxyphenyl) methane anhydride, 2,2-bis (3,4-dicarboxyphenyl)-1,1,1,3,3-hexafluoropropane dianhydride, bis(3,4-dicarboxyphenyl) ether dianhydride (4,4'-oxydifutarate anhydride), bis(3,4-dicarboxyphenyl) sulfon dianhydride (3,3',4,4'-diphenyl sulfon tetracarbon anhydride), 4-4'-[4,4'-ispopropyledene-di(p-phenyleneoxy)]bis (futarate anhydride).

Further, other examples of the dianhydride above include N,N-(3,4-dicarboxyphenyl)-N-methylamine dianhydride, bis(3,4-dicarboxyphenyl) diethylsilane dianhydride, 2,3,6,7-naphthalene-tetracarbonate dianhydride and naphthalene tetracarbonate dianhydrides such as 1,2,5,6-naphthalene-tetracarbonate dianhydride and 2,6-dichloro-naphthalene-1,4,5, 8-tetracarbonate dianhydride, and polycyclic aromatic tetracarbonate dianhydrides such as thiophene-2,3,4,5-tetracarbonate dianhydride and pyridine-2,3,5,6-tetracarbonate, pyridine-2,3,5,6-tetracarbonate dianhydride.

The dianhydrides that are preferably used include 2,2' substituted dianhydrides such as 2,2'-dibromo-4,4',5,5'-biphenyl tetracarbonate dianhydride and 2,2'-dichloro-4,4',5,5'-biphenyl tetracarbonate dianhydride, 2,2'-trihalo substituted dianhydride and in particular, 2,2-bis(trifluoromethyl)-4,4',5,5'-biphenyl tetracarbonate dianhydride is preferable.

Meanwhile, examples of the diamines formed from the different repeating units above include (o, m or p-) phenylene diamine, 2,4-diamino toluene, benzene diamines such as 1,4-diamino-2-methoxy benzene, 1,4-diamino-2-phenyl benzene, 1,3-diamino-4-chlorobenzene, 4,4'-diaminobiphenyl, 4,4'-diaminodiphenylmethane, 2,2-bis(4-aminophenyl) propane, 2,2-bis(4-aminophenyl)-1,1,1,3,3,3-hexafluoropropane, 4,4'-diaminodiphenyl ether, 3,4'-diaminodiphenyl ether, 1,3-bis(3-aminophenoxy) benzene, 1,3-bis(4-aminophenoxy) benzene, 1,4-bis(4-aminophenoxy) benzene.

In addition, examples of the diamines above also include polycyclic aromatic diamines such as 4,4'-bis(4-aminophenoxy) biphenyl, 4,4'-bis(3-aminophenoxy) biphenyl, 2,2-bis(4-(4-aminophenoxy)phenyl) propane, 2,2-bis[4-(4-aminophenoxy)phenyl]-1,1,1,3,3,3-hexafluoropropane, 4,4'-diaminodiphenylthioether, 4,4'-diaminodiphenylsulfon, 2,2'-diaminobenzophenon, 3,3'-diaminobenzophenon, and naphthalene diamines such as 1,8-diaminonaphthalene and 1,5-diaminonaphthalene, and polycyclic aromatic diamines such as 2,6-diamino pyridine, 2,4-diamino pyridine and 2,4-diamino-S-triazine.

Examples of the polyimide preferably used are heat resistant polymides which are soluble in a solvent, and prepared using aromatic dianhydrides such as 2,2'-bis(3,4-dicarboxyphenyl) hexafluoropropane dianhydride and 4,4-bis(3,4-dicarboxyphenyl)-2,2-diphenyl propane dianhydride, naphthalene tetracarbonate dianhydride and (3,4-dicarboxydiphenyl) sulfon dianhydrides.

Examples of the diamines are preferably heat resistant polymides which are soluble in a solvent, and prepared using aromatic dianhydrides such as 4,4-(9-fluororenilidene)-dianiline and 2,2'-bis(trifluoromethyl)-4,4'-diaminobiphenyl, 3,3'-dichloro-4,4'-diaminodiphenyl methane and 2,2'-dichloro-4,4'-diaminobiphenyl, 2,2',5,5'-tetrachlorobenzene and 2,2-bis(4-aminophenoxyphenyl) propane, 2,2-bis(4-aminophenoxyphenyl) hexafluoropropane or 1,4-bis(4-aminophenoxy) benzene, 1,3-bis(4-aminophenoxy) benzene and 1,3-bis(3-aminophenoxy) benzene.

On the other hand, any suitable polyamide imide or polyester imide may be used singly or in combinations of two or more without any particular limit. Of these, the polyamide imides described in Japanese Patent Application Laid-Open No. 61-162512 Publication and the polyester imides described in Japanese Patent Application Laid-Open No. 64-38472 Publication and the like may be favorably used.

The polymer amount of the solid polymer for forming the polymer layer is not particularly limited, but the polymer is preferably soluble in a solvent. In view of the coating film thickness accuracy and surface roughness or surface smoothness, film strength and prevention of cracking due to stretching and warping and the like when the filmed is formed, and solubility in a solvent (gelling prevention), the weight average molecular weight is 10,000-1,000,000, more preferably 20,000-500,000 and 50,000-200,000 is particularly preferable. It is to be noted that the weight average molecular weight is a value measured by gel permeation chromatography (GPC) using polyethylene oxide as a standard material and dimethyl formamide solvent.

Aforementioned polyaryl ether ketones and polyamides and solid polymers such as polyesters and polyimides and the like may be used singly or in combinations of two or more of the same types. In addition, mixtures of two or more polymers having different functional groups such as a mixture of a polyaryl ether ketone and polyamide may be used.

In addition suitable polymers other than those above may be used singly or combined provided that the orientation of the solid polymer is not significantly reduced when forming the polymer layer. Examples of the combined polymers include thermoplastic resins such as polyethylene, polypropylene, polystyrene, polymethylmethacrylate, ABS resin and AS resin, polyacetate, polycarbonate, polyamide, polyethylene teraphthalate, polybutylene teraphthalate, polyphenylene sulfide, polyether sulfon, polyketone, polyimide, polycyclohexane dimethanol terephthalate, polyarylate, liquid crystal polymers (including photopolymer liquid crystal monomers).

In addition, thermosetting resins such as epoxy resins, phenol resins, novolac resins and the like may be used as the combined polymer. The amount of the combined polymer used is not particularly limited provided that it is in a range that does not markedly decrease orientation and is usually 50 mass % or less, more preferably 40 mass % or less and particularly preferably 30 mass % or less.

When liquidizing the solid polymer for forming the polymer layer, if the solid polymer is a thermoplastic polymer, a system of melting using heat or a suitable system of dissolving the solid polymer in a solvent to form a solution can be employed. Thus, the hardening of the polymer layer can be performed by cooling the polymer layer in the melt liquid of the former method, or by removing the solvent from the polymer layer and drying in the solution of the latter method. At the time of formation of the polymer layer, various additives including stabilizers and plasticizers, metals and the like may be blended according to need.

Drying after the polymer layer has been coated may be natural drying (air drying), heat drying, or may be performed using hot air, infrared beams, heat rolls or microwaves. It is preferably performed using hot air in view of simplicity. The drying temperature are determined by the stretching temperature of the tenter or the like in the next step and uses the zone drying method in a range of 40-180° C. and the temperatures are preferably divided into 3-5 grades and gradually increased. Performing drying in the range of 80-170° C. is preferable in order to improve the physical properties of the polymer layer such as resistance to cracking and dimensional stability and the like.

Preferable examples of the solvent include halogenated hydrocarbons such as chloroform and dicloromethane, carbon tetrachloride or dichloroethane, tetrachloroethane and trichloethylene, and chlorobenzene and orthodichlorobenzene, phenols such as phenol and parachlorophenol, aromatic hydrocarbons such as benzene and toluene, xylene and methoxybenzene, and 1,2-dimethoxybenzene, ketones such as acetone and methylethyl ketone, methylisobutyl ketone and cyclohexanone, cyclopentanone and 2-pyrolidone, and N-methyl-2-pyrolidone and esters such as ethyl acetate and butyl acetate.

Other examples of the solvent include, alcohols such as t-butyl alcohol and glycerine, ethylene glycol and triethylene glycol, ethylene glycol monomethyl ether or diethylene glycol dimethyl ether, propylene glycol and dipropylene glycol, 2-methyl-2,4-pentadiole and the like, amides such as dimethyl formamide and dimethyl acetoamide, nitryls such as acetonitryl and butylonitryl, ethers such as diethylether and dibutylether, and tetrahydrofuran, as well as methylene chloride and carbon disulfide, ethyl cellusolve and butyl cellusolve.

The solvent may be used singly or two or more may be suitably mixed and combined. In view of solution coating accuracy and the like, the solid polymer is preferably 2-100 parts by weight with respect to 100 parts by weight of the solvent, and is preferably 5-50 parts by weight and 10-40 parts by weight is particularly preferable.

The spreading of the liquefied polymer cellulose ester film on may be done by casting methods such as spin coating, roll coating, flow coating, printing, dip coating, by cast film forming, bar coating, gravure printing, and suitable film formation methods such as an extrusion. Of these, solution film formation methods such as casting and the like are preferably used in view of mass production of films that have little unevenness in thickness or orientation distortion.

As described above, the polymer layer is dissolved in a solvent and the liquefied polymer solution is coated on a support and dried, and stretching which is described hereinafter is performed for each support. The stretching is preferably done by a tenter. In this method, the polymer layer can be processed while supported by the substrate and manufacturing efficiency and processing accuracy are excellent and continuous manufacturing becomes possible.

(Stretching Operation)

The preferable stretching operation for the optical compensation film W of this invention will be described.

After the polymer layer is placed on a cellulose ester film that has been subjected to solution casting or melt casting or on the cellulose ester film Y of this invention, control of phase difference for the optical compensation film W of this invention is preferably performed by simultaneously stretching the polymer layer and the cellulose ester film using the stretching method described below. In addition, before the polymer layer is provided, the cellulose ester film that has been subjected to solution casting or melt casting may be stretched alone in order to control phase difference.

The support is preferably a polymer layer formed on a cellulose ester film Y including a polymer which is obtained by polymerization of ethylene based unsaturated monomers in particular, and has a weight average molecular weight of between 500 and 30,000, and this support is preferable because it provides a display device in which there is little color change, contrast is high, and there is little variation in visibility due to stretch spots.

The stretching is preferably 1.0-2.0 times in one direction of the optical compensation film W, and 0.7-1.5 in the other direction.

For example, stretching may be done successively or simultaneously with respect to the longitudinal direction and the direction perpendicular thereto in the film plane, or in other words the transverse direction, but if at this time the stretching ratio with respect to at least one direction is too small, sufficient phase difference is not obtained, while if it is too large, stretching becomes difficult and breakage sometimes occurs.

The optical compensation film W may stretched uniaxially at the free end in the direction of film formation or unbalanced biaxial stretching involving stretching in the transverse direction and then contraction in the casting direction may be performed. Contraction rate in the direction of contraction is preferably 0.7-1.0 time.

In the case where a cellulose ester which obtains positive birefringence is used for stress, it is possible to put the lag axis of the optical compensation film in the transverse direction by stretching in the transverse direction. In this case, in this invention, in order to improve the quality of the liquid crystal, the lag axis of the optical compensation film W is preferably in the transverse direction and such that (transverse direction stretching ratio)>(cast direction stretching rate).

The cellulose ester film that has been subjected to solution casting or melt casting is preferably subjected to pre-heating prior to stretching, at 50—less than 180° C., more preferably 60—less than 160° C., and still more preferably 70—less than 150° C., for between 5 seconds and 3 minutes, more preferably, between 10 seconds and 2 minutes, and still more preferably between 15 seconds and 90 seconds. This heat treatment is preferably executed for the period from immediately before the film is held by the tenter until when the stretching starts after the film is held. It is particularly preferably executed period from when the film is held by the tenter to immediately before stretching begins.

Stretching is preferably performed at 5-300%/minute, more preferably 10-200%/minute, and still more preferably 15-150%/minute. Stretching is preferably performed by holding both ends of the film using a tenter.

The stretching angle to stretch in a lateral direction is preferably 2°-10°, more preferably 3°-7° and still more preferably 3°-5°. The stretching speed may be fixed or may be varied.

The temperature at the time of stretching is preferably 40-250° C. and more preferably 70-180° C.

The distribution of the atmospheric temperature inside the tenter step is preferably low and preferably within ±5° C. along the width, and more preferably ±2° C., and still more preferably ±1° C., and most preferably ±0.5° C. The heat treatment in the tenter step is preferably performed with a heat transmission coefficient of 20 $J/m^2hr$-130×10$^3$ $J/m^2hr$. The heat transmission coefficient is more preferably in the range 40 $J/m^2hr$-130×10$^3$ $J/m^2hr$ and most preferably 42 $J/m^2hr$-84×10$^3$ $J/m^2hr$.

The film conveyance tension in the film formation step inside the tenter depends on temperature but is preferably 120 N/m-200 N/m and more preferably 140 N/m-200 N/m. 140 N/m-160 N/m is most preferable.

In order to prevent undesired stretching of the film in the film formation step, a tension cut roll is preferably placed in front of or behind the tenter.

After stretching of the optical compensation film of this invention, warps remaining after the heat treatment are preferably relaxed. The heat treatment is preferably performed at 110-150° C., more preferably 100-180° C., and still more preferably 130-160° C. At this time, the heat treatment is preferably performed with a heat transmission coefficient of 20 $J/m^2hr$-130×10$^3$ $J/m^2hr$. The heat transmission coefficient is more preferably in the range 40 $J/m^2hr$-130×10$^3$ $J/m^2hr$ and most preferably 42 $J/m^2hr$-84×10$^3$ $J/m^2hr$. As a result, the remaining warp is reduced and the dimensional stability under high temperature conditions such as 90° C. or the like, or high temperature and high humidity conditions such as 80° C. and 90% RH.

The stretched film is cooled to room temperature after stretching. Cooling of the stretched film preferably is started while its width is held by the tenter. During this time, the width held by the tenter is preferably contracts by 1-10% of the film width after stretching, more preferably 2-9% and still more preferably between 2% and 8% and then relaxed. The cooling speed is preferably 10-300° C./minute, more preferably 30-250° C./minute and still more preferably 30-200° C./minute. The temperature may be cooled to room temperature while the film is held by the tenter, the hold is preferably interrupted and switched to roll conveyance and then the film is wound into a roll.

The optical compensation film W of this invention that has been manufactured as described above has the following properties.

(Optical Properties)

The optical compensation film W of this invention in which an optically anisotropic layer (polymer layers) are stacked on a cellulose ester film preferably has a retardation value Ro in the range 20-300 nm and retardation value Rt in the range −600-600 nm, the retardation values being defined by the formula above. In addition a more preferable range for the Ro value is 20-120 nm and for the Rt value is −400-400 nm, and a particularly preferable range for the Ro value is 40-100 nm, and for the Rt value is −300-300 nm.

The optical compensation film W of this invention is particularly advantageous as the optical compensation film of the VA type liquid crystal device having a VA mode liquid crystal cell. The optical compensation film used in the VA type liquid crystal device preferably has a Ro value of 20-150 nm and an Rt value of 70-400 nm. An Ro value of 30-100 nm is even more preferable. In the case where two optical compensation films are used in the VA type liquid crystal display device, the Rt value of the film is preferably 70-250 nm. In the case where one optical compensation film is used in the VA type liquid crystal display device, the Rt value of the film is preferably 150-400 nm.

By causing the retardation values to be in the above ranges, optical properties as a polarizing plate phase difference film in particular can be sufficiently satisfied.

Other properties of the optical compensation film W of this invention will be described in the following. The following properties are the favorable values for an optical compensation film in which polymer layers are coated onto a cellulose ester film which has been subjected to liquid casting and then hardened.

(Moisture Permeability)

The moisture permeability in the optical compensation film W is preferably 1-250 $g/m^2 \cdot 24$ hours in an environment of 25° C. and 90% RH, and more preferably 10-200 $g/m^2 \cdot 24$ hours, and most preferably 20-180 $g/m^2 \cdot 24$ hours. Moisture permeability may be measured using JIS Z0208.

(Equilibrium Water Content)

The equilibrium water content of the optical compensation film W at a temperature of 25° C. and relative humidity of 60% is 0.1-4%, and more preferably 0.3-3%, and 0.5-1.5% is particularly preferable.

The equilibrium water content can be easily measured using the Carl Fischer method by a measuring device (Carl Fischer water content measuring device CA-05 manufactured by Mitsubishi Chemicals, water content aerification device: VA-05, Internal fluid: Aquamicron CXμ, external fluid: Aquamicron AX, Nitrogen flow rate: 200 ml/minute, heating temperature 150° C.). More specifically, a sample is conditioned at 25° C. and relative humidity of 60% for 24 hours or more, and 0.6-1.0 g is accurately weighed and measured by a measuring device and the obtained equilibrium water content is determined from the amount of water.

The water content of the optical compensation film W is preferably 0.3-15 $g/m^2$ at a temperature of 30° C. and 85% RH in order not to compromise adhesion to the polyvinyl alcohol (polarizer), and 0.5-10 $g/m^2$ is more preferable. If the water content is greater than 15 $g/m^2$, there is a tendency for the variation in retardation due to temperature changes and humidity changes to be large.

Next the cellulose ester film Y which is the polarizing plate protective film which reduces optical anisotropy of this invention will be described.

In this invention, a polarizing plate protective film with reduced optical anisotropy which simultaneously satisfies the requirement that the retardation value Ro is 0-10 nm and retardation value Rt is −20-20 nm must be used for at least one of the polarizing plate protective films A2 and B2.

<Polymer>

The cellulose ester film Y of the present invention preferably contains the polymer exhibiting negative double refraction in the direction of drawing in order to satisfy both the aforementioned retardation values Ro and Rt simultaneously. Although there is no particular restriction on this polymer, it preferably contains the polymer having a weight average molecular weight of 500 or more without exceeding 30000, obtained by polymerization of the ethylenic unsaturated monomer, for example.

The polymer preferably contains an acryl polymer having a weight average molecular weight of 500 or more without exceeding 30000.

When producing such a polymer, the molecular weight cannot be easily controlled by the conventional polymerization. In this case, it is preferred to use a method capable of ensuring the uniform molecular weight without much increasing the molecular weight. Such a preferred polymerization method is exemplified by: a method of using the peroxide polymerization initiator such as cumene peroxide and t-butylhydroperoxide; a method of using a greater amount of polymerization initiator than in the conventional way; a method of using a chain transfer agent such as a mercapto compound and carbon tetrachloride in addition to the polymerization initiator; a method of using a polymerization terminator such as benzoquinone and dinitrobenzene in addition to the polymerization initiator; and a method for bulk polymerization based on a compound including one thiol group and secondary hydroxyl group or a polymerization catalyst using this compound and organic metal compound as disclosed in the Japanese Non-Examined Patent Publication 2000-128911 or 2000-344823. These methods are all preferably used. The method according to the aforementioned Japanese Non-Examined Patent Publication is used in particular preference.

The following lists up the monomers as monomer units constituting the polymer advantageous to the present invention, without the present invention being restricted thereto:

Ethylenic unsaturated monomer units constituting the polymer obtained by polymerization of the ethylenic unsaturated monomer are:

a vinyl ester such as vinyl acetate, vinyl propionate, vinyl butyrate, vinyl valerate, vinyl pivalate, vinyl caproate, vinyl caprate, vinyl laurate, vinyl myristate, vinyl palmitate, vinyl stearate, vinyl cyclohexane carboxylate, vinyl octoate, vinyl methacrylate, vinyl crotonate, vinyl sorbate, vinyl benzoate and vinyl cinnamate;

an acrylic acid ester such as methyl acrylate, ethyl acrylate, propyl acrylate (i-, n-), butyl acrylate (n-, i-, s-, t-), pentyl acrylate (n-, i-, s-), hexyl acrylate (n-, i-), heptyl acrylate (n-, i-), octyl acrylate (n-, i-), nonyl acrylate (n-, i-), myristyl acrylate. (n-, i-), cyclohexyl acrylate, (2-ethylhexyl)acrylate, benzyl acrylate, phenetyl acrylate, (ε-caprolactone) acrylate, (2-hydroxy ethyl) acrylate, (2-hydroxy propyl) acrylate, (3-hydroxy propyl) acrylate, (4-hydroxy butyl) acrylate, (2-hydroxy butyl) acrylate, -p-hydroxy methylphenyl acrylate, and -p-(2-hydroxy ethyl) phenyl acrylate;

a methacrylic acid ester such as the one with the aforementioned acrylate replaced by methacrylate; and an unsaturated acid such as acrylic acid, methacrylic acid, maleic anhydride, crotonic acid and itaconic acid.

The polymer made of the aforementioned monomers can be either copolymer or homopolymer. The preferably used polymer is a vinyl ester homopolymer, a vinyl ester copolymer or a copolymer between vinyl ester and acrylic acid or methacrylic acid ester.

In the present invention, the acryl polymer is defined as an acrylic acid or methacrylic acidalkyl ester homopolymer or copolymer without monomer unit containing an aromatic ring or cyclohexyl group. The acryl polymer having an aromatic ring on the side chain refers to the acryl polymer containing the acrylic acid or methacrylic acid ester monomer unit provided with aromatic ring. The acryl polymer having a cyclohexyl group on the side chain refers to the acryl polymer containing the acrylic acid or methacrylic acid ester monomer unit equipped with cyclohexyl group.

The acrylic acid ester monomer without aromatic ring or cyclohexyl group is exemplified by methyl acrylate, ethyl acrylate, propyl acrylate (i-, n-), butyl acrylate (n-, i-, s-, t-), pentyl acrylate (n-, i-, s-), hexyl acrylate (n-, i-), heptyl acrylate (n-, i-), octyl acrylate (n-, i-), nonyl acrylate (n-, i-), myristyl acrylate (n-, i-), (2-ethylhexyl) acrylate, (ε-caprolactone) acrylate, (2-hydroxy ethyl) acrylate, (2-hydroxy propyl) acrylate, (3-hydroxy propyl) acrylate, (4-hydroxy butyl) acrylate, (2-hydroxy butyl) acrylate, (2-methoxy ethyl) acrylate, and (2-ethoxy ethyl) acrylate, or these substances with the acrylate thereof replaced by methacrylate.

The acryl polymer is a homopolymer or copolymer of the aforementioned monomer. It preferably contains 30% by mass or more of the acrylic acid methyl ester monomer unit, and 40% by mass or more of the methacrylic acid methyl ester monomer unit. The homopolymer of methyl acrylate or methyl methacrylate is particularly preferred.

The acrylic acid or methacrylic acid ester monomer containing the aromatic ring is exemplified by phenyl acrylate, phenyl methacrylate, (2- or 4-chlorophenyl) acrylate, (2- or 4-chlorophenyl) methacrylate, (2-, 3- or 4-ethoxycarbonylphenyl) acrylate, (2-, 3- or 4-ethoxycarbonylphenyl) methacrylate, (o-, m- or p-tolyl) acrylate, (o-, m- or p-tolyl) methacrylate, benzyl acrylate, benzyl methacrylate, phenethyl acrylate, phenethyl methacrylate, and (2-naphthyl) acrylate. Benzyl acrylate, benzyl methacrylate, phenethyl acrylate, and phenethyl methacrylate can preferably be used.

The acryl polymer having aromatic ring on the side chain preferably contains 20 through 40% by mass of the acrylic acid or methacrylic acid ester monomer unit having the aromatic ring, and 50 through 80% by mass of acrylic acid or methacrylic acid methyl ester monomer unit. The aforementioned polymer preferably contains 2 through 20% by mass of acrylic acid or methacrylic acid ester monomer unit containing the hydroxyl group.

The acrylic acid ester monomer containing the cyclohexyl group is exemplified by cyclohexyl acrylate, cyclohexyl methacrylate, (4-methyl cyclohexyl) acrylate, (4-methyl cyclohexyl)methacrylate, (4-ethyl cyclohexyl) acrylate, and (4-ethyl cyclohexyl) methacrylate. The acrylic acid cyclohexyl and methacrylic acid cyclohexyl can preferably be employed.

The acryl polymer having a cyclohexyl group on the side chain preferably includes 20 through 40%, and 50 through 80% by mass of acrylic acid or methacrylic acid ester monomer unit containing a cyclohexyl group. The aforementioned polymer preferably includes 2 through 20% by mass of the acrylic acid or methacrylic acid ester monomer unit containing the hydroxyl group.

The polymer and acryl polymer obtained by polymerization of the aforementioned ethylenic unsaturated monomer; acryl polymer having the aromatic ring on the side chain; and acryl polymer having the cyclohexyl group on the side chain all provide excellent compatibility with the cellulose resin.

The acrylic acid or methacrylic acid ester monomer having the aforementioned hydroxyl group is based on the structural unit of a copolymer, not homopolymer. In this case, acrylic acid or methacrylic acid ester monomer unit including the hydroxyl group preferably accounts for 2 through 20% by mass in the acryl polymer.

In the present invention, the polymer including a hydroxyl group on the side chain can be preferably utilized. Similarly to the case of the aforementioned monomer, acrylic acid or methacrylic acid ester is preferably used as the monomer unit having a hydroxyl group, and is exemplified by (2-hydroxy ethyl) acrylate, (2-hydroxy propyl) acrylate, (3-hydroxy propyl) acrylate, (4-hydroxy butyl) acrylate, (2-hydroxy butyl) acrylate, p-hydroxy methylphenyl acrylate, p-(2-hydroxy ethyl) phenyl acrylate, or the same wherein the aforementioned acrylic acid is replaced by the methacrylic acid. Use of the acrylic acid-2-hydroxy ethyl acrylate, and 2-hydroxy ethyl methacrylate is preferred. Preferably 2 through 20% by mass, more preferably 2 through 10% by mass of the acrylic acid ester or methacrylic acid ester monomer unit having a hydroxyl group in the polymer is included in the polymer.

It goes without saying that the aforementioned polymer including 2 through 20% by mass of monomer unit containing the aforementioned hydroxyl group provides excellent miscibility with the cellulose ester, outstanding retentivity and dimensional stability, minimized moisture permeability, and prominent dimensional stability, superb adhesiveness with polarizer as a polarizing plate protective film and improved durability of the polarizing plate.

There is no restriction to the method for allowing at least one of the terminals of the principal chain of the acryl polymer to have a hydroxyl group, if such a method ensures a hydroxyl group to be provided on the terminal of the principle chain in particular. Such a method is exemplified by: the method of using such a radical polymerization initiator including a hydroxyl group as azobis (2-hydroxy ethylbutylate); the method of using such a chain transfer agent having a hydroxyl group as 2-mercaptoethanol; the method of using a polymerization terminator having a hydroxyl group; the method of ensuring the hydroxyl group to be provided on the terminal by living ion polymerization; and the method of bulk polymerization based on polymerization catalyst through the use of a compound containing one thiol group and secondary hydroxyl group or through the combined use of this compound and organic metal compound, as disclosed in the Japanese Non-Examined Patent Publication 2000-128911 or 2000-344823. Use of the method disclosed in the Japanese Non-Examined Patent Publication is preferred in particular. The polymer manufactured by the method disclosed therein is available on the market under the trade name of Actflow Series manufactured by Soken Kagaku Co., Ltd. This is preferably used. The polymer having a hydroxyl group on the aforementioned terminal and/or the polymer having a hydroxyl group on the side chain provides a substantial improvement of the compatibility and transparency of the polymer.

As the ethylenic unsaturated monomer, a polymer using a styrene may be employed. Such styrene is exemplified by styrene, methyl styrene, dimethyl styrene, trimethyl styrene, ethyl styrene, isopropyl styrene, chloromethyl styrene, methoxy styrene, acetoxystyrene, chlorostyrene, dichloro styrene, bromostyrene, and vinyl methyl benzoate ester, without being restricted thereto. Polymerization can be made with the monomers mentioned as the aforementioned unsaturated ethylenic monomers, or two or more aforementioned polymers can be used to achieve compatibility with the cellulose resin for the purpose of controlling the double refraction.

Further, the cellulose ester film Y of the present invention preferably contains:

the polymer X having a weight average molecular weight of 2000 or more without exceeding 30000, the aforementioned polymer X having been obtained by copolymerization between the ethylenic unsaturated monomer Xa without containing an aromatic ring and a hydrophilic group in the molecule, and the ethylenic unsaturated monomer Xb containing the hydrophilic group without an aromatic ring in the molecule; and the polymer Y having a weight average molecular weight of 500 or more without exceeding 3000, the aforementioned polymer Y having been obtained by polymerization of ethylenic unsaturated monomer Ya without aromatic ring.

<Polymer X and Polymer Y>

Various methods are known and anyone can also be adopted as a way of adjusting Ro and Rth of the present invention. However, from a point of transparency, it is desirable that a cellulose ester film contains a polymer X having an average molecular weight of 5000 to 30000 and obtained by copolymerization of an ethylenic unsaturated monomer Xa not having an aromatic ring and a hydrophilic group in a molecule thereof and an ethylenic unsaturated monomer Xb having a hydrophilic group and not having an aromatic ring in a molecule thereof, preferably contains a polymer Y having an average molecular weight of 500 to 3000 and obtained by polymerization of an ethylenic unsaturated monomer Ya not having an aromatic ring.

Generally, among monomers, it is well know that a substance which has an aromatic ring especially in a main chain has a positive birefringence property like a birefringence property of a cellulose ester. And it is desirable to add a material having a negative birefringence property in a film, because it does not negate a retardation value Rth of a cellulose ester film.

A polymer X used in the present invention is a polymer having a weight average molecular weight of 5000 or more without exceeding 30000, obtained by copolymerization between an ethylenic unsaturated monomer Xa without containing aromatic ring and hydrophilic group in its molecule and an ethylenic unsaturated monomer Xb containing a hydrophilic group without an aromatic ring in its molecule. Preferably, Xa is an acryl monomer or a methacryl monomer each not having an aromatic ring and a hydrophilic group in a molecule thereof and Xb is an acryl monomer or a methacryl monomer each having a hydrophilic group and not having an aromatic ring in a molecule thereof.

A polymer X used in the present invention is preferably expressed by the following General Formula (1):

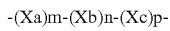 -(Xa)m-(Xb)n-(Xc)p-          General Formula (1)

More preferably, it is preferably a polymer expressed by the following General Formula (1-1):

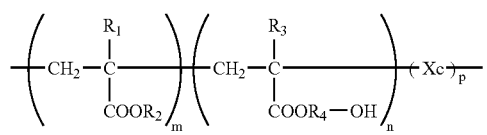

(where $R_1$ and $R_3$ in the Formula represent H or $CH_3$, $R_2$ represents an alkyl group or a cycloalkyl each having carbon atoms of 1-12, and $R_4$ denote $-CH_2-$ or $-C_2H_4-$ or $-C_3H_6-$. Xc represents a monomer unit polymerizable with Xa and Xb, and m n and p indicate a mole composition ratio. Here, m≠0, n≠0, and m+n+p=100.)

The following lists up monomers as a monomer unit constituting the polymer X in the present invention without being restricted thereto. In X, a hydrophilic group means a hydroxyl group and a group which has an ethylene oxide chain.

The ethylenic unsaturated monomer Xa without containing either aromatic ring or hydrophilic group in a molecule is exemplified by methyl acrylate, ethyl acrylate, propyl acrylate (i-, n-), butyl acrylate (n-, i-, s-, t-), pentyl acrylate (n-, i-, s-), hexyl acrylate (n-, i-), heptyl acrylate (n-, i-), octyl acrylate (n-, i-), nonyl acrylate (n-, i-), myristyl acrylate (n-, i-), (2-ethylhexyl) acrylate, (ε-caprolactone) acrylate, (2-hydroxy ethyl) acrylate, and (2-ethoxy ethyl) acrylate. Among them, methyl acrylate, ethyl acrylate, methyl methacrylate, ethyl methacrylate or propyl methacrylate (i-, n-) is preferably used.

The ethylenic unsaturated monomer Xb containing the hydrophilic group without an aromatic ring in the molecule is preferably an acrylic acid or methacrylic acid ester as a monomer unit having a hydroxyl group. The preferred one is exemplified by (2-hydroxy ethyl) acrylate, (2-hydroxy propyl) acrylate, (3-hydroxy propyl) acrylate, (4-hydroxy butyl) acrylate, and (2-hydroxy butyl) acrylate, or these substances with the acrylate thereof replaced by methacrylate. Of these, (2-hydroxy ethyl) acrylate, (2-hydroxy ethyl) methacrylate, (2-hydroxy propyl) acrylate, and (3-hydroxy propyl) acrylate are more preferably used.

If a monmer as Xc is a copolymerizable ethylenic unsaturated monomer other than Xa and Xb, the monomer is not limited, however, it is desirable that the monomer has not an acromatic ring.

The mole composition ratio m:n of Xa and Xb is preferably in the range of 99:1 to 65:35, more preferably in the range of.95:5 to 75:25. The mole composition ratio "p" of Xc is 0 to 10. Xc may be a plurality of monomer units.

If the mole composition ratio Xa is greater, compatibility with the cellulose ester will be improved but retardation value Rt along the film thickness will be increased. Further, the mole composition ratio of Xb exceeds the above range, haze may be caused at the time of film production. It may desirable to optimize these and determine the mole composition ratio of Xa and Xb.

The polymer X preferably has a weight average molecular weight of 5000 or more without exceeding 30000, more preferably a weight average molecular weight of 8000 or more without exceeding 25000.

If the molecular weight is greater than 5000, there are such advantages as smaller dimensional variation of the cellulose ester film at a high temperature and humidity and smaller curl as a polarizing plate protective film. When the weight average molecular weight does not exceeds 30000, compatibility with cellulose ester will be improved, refraining a problem as bleed-out at a high temperature and high humidity or an optical haze immediately after formation of the film.

The weight average molecular weight of polymer X in the present invention can be adjusted by the known method for molecular weight adjustment. Such a method for molecular weight adjustment can be exemplified by the method of adding a chain transfer agent such as carbon tetrachloride, laurylmercaptan, and octyl thioglycolate. The polymerization temperature is kept within the range from room temperature through 130 degrees Celsius, preferably from 50 through 100 degrees Celsius. This temperature or polymerization reaction time can be adjusted.

The weight average molecular weight can be measured according to the following method:

(Method of Measuring the Molecular Weight)

The weight average molecular weight Mw is measured by gel permeation chromatography.

The following describes the measurement conditions:
Solvent: methylene chloride
Column: Shodex K806, K805 and K803G (Three pieces manufactured by Showa Denko K.K. were connected for use)
Column temperature: 25 degrees Celsius
Sample concentration: 0.1% by mass
Detector: RI Model 504 (manufactured by GL Science Co., Ltd.)
Pump: L6000 (manufactured by Hitachi Limited)
Flow rate: 1.0 ml/min.
Calibration curve: The calibration curve using 13 samples of the standard polystyrene STK standard polystyrene (manufactured by Toso Co., Ltd.) was employed, wherein Mw=1000000 through 500. These 13 samples were placed at an approximately equally spaced interval.

The polymer Y used in the present invention is a polymer having a weight average molecular weight of 500 or more without exceeding 3000, being produced by polymerization of ethylenic unsaturated monomer Ya without aromatic ring. If the polymer has a weight average molecular weight of 500 or more, it is desirable, because the amount of the remaining monomer will be reduced. If the weight average molecular weight is 3000 or less, it is desirable, because the performance for reducing the level of retardation Rt can be maintained. Ya is preferably an acryl monomer or a methacryl monomer each not having an aromatic ring.

A polymer Y used in the present invention is preferably expressed by the following General Formula (2):

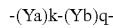
-(Ya)k-(Yb)q-    General Formula (2)

More preferably, it is preferably a polymer expressed by the following General Formula (2-1):

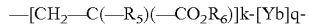
—[CH$_2$—C(—R$_5$)(—CO$_2$R$_6$)]k-[Yb]q-    General Formula (2)

(where R$_5$ in the Formula represents H or CH$_3$, R$_6$ represents an alkyl group or a cycloalkyl each having carbon atomses of 1-12, and Yb represents a monomer unit polymerizable with Ya, and k and q indicate a mole composition ratio. Here, k≠0, and k+q=100)

If a monmer as Yb is a copolymerizable ethylenic unsaturated monomer with Ya, the monomer is not limited. Yb may be plural. k+q=100, q is preferably 0 to 30.

The ethylenic unsaturated monomer Ya constituting the polymer Y obtained by polymerization of the ethylenic unsaturated monomer without containing an aromatic ring is exemplified by:

an acrylic acid ester such as methyl acrylate, ethyl acrylate, propyl acrylate (i-, n-), butyl acrylate (n-, i-, s-, t-), pentyl acrylate (n-, i-, s-), hexyl acrylate (n-, i-), heptyl acrylate (n-, i-), octyl acrylate (n-, i-), nonyl acrylate (n-, i-), myristyl acrylate (n-, i-), cyclohexyl acrylate, (2-ethylhexyl) acrylate, (ε-caprolactone) acrylate, (2-hydroxyethyl) acrylate, (2-hydroxypropyl) acrylate, (3-hydroxypropyl) acrylate, (4-hydroxybutyl) acrylate, (2-hydroxybutyl) acrylate;

a methacrylic acid ester such as the one with the aforementioned acrylate replaced by methacrylate; and an unsaturated acid such as acrylic acid, methacrylic acid, maleic anhydride, crotonic acid and itaconic acid.

A monomer as Yb is not specifically limited, if the monomer is an ethylenic unsaturated monomer copolymerizable with Ya. The monomer as Yb is exemplified by:

a vinyl ester such as vinyl acetate, vinyl propionate, vinyl butyrate, vinyl valerate, vinyl pivalate, vinyl caproate, vinyl caprate, vinyl laurate, vinyl myristate, vinyl palmitate, vinyl stearate, vinyl cyclohexane carboxylate, vinyl octoate, vinyl methacrylate, vinyl crotonate, vinyl sorbate, and vinyl cinnamate. Yb may be plural.

When producing such a polymer X and Y, the molecular weight cannot be easily controlled by the conventional polymerization. In this case, it is preferred to use a method capable of ensuring the uniform molecular weight without much increasing the molecular weight. Such a preferred polymerization method is exemplified by: a method of using the peroxide polymerization initiator such as cumene peroxide and t-butyl hydroperoxide; a method of using a greater amount of polymerization initiator than in the conventional way; a method of using a chain transfer agent such as a mercapto compound and carbon tetrachloride in addition to the polymerization initiator; a method of using a polymerization terminator such as benzoquinone and dinitrobenzene in addition to the polymerization initiator; and a method for bulk polymerization based on a compound including one thiol group and secondary hydroxyl group or a polymerization catalyst using this compound and organic metal compound as disclosed in the Japanese Non-Examined Patent Publication 2000-128911 or 2000-344823. These methods are all preferably used. Especially, for the polymer Y, a polymerization method which uses a compound having a thiol group and a hydroxyl group of a 2nd class in a molecule as a chain transfer agent, is desirable. In this case, at a terminal end of the polymer Y, it has a hydroxyl group resulting from a polymerization catalyst and a chain transfer agent and thioether. With this terminal residue group, the compatibility of Y and cellulose ester can be adjusted.

The hydroxyl group value of the polymer X is preferably 30 through 150 [mg KOH/g].

(Method of Measuring the Hydroxyl Group Value)

The hydroxyl group value was measured according to the JIS K 0070 (1992). The hydroxyl group value can be defined as the value in terms of mg of the potassium hydroxide required to neutralize the acetic acid bonded with the hydroxyl group, when 1 g of the sample is acetylated. To put it more specifically, the following steps were taken: weighing X g (about 1 g) of sample accurately; putting it into a flask; adding 20 ml of acetylation reagent (pyridine added to 20 ml of acetic anhydride to get 400 ml) accurately thereto; providing the outlet of the flask with an air cooling tube; healing the solution in a glycerine bath having a temperature of 95 through 100 degrees Celsius; cooling the solution after the lapse of one hour and 30 minutes; and adding 1 ml of purified water 1 ml through the air cooling tube so that the acetic anhydride was decomposed into acetic acid. This was followed by the step of titration by a potential difference titration apparatus using a 0.5 mol/L potassium hydroxide ethanol solution. The inflection point of the titration curve having been obtained was defined as a terminal point. Then titration was carried out in an idle test wherein a sample was not put therein. Thus, the inflection point of the titration curve was obtained, and the hydroxyl group value was calculated according to the following Equation.

Hydroxyl group value={(B−C)×f×28.05/X}+D where B denotes the amount (ml) of 0.5 mol/L potassium hydroxide ethanol solution used in the idle test, C indicates the amount (ml) of 0.5 mol/L potassium hydroxide ethanol solution used in the titration, f shows the factor of 0.5 mol/L potassium hydroxide ethanol solution, D represents an acid value, and 28.05 is equivalent to a half of 56.11 as 1 mol potassium hydroxide.

The above-mentioned polymer X and polymer Y each excels in compatibility with a cellulose ester. Also these polymers have neither evaporation nor volatilization, these polymers are excellent in manufacturing efficiency, and their permanence properties as a protection film for polarizing plates are preferable, and their water vapour permiability is small, and thy are excellent in dimensional stability.

The contents of the polymers X and Y in the cellulose ester film preferably meet the following Formulae (i) and (ii): assuming that the content of the polymer X is Xg (% by mass=the mass of the polymer X/the mass of the cellulose ester×100), and that of the polymer Y is Yg (% by mass), $$5 \leq Xg+Yg \leq 35 \text{ (\% by mass)} \qquad \text{Formula (i)}$$

$$0.05 \leq Yg/(Xg+Yg) \leq 0.4 \qquad \text{Formula (ii)}$$

where Formula (i) is preferably in the range from 10 through 25% by mass (or weight).

When the total amount of the polymers X and Y must be 5% by mass or more; a sufficient reduction in retardation value Rt can be achieved. Further, when the total amount is 35% by mass or less; the adhesiveness of the polarizer PVA will be excellent.

Further, after forming the polymer layer, when an optical anisotropic property is provided to the polymer layer by stretching the support, stretching spots hardly occur, whereby a display device being excellent in visibility can be provided.

The polymers X and Y as materials constituting the aforementioned doping solution can be directly added and dissolved. Alternatively, they can be put into the doping solution after having been dissolved in the organic solvent for dissolving the cellulose ester.

A cellulose ester used as polarizing plate protective films A1, A2, B1, B2 used in the present invention, especially, a cellulose ester used as a support of an optical compensation film or a material of cellulose ester film Y in the present invention is preferably a lower fatty acid ester of a cellulose. In the lower fatty acid ester of a cellulose, the lower fatty acid represents one having carbon atoms of 6 or fewer, including, for example: cellulose acetate, cellulose propionate, cellulose butyrate, cellulose acetate phthalate and mixed fatty acid esters of for example: cellulose acetatepropionate and cellulose acetatebutyrate disclosed in JP-A 10-45804, JP-A 8-231761, and U.S. Pat. No. 2,319,052. Or, an ester of an aromatic carboxylic acid and a cellulose and a cellulose acylrate described in Japanese Patent O.P.I. Publication No. 2002-179701, Japanese Patent O.P.I. Publication No. 2002-265639, and Japanese Patent O.P.I. Publication No. 2002-265638 are also preferably used. Among these, as a lower-fatty-acid ester of a cellulose used especially preferably, cellulose triacetate, cellulose acetatepropionate and Cellulose acetate butyrate are specifically preferable. These cellulose esters are preferably also used in combination.

In the case of a cellulose triacetate, a cellulose triacetate having an average acetylation degrees (an amount of jointed acetic acid) of 54.0-62.5% is used preferably, and especially a cellulose triacetate having an average acetylation degree of 58.0-62.5% is more desirable.

Another preferable cellulose ester besides cellulose triacetate, is one having an acyl group with from 2 to 4 carbon atoms as a substituent, and simultaneously satisfying the following formulas (I) and (II) when X represents the substitution degree of an acetyl group, while Y represent the substitution degree of a fatty acid ester group with from 3 to 22 carbon atoms:

$$2.8 \leq X+Y \leq 3.0 \qquad \text{Formula (I)}$$

$$1.0 \leq X \leq 2.95 \qquad \text{Formula (II)}$$

Especially, cellulose acetate propionate with $1.0 \leq X \leq 2.95$ and $0.1 \leq Y \leq 2.0$ is preferable. A hydroxyl group remains in the part where acyl substitution is not carried out. These esters may be prepared through any well known method in the art.

Cellulose ester can be prepared using cotton linter, wood pulp or kenaf as starting materials which may be used alone or in combination. It is particularly preferable to use a cellulose ester prepared from cotton linter (hereafter described merely as linter) or from wood pulp.

If the molecular weight of a cellulose ester is large, the rate of change of an elastic modulus due to heat will become small. However, if the molecular weight is raised too much, the viscosity of a cellulose ester solution will become high too much, and a manufacturing efficiency will fall. The molecular weight of a cellulose ester is preferably 30,000-200,000 in number average molecular weight (Mn), and more preferably 40,000-170,000.

As for a cellulose ester, it is desirable that when 1 g of a cellulose ester is added into 20 ml of pure water (electrical conductivity is 0.1 µS/cm or less, pH is 6.8), and stirred under a nitrogen atmosphere at 25 degrees C. for 1 hr, PH is 6-7 and an electrical conductivity 1-100 µS/cm. When pH is 6 or less, there is a fear that a remaining organic acid advances deterioration of a cellulose at the time of heating melting. On the other hand, when pH is 7 or high, there is a fear that hydrolysis may be advanced. Moreover, when the electrical conductivity is 100 µS/cm or more, since many remaining ions comparatively exist, it may be considered that it becomes a factor to deteriorate cellulose in the case of heating melting.

(Plasticizer)

A cellulose ester film used in the present invention may contain a plasticizer, a UV absorber, an antioxidant, etc used conventionally. Especially, when adding these additives to the cellulose ester film Y, it is desirable that these are contained to an extent not to remarkably raise Retardation Rt.

The following plasticizers may also be usable in the cellulose ester film of the present invention.

Specific examples of the phosphoric acid ester based plasticizer include phosphoric acid alkyl esters such as triacetyl phosphate and tributyl phosphate; phosphoric acid cycloalkyl esters such as tricyclopentyl phosphate and cyclohexyl phosphate; and phosphoric acid aryl esters such as triphenyl phosphate, tricresyl phosphate, cresylphenyl phosphate, octyldiphenyl phosphate, diphenylbiphenyl phosphate, trioctyl phosphate, tributyl phosphate, trinaphtyl phosphate, trixylyl phosphate, trisortho-biphenyl phosphate. The substituent groups for these may be the same or different, and may be further substituted. The substituent groups may be a mix of an alkyl group, a cycloalkyl group and an aryl group, and the substituent groups may be bonded to each other via covalent bond.

Examples of the phosphoric acid ester also include phosphate esters, for example: alkylenebis(dialkylphosphate) such as ethylenebis(dimethylphosphate) or butylenebis(diethylphosphate); alkylenebis(diarylphosphate) such as ethylenebis(diphenylphosphate) or propylenebis(dinaphtylphosphate); arylenebis(dialkylphosphate) such as phenylenebis(dibutylphosphate) or biphenylenebis(dioctylphosphate); and arylenebis(diarylphosphates) such as phenylenebis (diphenylphosphate) or naphtylenebis(ditriylphosphate). These substituent groups may be the same or different, and may be further substituted. The substituent groups may be a mixture of an alkyl group, cycloalkyl groups and aryl groups, and the substituent groups may be bonded to each other via covalent bond.

Furthermore, a part of the structure of the phosphate ester may be a part of the polymer or may be systematically included as a pendant. It may also be introduced into a part of the molecular structure of the additive such as the antioxidant, the acid scavenger, the ultraviolet light absorber. Of the compounds listed above, aryl phosphate ester and arylenebis(diarylphosphate) are preferable, and more specifically, triphenyl phosphate and phenylenebis(diphenylphosphate) are preferable.

Ethylene glycol ester based plasticizer: Specific examples of an ethylene glycol ester based plasticizer include: ethylene glycol alkyl ester based plasticizers such as ethylene glycol diacetate and ethylene glycol dibutyrate; ethylene glycol cycloalkyl ester based plasticizers such as ethylene glycol dicyclopropyl carboxylate and ethylene glycol dicyclohexyl carboxylate; and ethylene glycol aryl ester based plasticizers such as ethylene glycol dibenzoate and ethylene glycol di-4-methyl benzoate. These alkylate groups, cycloalkylate groups and arylate groups may be the same or different and may further be substituted. The substituent groups may be a mixture of alkylate groups, cycloalkylate groups and arylate groups, and the substituent groups may be bonded to each other by covalent linkage. Further, the ethylene glycol portions may be substituted and the ethylene glycol ester part of the structure may be part of the polymer or may be systematically included as a pendant. It may also be introduced into a part of the molecular structure of the additives such as an antioxidant, an acid scavenger, and an ultraviolet light absorber.

Glycerin ester based plasticizers: Examples of a glycerin ester based plasticizer include: glycerin alky esters such as triacetin, tributylin, glycerin diacetate caprylate and glycerin oleate propionate; glycerin cycloalkyl esters such as glycerin tricyclopropyl carboxylate, and glycerin tricyclohexyl carboxylate; glycerin aryl esters such as glycerin tribenzoate and glycerin 4-methylbenzoate; diglycerin alkyl esters such as diglycerin tetraacetylate, diglycerin tetrapropionate, diglycerin acetate tri caprylate and diglycerin tetralaurate; diglycerin cycloalkyl esters such as diglycerin tetracylobutyl carboxylate and diglycerin tetracylopentyl carboxylate; and diglycerin aryl esters such as diglycerin tetrabenzoate and diglycerin 3-methyl benzoate. These alkylate groups, cycloalkyl carboxylate groups and arylate groups may be same or different and may further be substituted. The substituent groups may be a mixture of an alkylate group, a cycloalky carboxylate group and an arylate groups, and the substituent groups may be bonded to each other via covalent bond. Further, the glycerin and diglycerin portions may be substituted and a partial structure of the glycerin ester or diglycerin ester may be a part of the polymer or may be systematically included as a pendant. It may also be introduced into a part of the molecular structure of the additive such as an antioxidant, an acid scavenger, and an ultraviolet light absorber.

Polyhdric alcohol ester based plasticizers: Specific examples of polyhdric alcohol ester based plasticizers include the polyhdric alcohol ester based plasticizers disclosed in JP-A 2003-12823, paragraphs 30-33.

These alkylate groups, cycloalkyl carboxylate groups and arylate groups may be the same or different and may further be substituted. The alkylate groups, cycloalky carboxylate groups and arylate groups may be mixed, and the substituent groups may be bonded to each other via covalent bond. Furthermore, the polyhydric alcohol portion may be substituted and a partial structure of the polyhydric alcohol may be a part of the polymer or may be systematically included as a pendant. It may also be introduced into a part of the molecular structure of the additives such as an antioxidant, an acid scavenger or an ultraviolet light absorber.

Dicarboxylic acid ester based plasticizer: Specific examples of a dicarboxylic acid ester based plasticizer include: alkyl dicarboxylic acid cycloalkyl ester based plasticizers such as didodecyl malonate (C1), dioctyl adipate (C4) and dibutyl cebacate (C8); alkyl dicarboxylic acid cycloalkyl ester based plasticizers such as dicyclopentyl succinate and dicyclohexyl adipate; alkyl dicarboxylic acid aryl ester based plasticizers such as diphenyl succinate and di-4-methyl phenyl glutarate; cycloalkyl dicarboxylic acid alkyl ester based plasticizers such as dihexyl-1,4-cyclohexane dicarboxylate and didecyl bicyclo[2.2.1]heptane-2,3-dicarboxylate; cycloalkyl dicarboxylic acid cycloalkyl ester based plasticizers such as dicyclohexyl-1,2-cyclobutane dicarboxylate and dicyclopropyl-1,2-cyclohexyl dicarboxylate; cycloalkyl dicarboxylic acid aryl ester based plasticizers such as diphenyl-1,1-cyclopropyl dicarboxylate and di-2-naphthyl-1,4-cyclohexane dicarboxylate; aryl dicarboxylic acid alkyl ester based plasticizers such as diethyl phthalate, dimethyl phthalate, dioctyl phthalate, dibutyl phthalate and di-2-ethylhexyl phthalate; aryl dicarboxylic acid cycloalkyl ester based plasticizers such as dicyclopropyl phthalate and dicyclohexyl phthalate; and aryl dicarboxylic acid aryl ester based plasticizers such as diphenyl phthalate and di-4-methylphenyl phthalate. These alkoxy groups and cycloalkoxy groups may be the same or different, and may also be monosubstituted and the substitution groups may be further substituted. The alkyl groups and the cycloalkyl groups may be mixed, and the substituent groups may be bonded to each other via covalent bond. Furthermore, the aromatic ring of the phthalic acid may be substituted and may be a multimer such as a dimer, a trimer or a tetramer. The phthalic acid ester part of the structure may be a part of the polymer or may be systematically included as a pendant. It may also be introduced into a part of the molecular structure of the additives such as an antioxidant, an acid scavenger and an ultraviolet light absorber.

Polyhydric carboxylic acid ester plasticizers: Specific examples of polyhydric carboxylic acid ester plasticizers include: alkyl polyhydric carboxylic acid alkyl ester based plasticizers such as tridodecyl tricarbalate and tributyl-mesobutane-1,2,3,4,-tetracarboxylate; alkyl polyhydric carboxylic acid cycloalkyl ester based plasticizers such as tricyclohexyl tricarbalate and tricyclopopyl-2-hydroxy-1,2,3-propane tricarboxylate; alkyl polyhydric carboxylic acid aryl ester based plasticizers such as triphenyl-2-hydroxyl-1,2,3-propane tricarboxylate, tetra-3-methylphenyl tetrahydrofuran-2,3,4,5-tetracarboxylate; cycloalkyl polyhydric carboxylic acid alkyl ester based plasticizers such as tetrahexyl-1,2,3,4-cyclobutane tetracarboxylate and tetrabutyl-1,2,3,4,-dicyclopentane tetracarboxylate; cycloalkyl polyhydric carboxylic acid cycloalkyl ester based plasticizers such as tetracyclopropyl-1,2,3,4-cyclobutane tetracarboxylate and tricyclohexyl-1,3,5-cyclohexyl tricarboxylate; cycloalkyl polyhydric carboxylic acid aryl ester based plasticizers such as triphenyl-1,3,5-cyclohexyl tricarboxylate, hexa-4-methylphenyl-1,2,3,4,5,6-cyclohexyl hexacarboxylate; aryl polyhdric carboxylic acid alkyl ester based plasticizers such as tridodecyl benzene-1,2,4-tricarboxylate and tetraoctylbenzene-1,2,4,5-tetracarboxylate; aryl polyhydric carboxylic acid cycloalkyl ester based plasticizers such as tricyclopentyl benzene-1,3,5-tricarboxylate and tetracyclohexyl benzene-1,2, 3,5 tetracarboxylate; and aryl polyhdric carboxylic acid aryl ester based plasticizers such as triphenyl benzene-1,3,5-tetracarboxylate and hexa-4-methylphenyl benzene-1,2,3,4,5, 6-hexacarboxylate. These alkoxy groups and cycloalkoxy groups may be the same or different, and may also be substituted and the substitution groups may be further substituted. The alkyl groups and the cycloalkyl groups may be mixed, and the substituent groups may be bonded to each other by common bonds. Furthermore, the aromatic ring of the phthalic acid may be substituted and may be a polymer such as a dimer, trimer, tetramer and the like. The phthalic acid ester part of the structure may be a part of the polymer or may be systematically included as a pendant. It may also be introduced into a part of the molecular structure of the additive such as an antioxidant, an acid scavenger and an ultraviolet light absorber.

(UV Absorber)

Films used in a liquid crystal display, for example, a polarizing plate protective film, preferably contain a UV (referred to as ultraviolet rays) absorber which prevents deterioration of the liquid crystal cell or the polarizer when used in outdoor. Also in polarizing plate protective films A and B of the present invention, a UV absorber is preferably used. Specifically, polarizing plate protective film A preferably to contains a UV absorber, and it is more preferable to contain a polymer UV absorber which will be described later, in order to adjust the stiffness of the present invention.

A UV absorber preferably has an excellent ability to absorb UV rays of which wavelength is not more than 370 nm, while the absorbance for visible rays with a wavelength of 400 nm or more is as small as possible, and the transmittance is preferably 50% or more. Specifically, the transmittance at the wavelength of 370 nm is preferably 10% or less and more preferably 5% or less. Examples of a UV absorber usable in the present invention include: oxybenzophenone, benzotriazole, salicylate ester, benzophenone, cyanoacrylate, triazine and a nickel complex. Of these, preferable compounds include benzotriazole because of little coloring. Examples of preferably usable UV absorber include: TINUVIN 109, TINUVIN 171, TINUVIN 326, TINUVIN 327 and TINUVIN 328 produced by Ciba Specialty Chemicals Inc. Since a low molecular weight UV absorber tends to deposit on the web or evaporate while the film is produced, like a plasticizer, the content is preferably 1-10% by weight.

In the present invention, a polymer UV absorber is preferably incorporated in the cellulose ester film since the polymer UV absorber is more difficult to deposit than the above mentioned low molecular weight UV absorber, whereby UV rays are thoroughly blocked without losing dimensional stability, retention of the UV absorber, anti-permeability, while preventing phase separation of the UV absorber in the film. As a polymer UV absorber usable in the present invention, the polymer UV absorbers disclosed in JP-A No. 6-148430 and polymers containing a UV absorbing monomer can be used without limitation.

It is preferable in the present invention that a UV absorbing copolymer (also referred to as a polymer UV absorber) obtained from a UV absorbing monomer represented by Formula (2) is incorporated in the cellulose ester film.

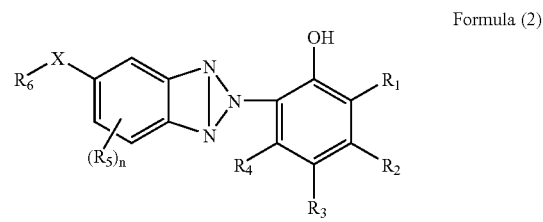

Formula (2)

wherein n represents an integer of 0-3, $R_1$-$R_5$ each represent a hydrogen atom, a halogen atom or a substituent, X represents —COO—, CONR$_7$—, —OCO— or —NR$_7$CO—, $R_6$ represents a hydrogen atom, an alkyl group, a cycloalkyl group, an alkenyl group or an alkynyl group, $R_7$ represents a hydrogen atom, an alkyl group or an cycloalkyl group, provided that the group represented by $R_6$ has a polymerizable group as a substructure.

In Formula (2), n represents an integer of 0-3. When n is 2 or more, plural $R_5$ may be the same or may be different to each other and may be combined to form a 5-7 membered ring.

$R_1$-$R_5$ each represent a hydrogen atom, a halogen atom or a substituent. Examples of a halogenatom include: a fluorine atom, a chlorine atom, a bromine atom and an iodine atom. Of these, preferable are, for example, a fluorine atom or a chlorine atom. Examples of a substituent include: alkyl groups (for example, a methyl group, an ethyl group, an isopropyl group, a hydroxyethyl group, a methoxymethyl group, a trifluoromethyl group and a t-butyl group), alkenyl groups (for example, a vinyl group, an allyl group and a 3-butene-1-yl group), aryl groups (for example, a phenyl group, a naphthyl group, a p-tolyl group and a p-chlorophenyl group), heterocycle groups (for example, a pyridyl group, a benzimidazolyl group, a benzthiazolyl group and a benzoxazolyl group), alkoxy groups (for example, a methoxy group, an ethoxy group, an isopropoxy group and a n-butoxy group), aryloxy groups, (for example, a phenoxy group), heterocycleoxy groups (for example, a 1-phenyltetrazole-5-oxy group and a 2-tetrahydropyranyloxy group), acyloxy groups (for example, an acetoxy group, a pivaloyloxy group and a benzoyloxy group), acyl groups (for example, an acetyl group, a propanoyl group and a butyroyl group), alkoxycarbonyl groups (for example, a methoxycarbonyl group and an ethoxycarbonyl group), aryloxycarbonyl groups (for example, a phenoxycarbonyl group), carbamoyl groups (for example, a methylcarbamoyl group, an ethylcarbamoyl group and a dimethylcarbamoyl group), amino groups, alkylamino groups (for example, a methylamino group, an ethylamino group and a diethylamino group), anilino groups (for example, an anilino group and a N-methylanilino group), acylamino groups (for example, an acetylamino group and a propionylamino group), a hydroxyl group, cyano groups, nitro groups, sulfonamide groups (for example, a methanesulfonamide group and a benzenesulfonamide group), sulfamoylamino groups (for example, a dimethylsulfamoylamino group), sulfonyl groups (for example, a methanesulfonyl group, a butanesulfonyl group and a phenylsulfonyl group), sulfamoyl groups (for example, an ethylsulfamoyl group and a dimethylsulfamoyl group), sulfonylamino groups (for example, a methanesulfonylamino group and a benzenesulfonylamino group), ureido groups (for example, a 3-methylureido group, a 3,3-dimethylureido group and a 1,3-dimethylureido group), imide groups (for example, a phthalimide group), silyl groups (for example, a trimethylsilyl group, a triethylsilyl group and a t-butyldimethylsilyl group), alkylthio groups (for example, a methylthio group, an ethylthio group and an n-butylthio group), and arylthio groups (for example, a phenylthio group). Of these, preferable are, for example, alkyl groups and an aryl groups.

In Formula (2), the groups represented by $R_1$-$R_5$ each may be further substituted, if possible and neighboring groups of $R_1$-$R_4$ may be combined to form a 5-7 membered ring.

$R_6$ represents a hydrogen atom, an alkyl group, a cycloalkyl group, an alkenyl group or an alkynyl group. Examples of an alkyl group include: a methyl group, an ethyl group, a propyl group, an isopropyl group, an n-butyl group, an isobutyl group, a t-butyl group, an amyl group, an isoamyl group and a hexyl group. The above alkyl groups may further have a halogen atom or a substituent. Examples of a halogen atom include: a fluorine atom, a chlorine atom, a bromine atom and an iodine atom. Examples of a substituent include: acyl groups (for example, an acetyl group, a propanoyl group and a butyroyl group), alkoxy groups (for example, a methoxy group, an ethoxy group, an isopropoxy group and a n-butoxy group), amino groups, alkylamino groups (for example, a methylamino group, an ethylamino group and a diethylamino group), acylamino groups (for example, an acetylamino group and a propionylamino group), a hydroxyl group, cyano groups, carbamoyl groups (for example, a methylcarbamoyl group, an ethylcarbamoyl group and a dimethylcarbamoyl group), acyloxy groups (for example, an acetoxy group and a pivaloyloxy group) and alkoxycarbonyl groups (for example, a methoxycarbonyl group and an ethoxycarbonyl group).

Examples of a cycloalkyl group include: saturated cyclohydrocarbon groups such as a cyclopentyl group, a cyclohexyl group, a norbornyl group and an adamantyl group, which may be further substituted or may not be substituted.

Examples of an alkenyl group include: an ethynyl group, a butadiyl group, a propargyl group, a 1-methyl-2-propynyl group, a 2-butyny group and a 1,1-dimethyl-2-propynyl group. Of these preferably are, for example, an ethynyl group and a propargyl group.

Examples of an alkynyl group include: an ethynyl group, butadiyl group, a propargyl group, 1-methyl-2-propynyl group, 2-butyny group, 1,1-dimethyl-2-propynyl group. Of these, preferable are, for example, an ethynyl group and a propargyl group.

In Formula (2), X represents —COO—, $CONR_7$—, —OCO— or —$NR_7CO$—.

$R_7$ represents a hydrogen atom, an alkyl group and a cycloalkyl group. Examples of an alkyl group include: a methyl group, an ethyl group, a propyl group, an isopropyl group, a n-butyl group, an isobutyl group, a t-butyl group, an amyl group, an isoamyl group and a hexyl group. Each of these alkyl groups may further have a halogen atom or a substituent. Examples of a halogen atom include: a fluorine atom, a chlorine atom, a bromine atom and an iodine atom. Examples of a substituent include: acyl groups (for example, an acetyl group, a propanoyl group and a butyroyl group), alkoxy groups (for example, a methoxy group, an ethoxy group, an isopropoxy group and a n-butoxy group), amino groups, alkylamino groups (for example, a methylamino group, an ethylamino group and a diethylamino group), anilino groups (for example, an anilino group and an N-methyl anilino group), acylamino groups (for example, an acetylamino group and a propionylamino group), a hydroxyl group, cyano groups, carbamoyl groups (for example, a methylcarbamoyl group, an ethylcarbamoyl group and a dimethylcarbamoyl group), acyloxy groups (for example, an acetoxy group and a pivaloyloxy group) and alkoxycarbonyl groups (for example, a methoxycarbonyl group and an ethoxycarbonyl group).

Examples of a cycloalkyl group include saturated cyclic hydrocarbons, such as a cyclopentyl group, a cyclohexyl group, a norbornyl group, and an adamantyl group, which may be further substituted or may not be substituted.

In the present invention, the polymerizable group includes an unsaturated ethylenic polymerizable group or a di-functional condensation-polymerizable group, and preferably an unsaturated ethylenic polymerizable group. Concrete examples of the unsaturated ethylenic polymerizable group include a vinyl group, an allyl group, an acryloyl group, a methacryloyl group, a styryl group, an acrylamido group, a methacrylamido group, a vinyl cyanide group, a 2-cyanoacryloxy group, a 1,2-epoxy group and a vinyl ether group and preferably the vinyl group, the acryloyl group, the methacryloyl group, the acrylamido group and the methacrylamido group. To have a polymerizable group as a partial structure means that the polymerizable groups are bonded directly or through a linking group of divalent or more. Examples of a linking group of divalent or more include: alkylene groups (such as a methylene group, a 1,2-ethylene group, a 1,3-propylene group, a 1,4-butylene group and a cyclohexane-1, 4-diyl group); alkenylene groups (such as an ethene-1,2-diyl group and a butadiene-1,4-diyl group); alkynylene groups (such as an ethyne-1,2-diyl group, a butane-1,3-diyl-1,4-diyl); and hetero atom linking groups (an oxygen atom, a sulfur atom, a nitrogen atom, a silicon atom and a phosphor atom). Of these, preferable are, for example, an alkylene group and a hetero atom linking group. These groups may be combined to form a composite bonding group. The weight average molecular weight of the polymer derived from the UV absorbing monomer is 2,000-30,000, and preferably 5,000-20,000.

The weight average molecular weight of the UV absorbing copolymer can be controlled by known molecular weight controlling methods. For controlling the molecular weight, for example, a method can be applied in which a chain transfer agent such as carbon terachloride, laurylmercptane or octyl thioglycolate is employed. The polymerization is usually performed at a temperature of from a room temperature to 130° C., and preferably 50-100° C.

The UV absorbing polymer employed in the present invention may be a homopolymer derived from a UV absorbing monomer or may be a copolymer derived from the UV absorbing monomer and another polymerizable monomer. Examples of the other monomer capable of polymerizing include unsaturated compounds, for example, styrene derivatives (such as styrene, α-methylstyrene, o-methylstyrene, m-methylstyrene, p-methylstyrene and vinylnephthalene); acrylate derivatives (such as methyl acrylate, ethyl acrylate, propyl acrylate, butyl acrylate, i-butyl acrylate, t-butyl acrylate, octyl acrylate, cyclohexyl acrylate and benzyl acrylate); methacrylate derivatives (such as methyl methacrylate, ethyl methacrylate, propyl methacrylate, butyl methacrylate, i-butyl methacrylate, t-butyl methacrylate, octyl methacrylate and cyclohexyl methacrylate); alkyl vinyl ethers (such as methyl vinyl ether, ethyl vinyl ether and butyl vinyl ether); alkyl vinyl esters (such as vinyl formate, vinyl acetate, vinyl butyrate, vinyl capronate and vinyl stearate); crotonic acid; maleic acid; fumaric acid; itaconic acid; acrylonitrile; methacrylonitrile; vinyl chloride; vinylidene chloride; acrylamide; and methacrylamide. Of these, for example, methyl acrylate, methyl methacrylate and vinyl acetate are preferred.

It is also preferable that the component other than the UV absorbing monomer in the polymer derived from the UV absorbing monomer contains a hydrophilic ethylenic unsaturated monomer.

As the hydrophilic ethylenic unsaturated monomer, a hydrophilic compound having a polymerizable unsaturated double bond in the molecular thereof is employable without any limitation. For example, a unsaturated carboxylic acid such as acrylic acid and methacrylic acid, an acrylate and methacrylate each having a hydroxyl group or an ether bond such as 2-hydroxyethyl methaceylate, 2-hydroxypropyl methacrylate, tetrahydrfurfuryl methacrylate, 2-hydroxyethyl acrylate, 2-ydroxypropyl acrylate, 2,3-dihydroxy-2-methylpropyl methacrylate, tetrahydrofurfuryl acrylate, 2-ethoxyethyl acrylate, diethylene glycol ethoxylate acrylate and 3-methoxybutylbutyl acrylate, acrylamide, an N-substituted (meth)acrylamido such as N,N-dimethyl(meth)acrylate, N-vinylpyrrolidone and N-vinyloxazolidone are employable.

As the hydrophilic ethylenic unsaturated monomer, a (meth)acrylate having a hydroxyl group or a carboxyl group in the molecule thereof is preferable, and 2-hydroxyethyl methacrylate, 20hydroxypropyl methacrylate, 2-hydroxyethyl acrylate and 2-hydroxypropyl acrylate are particularly preferable.

These polymerizable monomers can be copolymerized solely or in combination of two or more kinds together with the UV absorbing monomer.

In the present invention, the method for polymerizing the UV absorbing copolymer is not specifically limited and known methods such as radical polymerization, anion polymerization and cation polymerization can be widely applied. As the initiator for the radical polymerization, an azo compound and a peroxide compound such as azobisisobutylnitrile (AIBN), a diester of azobisisobutylic acid, benzoyl peroxide and hydrogen peroxide are employable. The solvent for polymerization is not specifically limited, and examples of usable solvent include an aromatic hydrocarbon type solvent such as toluene and chlorobenzene, a halogenized hydrocarbon type solvent such as dichloroethane and chloroform, a an ether type solvent such as tetrahydrofuran and dioxane, an amide type solvent such as dimethylformamide, an alcohol type solvent such as methanol, an ester type solvent such as methyl acetate and ethyl acetate, a ketone type solvent such as acetone, cyclohexanone and methyl ethyl ketone, and an aqueous solvent. Solution polymerization in which the polymerization is carried out in a uniform system, precipitation polymerization in which the formed polymer is precipitated, emulsion polymerization in which the polymerization is carried out in a micelle state and suspension polymerization carried out in a suspended state can be performed according to selection of the solvent. However, UV absorbing latex obtained via emulsion polymerization is not preferable to be used as an optical film.

The mixing ratio of the UV absorbing monomer, the polymerizable monomer capable of polymerizing with the UV absorbing monomer and the hydrophilic unsaturated monomer is suitably determined considering the compatibility of the obtained UV absorbing copolymer with the other transparent polymer and the influence on the transparency and the mechanical strength of the optical compensating film.

The content of the UV absorbing monomer in the polymer derived from the UV absorbing monomer is preferably 1-70%, and more preferably 5-60%, by weight. When the content of the UV absorbent monomer in the UV absorbing polymer is less than 1%, addition of a large amount of the UV absorbing polymer is necessary for satisfying the desired UV absorbing ability so that increasing in the haze or lowering in the transparency and the mechanical strength by the precipitation is caused. On the other hand, when the content of the UV absorbing monomer in the UV absorbing polymer exceeds 70% by weight, the transparent optical compensating film is difficultly obtained sometimes since the compatibility of the polymer with another polymer is lowered. Also, the workability in the film forming process and productivity are reduced due to the decrease in solubility in the solvent.

The hydrophilic ethylenic unsaturated monomer is preferably contained in the UV absorbing copolymer in a ratio of from 0.1 to 50% by weight. When the content is less than 0.1%, the improvement effect on the compatibility of the hydrophilic ethylenic unsaturated monomer cannot be obtained and when the content is more than 50% by weight, the isolation and purification of the copolymer becomes impossible. More preferable content of the hydrophilic ethylenic unsaturated monomer is from 0.5 to 20% by weight. When the hydrophilic group is substituted to the UV absorbing monomer itself, it is preferable that the total content of the hydrophilic UV absorbing monomer and the hydrophilic ethylenic unsaturated monomer is within the above-mentioned range.

For satisfying the content of the UV absorbing monomer and the hydrophilic monomer, it is preferable that the an ethylenic unsaturated monomer having no hydrophilicity is further copolymerized additionally to the above two monomers.

Two or more kinds of each of the UV absorbing monomer and hydrophilic or non-hydrophilic ethylenic unsaturated monomer may be mixed and copolymerized.

Typical examples of the UV absorbing monomer to be preferably employed in the present invention are listed below, but the monomer is not limited thereto.

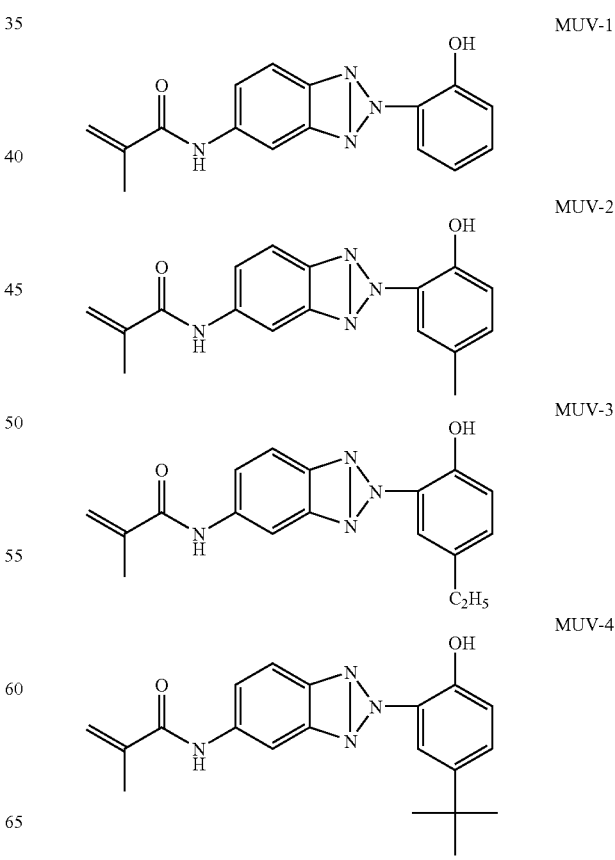

MUV-5
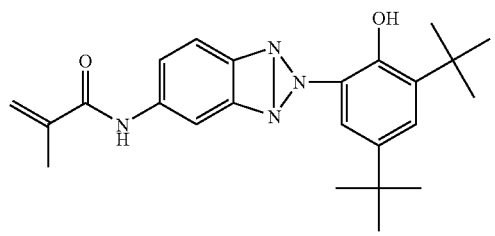
MUV-12
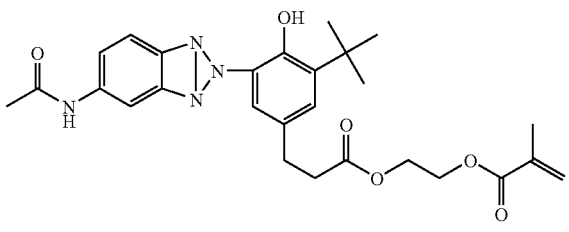
MUV-6
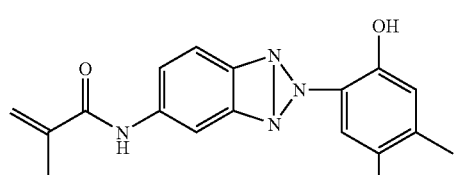
MUV-13
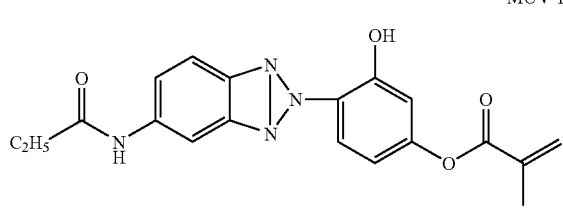
MUV-7
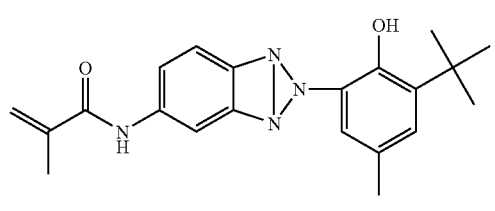
MUV-14
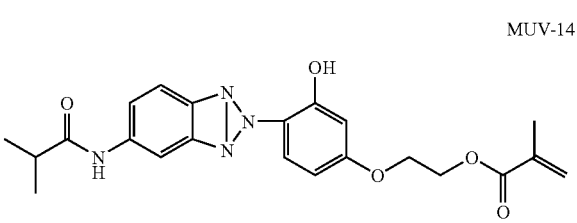
MUV-8
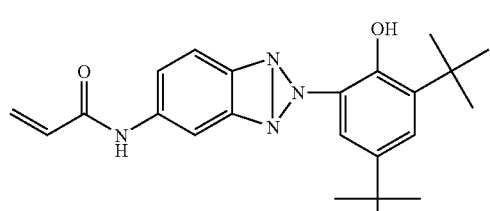
MUV-15
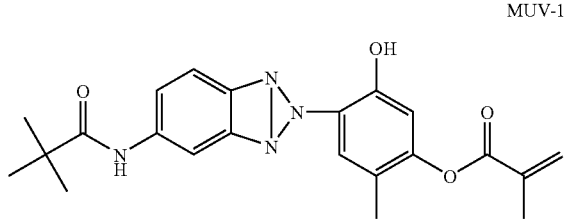
MUV-9
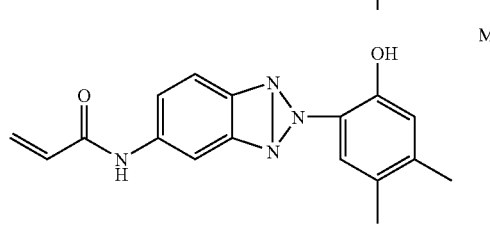
MUV-16
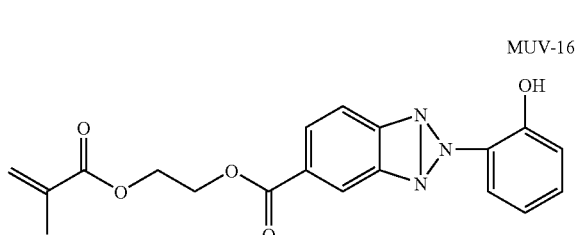
MUV-10
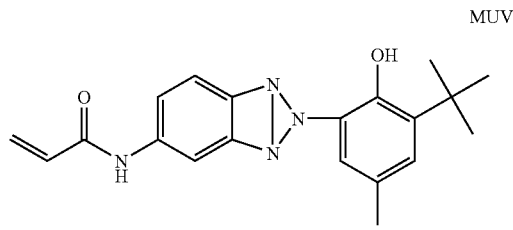
MUV-17
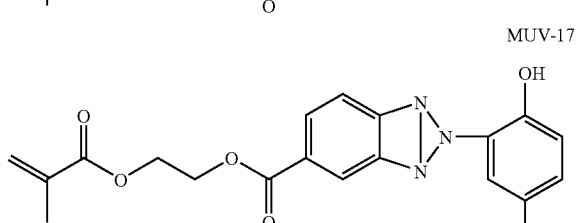
MUV-11
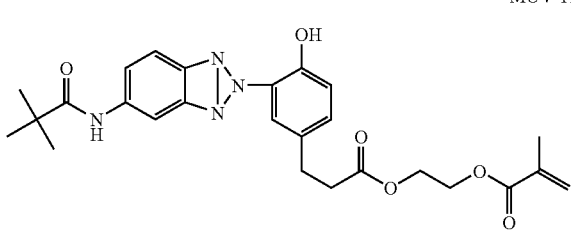
MUV-18
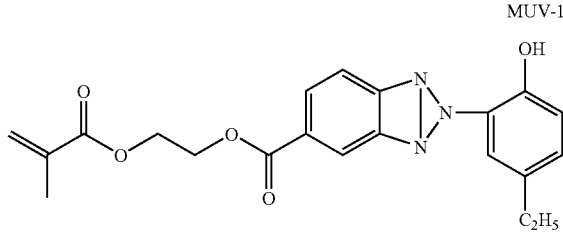

-continued
MUV-19
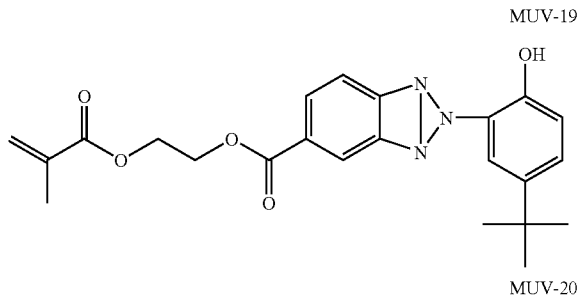
MUV-20
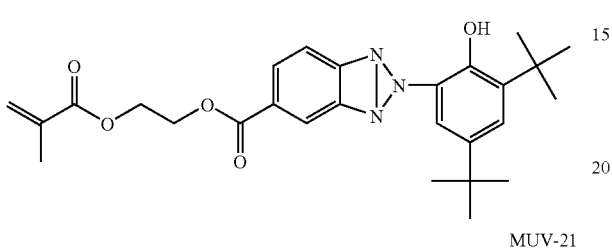
MUV-21
MUV-22
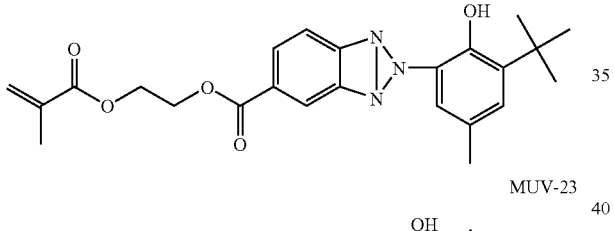
MUV-23
MUV-24
MUV-25
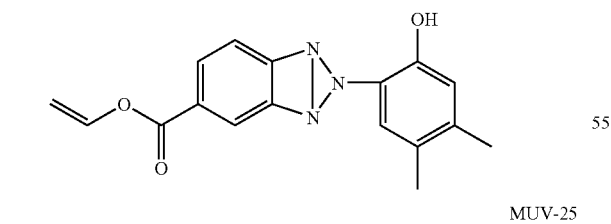
-continued
MUV-26
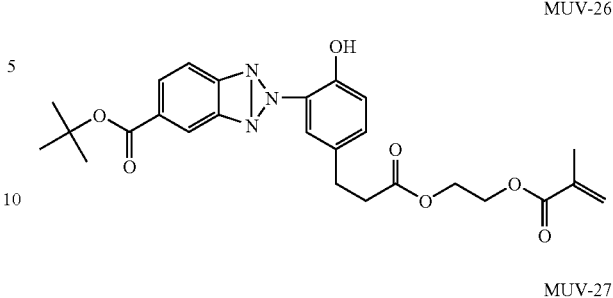
MUV-27
MUV-28
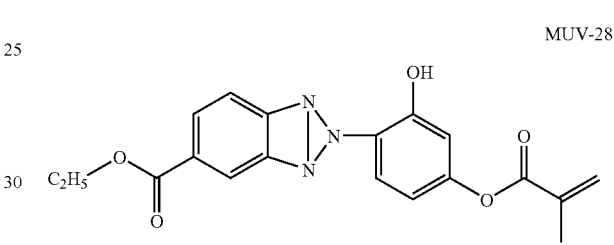
MUV-29
MUV-30
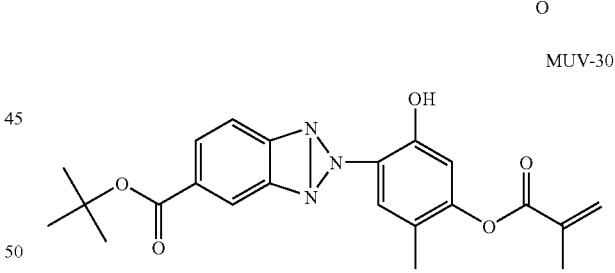
MUV-31
MUV-32
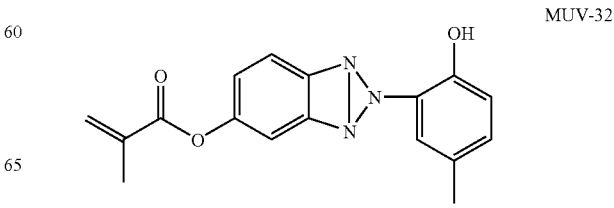

MUV-33
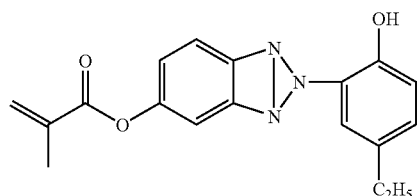
MUV-34
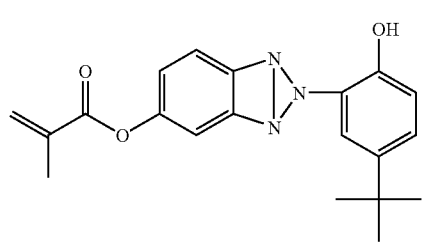
MUV-35
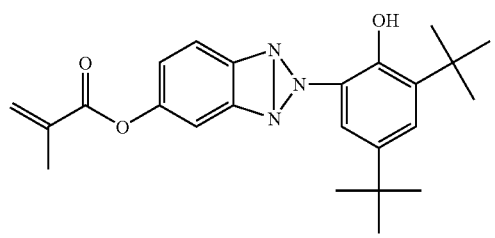
MUV-36
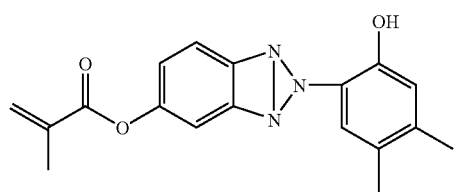
MUV-37
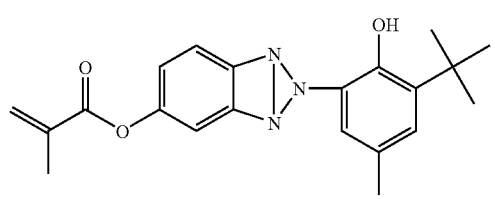
MUV-38
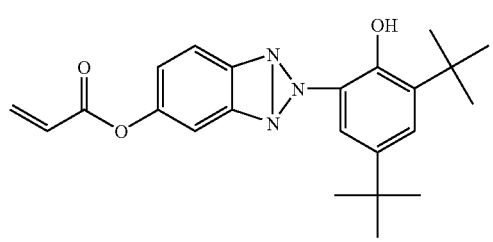
MUV-39
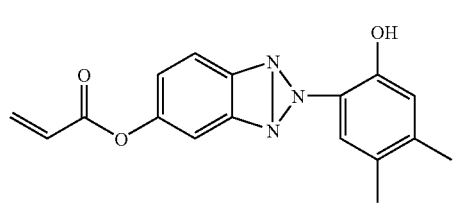
MUV-40
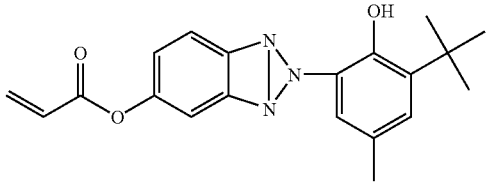
MUV-41
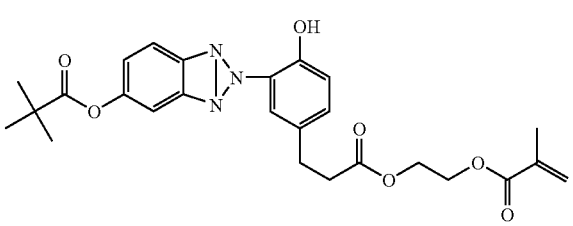
MUV-42
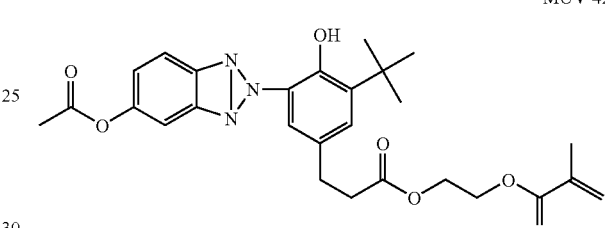
MUV-43
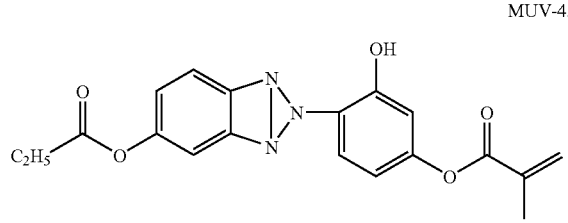
MUV-44
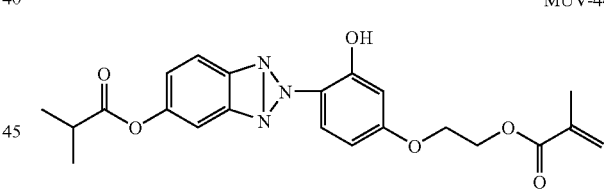
MUV-45
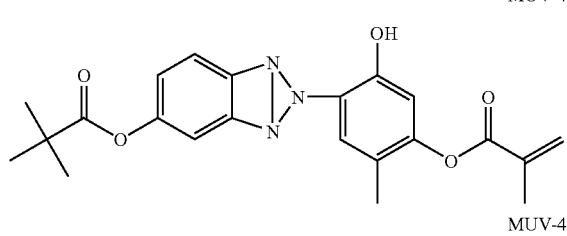
MUV-46
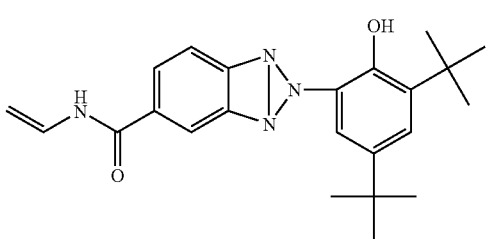

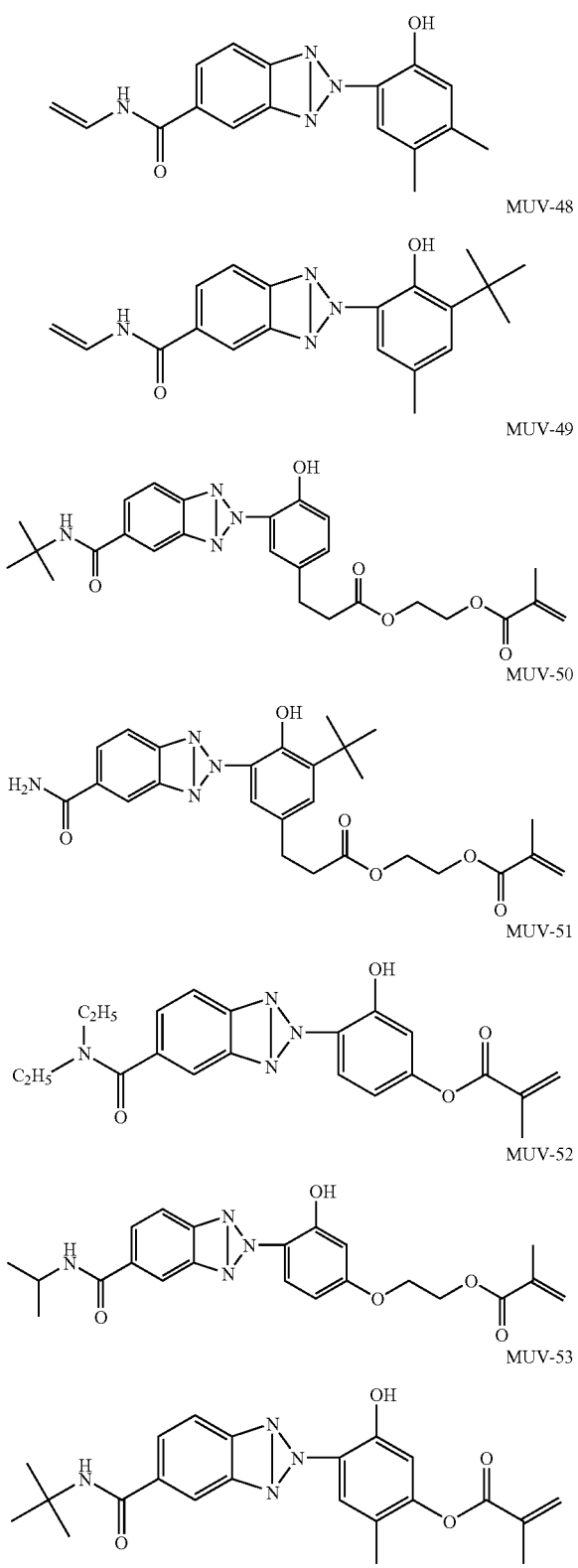

The UV absorbents, UV absorbing monomers and their intermediates to be employed in the present invention can be synthesized by referring published documents. For example U.S. Pat. Nos. 3,072,585, 3,159,646, 3,399,173, 3,761,373, 4,028,331 and 5,683,861, European Patent No. 86,300,416, Japanese Patent O.P.I. Publication Nos. 63-227575 and 63-185969, "Polymer Bulletin" V. 20 (2), 169-176, and "Chemical Abstracts V. 109, No. 191389 can be referred for synthesizing.

The UV absorbent and the UV absorbing polymer to be used in the present invention can be employed together with a low or high molecular weight compound or an inorganic compound according to necessity on the occasion of mixing with the other transparent polymer. For example, it is one of preferable embodiments that the UV absorbent polymer and another relatively low molecular weight UV absorbent are simultaneously mixed with the other transparent polymer. Moreover, simultaneously mixing of an additive such as an antioxidant, a plasticizer and a flame retardant is also one of preferable embodiments.

The ultraviolet light absorber and the ultraviolet light absorbing polymer used in this invention may be added to a cellulose ester film by being included in the optical film or by being coated on the cellulose ester film. In the case of inclusion in the cellulose ester film, direct addition and in-line addition are favorable. The in-line addition is a method in which the ultraviolet light absorber and the ultraviolet light absorbing polymer are dissolved beforehand in an organic solvent (such as methanol, ethanol, methylene chloride) and dissolved, and then added to the dope composition using an in-line mixer or the like.

The amount of the ultraviolet light absorber and the ultraviolet light absorbing polymer used in this invention is not fixed and depends of type of compound and the conditions for use. However, in the case of the ultraviolet light absorber, for 1 $m^2$ of cellulose ester film, the amount is preferably in the range of 0.2-3.0 g, more preferably 0.4-2.0 g and 0.5-1.5 g is particularly preferable. In the case of the ultraviolet light absorbing polymer, for 1 $m^2$ of cellulose ester film, it is preferably in the range of 0.6-9.0 g, more preferably 1.2-6.0 g and even more preferably 1.5-3.0 g.

From the viewpoint of preventing deterioration of the liquid crystal, a substance in which absorbance of ultraviolet light having a wavelength of no more than 380 nm is excellent, and from the viewpoint of favorable liquid crystal display properties a substance with little absorbance of visible light below 400 nm is preferable. In this invention, it is preferable that at a wavelength of 380 nm, transparency is not more than 8%, and preferably not more than 4% and transparency of not more than 1% is particularly preferable.

As UV absorbent monomers available on the market, 1-(2-bezotriazole)-2-hydroxy-5-(vinyloxycarbonylethyl)-benzene UVM-1 and a reactive type UV absorbent 1-(2-benzotriazole)-2-hydroxy-5-(2-methacryloyloxyethyl)-benzene UVA 93, each manufactured by Ootsuka Chemical Co., Ltd., and similar compounds are employable in the present invention. They are preferably employed solely or in a state of polymer or copolymer but not limited thereto. For example, a polymer UV absorbent available on the market PUVA-30M, manufactured by Ootsuka Chemical Co., Ltd., is preferably employed. The UV absorbent may be used in combination of two or more kinds thereof. The method for adding the ultraviolet light absorber to the dope may be by dissolving the ultraviolet light absorber in an organic solvent such as alcohol, methyl chloride, dioxolane or methyl acetate, and then adding it to the dope, or alternatively the ultraviolet light absorber may be directly added to the dope composition.

An antioxidant may be included in the cellulose ester film of this invention. For example as described in Japanese Patent Application Laid-Open No. 5-197073, a peroxide decomposing agent, a radical chain-linking agent, or metal deactivator or an acid trapping agent may also be included. The amount in which these compounds are added is preferably in a weight ratio of 1 ppm -1.0%, and more preferably 10-1,000 ppm to the cellulose ester.

In the present invention, it is preferable that a fine particle such as a matting agent is included in the cellulose ester film, and examples of the fine particle matting agent include fine particles of inorganic compounds such as silicon dioxide, titanium dioxide, aluminum oxide, zirconium oxide, calcium carbonate, kaolin, talc, burned calcium silicate, hydrated calcium silicate, aluminum silicate, magnesium silicate, and calcium phosphate or cross-linked fine particles of high molecular weigh polymers Of these, silicon dioxide is preferable in view of reduced haze in the film. The average particle diameter of the secondary particles from among the fine particles is preferably in the range of 0.01-1.0 μm and the amount of these particles included is preferably in the range of 0.005-0.3 percent by weight of the cellulose ester. The particles such as the silicon dioxide particles are often surface treated using an organic substance, and this is preferable because it reduces haze in the film. Examples of the organic compound used in the surface treatment include halogens, alkoxysilanes (particularly alkoxysilanes having a methyl group), silazanes, and siloxanes. Particles having a larger average particle diameter have a greater matting effect, while particles having a smaller average particle diameter have excellent transparency. Thus among the particles, the primary particles preferably have an average primary particle size of 5-50 nm, and more preferably 7-16 nm. These particles are usually present in the cellulose ester film as an aggregate, and preferably form unevenness of 0.01-1.0 μm in the plane of the cellulose ester film. Examples of the silicon dioxide particles include Aerosil 200, 200V, 300, R972, R972V, R974, R202, R812, OX50, or TT600 (each manufactured by Aerosil Co., Ltd.), and of these, Aerosil 200V, R972, R972V, R974, R202, and R812, are preferred. Two or more of these matting agents may be combined and used. In the case where 2 or more matting agents are used, they may be mixed in a suitably selected proportion. In this case, matting agents which have different particle size and quality such as Aerosil 200V and R927V may be used in weight proportions in the range from 0.1:99.9 to 99.9:0.1

The method to produce the cellulose ester film of the present invention will now be described.

The method for preparing the cellulose ester dope of the present invention will be described. Flakes of cellulose ester are stirred into the dissolution vessel with an organic solvent, which is the main good solvent for the cellulose ester, and thereby dissolved and the dope is formed. Examples of the dissolution method include a method which is performed at normal pressure; a method which is performed below the boiling point of the main solvent; a method which is performed by applying pressure below the boiling point of the main solvent; a method which is performed by cold dissolution as described in Japanese Patent Application Laid-Open No. 9-95544, No. 9-95557, or No. 9-95538; and various dissolution methods performed under high pressure as disclosed in Japanese Patent Application Laid-Open No. 11-21379. After dissolution, the dope is filtered with a filtering material and then defoamed and sent to the next step. The cellulose ester concentration in the dope is between 10 and 35 percent by weight, and more preferably between 15 and 25 percent. In order to include the polymer useful in the present invention in a cellulose ester dope, the polymer is dissolved beforehand in an organic solvent and then added to the cellulose ester dope, and the method for addition, such as direct addition and the like is not limited. In this case the addition is done such that there is no cloudiness or phase separation of the polymer in the dope. The amount to be added is as described above.

Examples of good solvents of the cellulose ester include organic solvents such as, methyl acetate, ethyl acetate, amyl acetate, ethyl formate, acetone, cyclohexanone, methyl acetoacetata, tetrahydrofuran, 1,3-dioxolane, 4-methyl-1,3-dioxolane, 1,4-dioxane, 2,2,2-trifluoroethanol, 2,2,3,3-hexafluoro-1-propanol, 1,3-difluoro-2-propanol, 1,1,1,3,3,3-hexafluoro-2-methyl-2-propanol, 1,1,1,3,3,3-hexafluoro-2-propanol, 2,2,3,3,3-pentafluoro-1-propanol, nitroethane, 2-pyrrolidone, N-methyl-2-pyrrolidone, 1,3-dimethyl-2-imidazolidinone, methylene chloride, and bromopropane. Of these, methyl acetate, acetone and methylene chloride are preferably used. However, there is a tendency for non-chlorine organic solvents to be more preferable based on recent environmental issues. Low grade alcohols such as methanol, ethanol, butanol and the like can be favorably used along with these organic solvents, since they can improve the solubility of the cellulose ester in the organic solvent and reduce the viscosity of the dope. Ethanol in particular is favorable because of its low boiling point and it low toxicity. It is preferable that organic solvent used with the dope of the present invention is a mixture of a good solvent and a poor solvent for cellulose ester in view of production efficiency, and a favorable range of proportion for mixing the good solvent and the poor solvent is 70-98 percent by weight of the good solvent and 2-30 percent by weight of the poor solvent. A good solvent in the present invention is defined as a solvent that will dissolve the cellulose ester that is used on its own while a poor solvent is one that does not dissolve the cellulose ester on its own. The poor solvent used with the dope of the present invention is not particularly limited, but examples of the solvent that is preferably used include methanol, ethanol, n-butanol, cyclohexane, acetone, cyclohexanone and the like. Selection of the organic solvent for the polymer used in the present invention is also preferably a good solvent for cellulose ester. As described above, in the case where the low molecular weight plasticizer is used, conventional method for addition may be used and the plasticizer may be added directly to the dope or dissolved in an organic solvent beforehand and then poured into the dope.

When the various additives described above are added to the cellulose ester dope, it is preferable that a solution in which the cellulose ester dope and the various additives are dissolved in a small amount of the cellulose ester is blended by in-line addition. For example, an in-line mixer such as static mixer SWJ (Toray static in-line mixer, Hi-Mixer, manufactured by Toray Engineering) is preferably used. In the case where the in-line mixer is used, it is preferably applied to a dope in which the cellulose ester is subjected to concentrated dissolution under high pressure and in this case, a specific type of pressurizing container may be used, which is capable of withstanding a prescribed pressure, and which can be heated under pressure and in which stirring can be performed.

In the present invention, by filtering the cellulose ester dope, foreign matter, particularly foreign matter that can be mistakenly identified as images in the liquid crystal image display device, are removed. It can be said that the quality of the polarizing plate protective film is determined by this filtration. It is preferable that the absolute filtration accuracy of the filtering material used in this filtration is small, but if the absolute filtration accuracy is too small, there is clogging of the filtration material is likely to occur, and thus the filtering material must be replaced frequently and this causes the problem of reduced productivity. As a result, the absolute filtration accuracy of filtering material for the cellulose ester dope of the present invention is preferably in the range not mote than 0.008 mm, more preferably in the range of 0.001-0.008 mm, and still more preferably in the range of 0.003-0.006 mm. The quality of the filtering material is not particularly limited, and conventional filtering materials may be used. However, filtering material made from plastic fibers such as polypropylene, Teflon (registered trademark) and the like or filtering material made of metals such as stainless steel are preferable in the view of the fact that there is no falling out of the fibers. Filtration of the cellulose ester dope of the present invention can be performed using conventional methods, but a method in which filtration is performed while heating under reduced pressure at a temperature which is less that the boiling point of the solvent at atmospheric pressure, and which is within a range in which the solvent does not boil is preferred in view of the fact that increase in differential pressure after filtration (referred to as filtration pressure hereinafter) is small. The preferable temperature range is 45-120° C., more preferably 45-70° C., and still more preferably 45-55° C. The filtration pressure is preferably small. The filtration pressure is preferably no greater than $1.6 \times 10^6$ Pa, more preferably no greater than $1.2 \times 10^6$ Pa, and still more preferably, no greater than $1.0 \times 10^6$ Pa. Including an unsubstituted acyl group or a cellulose ester with a low degree of acetylation in raw material for the cellulose ester, sometimes causes foreign material obstruction (sometimes called luminance point hereinafter). A polarizer was placed between two cellulose ester film samples arranged in a crossed state (crossed Nicol state). The luminance point is a phenomenon which occurs when light was irradiated from one side and observed from the other side using an optical microscope (50 magnification) and if the cellulose ester film is a normal one, light is blocked and there is darkness and nothing can be seen, while if foreign material is present, light leaks from that area and luminance appears as spots. Actual damage when the cellulose ester film is used as a liquid crystal image display device is large to the extent that that the diameter of the luminance point is large, and the diameter of the luminance point should be no greater than 50 µm, preferably no greater than 10 µm, and still more preferably no greater than 8 µm. It is to be noted that the diameter of the luminance point is the diameter that is measured when the luminance point is approximated to a perfect circle. If the diameter of the luminance point defined here is $400/cm^2$ or less, there are no problems in terms of practical use, the diameter is preferably $300/cm^2$ or less, and more preferably $200/cm^2$ or less. In order to reduce the amount and size of these luminance spots, it is necessary to properly filter fine foreign material. Also, as described in Japan Patent Application Laid-Open No. 2000-137115, the method in which a crushed cellulose ester film which has been formed are added again in the proportion of the dope and used as the materials for the cellulose ester and the additives is preferably used as the luminance spots are reduced.

Next, the process for casting the cellulose ester dope on a metal support, the drying process for drying on the metal support, and the peeling process for peeling the web from the metal support will be described. The metal support body is an endless metal belt which can move infinitely or a rotating metal drum with the surface thereof being a mirror surface. The casting process is one in which a dope is pumped to a pressure die through a pressure type metering gear pump, and cast from the pressure die onto a metal support at a casting position. Another casting process is a doctor blade method in which the thickness of the cast dope film is adjusted with a blade or a method using reverse roll coater in which the dope thickness of the cast dope is adjusted with a reverse roller coater rotating reversely. A pressure die is preferred in view of the fact that the slit shape at the opening portion can be regulated and the film thickness is readily regulated to be uniform. Examples of the pressure die include a coat hanger die, a "T" die, and the like, and any of these maybe favorably employed. In order to increase the casting speed, two or more pressure dies may be provided on the metal support and dopes divided into two or more may be cast on the metal support and the dope amount may be divided and layered. The thickness of the film may be controlled to a desired thickness by controlling the dope concentration, the amount of dope pumped, the space of the slit in the die opening, the push-out pressure of the die, the speed of the metal support body and the like.

The drying process performed on the metal support is one in which a web (a dope film which is formed after a dope is cast on a metal support is called a web) is heated on a support and solvents are evaporated. Methods for evaporating solvents, include a method in which hot air is blown from the web side and the backside of the support, a method in which heating is carried out from the back surface of the support using heat transfer by liquid, and a method in which heating is carried out from the surface as well as the back surface using heat radiation. Further, these methods are preferably combined. If the web is thin, drying is quick. The temperature of the support may be the same along the entire support or may be different depending on the position.

The method for performing drying on the metal support which is used in the present invention, is preferably a method in which casting is done on the metal support at a temperature of 0-40° C., and more preferably at a temperature of 5-30° C. The air for drying the web is preferably 30-45° C., but is not limited thereto.

The peeling process is one in which a web, in which the organic solvents have been evaporated on the support, is peeled prior to conveying of the metal support. The peeled web is sent to the drying process. The position at which the web is peeled from the metal support is called the peeling point, and the rollers which aid in the peeling are called peeling rollers. This phenomenon depends on the thickness of the web, but when the residual solvent amount (represented by the formula described below) is too large, it may be difficult to peel the web. On the contrary, when peeling is carried out after fully drying the web on the support, a part of the web may peel before the peeling position. It is generally preferable that web peeling is performed when the residual solvent amount is 20 to 180 percent by weight. The residual solvent amount in the present invention when the film is peeled is preferably 20-40 percent by weight or 60-150 percent by weight, and 80-140 percent by weight is particularly preferable. One method for increasing the speed of film production (the film production speed can be increased because the peeling is performed when the residual solvent amount is a much as possible) is a gel casting method in which peeling can be done even when the residual solvent amount is high. The gel casting methods include a method in which poor solvents with respect to the cellulose ester are added to a dope and gelling is carried out after casting the dope, and also a method in which gelling is carried out by decreasing the temperature of a support, and the like. There is further a method in which metal salts are added to the dope. By strengthening the web film through gelling the dope on the support, it is possible to carry out earlier peeling and to increase the film formation speed. When the peeling is carried out at the time when the residual solvent amount is still great, the web may be too soft, and during peeling, the flatness of the web is compromised, and formation of wrinkles and longitudinal streaks due to the peeling tension become likely. Accordingly, the residual solvent amount is determined such that economic operation and quality are balanced.

The residual solvent amount used in the present invention is expressed by the formula below.

Residual solvent amount (percent by weight)={(M−N)/N}×100

In the formula, M represents the weight of the web at a suitably selected point and N represents the weight when M is dried for 3 hours at 110° C.

Furthermore, it is preferable that in the process for drying the cellulose ester film, the film that has been peeled from the support is further dried to cause the residual solvent amount to 2.0 percent by weight or less, and more preferably 1.0 percent by weight or less, and still more preferably 0.5 percent by weight or less.

In the drying process, the web is dried by employing a method in which the web is conveyed through rolls placed in a staggered way and drying device or a tenter drying device in which the web is conveyed while holding both edges of the web using clips and maintaining web width or slightly stretching the web in the width direction. In the present invention, it is particularly favorable to maintain or stretch the web width in a suitably selected process subsequent to peeling of the web by the tenter drying device and at a suitably selected point where the residual solvent amount is great, since humidity stability of the optical properties are favorable. The means for drying the web is not particularly limited and the drying is generally carried out by hot air, infrared rays, heat rolling or microwaves. It is preferable that the drying is performed by hot air in view of simplicity. The drying temperature is preferably gradually increased in the range from 40 to 180° C. and more preferably in the range from 50 to 160° C.

Further, when the thermal treatment is conducted under a high temperature, the rate of atmosphere replacement is preferably 12 to 45 times/hours. The rate of atmosphere replacement is the number of times replacing the atmosphere of a heat treatment chamber by fresh-air per unit time, provided that the volume of the heat treatment chamber is expressed as V (m$^3$) and the amount of fresh-air sent to the heat treatment chamber is expressed as FA (m$^3$/h). Fresh-air does not include the air which is recycled and circulating, among the air sent to the heat treatment chamber but includes the air containing no evaporated solvent nor evaporated plasticizer, or the air from which evaporated solvent or evaporated plasticizer are removed.

Rate of atmosphere replacement=FA/V (times/h)

It is desirable to stretch a cellulose ester film used in the present invention 1% or more in both MD (film transport direction)/TD (direction perpendicular to the transport direction) in order to keep a flatness. When producing a film which does not have a retardation in a plane, it is desirable that MD stretching rate percentage and TD stretching rate are close to each other, however, the MD stretching rate percentage and the TD stretching rate may be different from each other.

Incidentally, the stretching operation may be conducted separately in multi-stages. It is desirable to carry out biaxial stretching in a casting direction and in a lateral direction. Further, when performing the biaxial stretching, the biaxial stretching may be performed simultaneously, and also may be performed step by step. In this case of performing step by step, stretching operations different in stretching direction may be conducted sequentially, stretching operations having the same stretching direction may be conducted separately step by step and a stretching operation having a different stretching direction may be conducted at one of the steps.

When the layer thickness of a cellulose ester film is thinner, it is desirable that since a polarizing plate made with it becomes thinner, it becomes easy to make a liquid crystal display to be thinner. However, if it is too thin, water vapour permiability and tearing strength etc. may deteriorate. As for a layer thickness of a cellulose ester film which satisfies both requirements, 10-100 μm is desirable, 10-80 μm is more desirable, and especially 10-70 μm is still more desirable.

The width of a cellulose ester film is desirable 1.3 m or more, preferably in the range of 1.4 m-4 m of from the viewpoint of manufacturing efficiency for a large size liquid crystal display.

A cellulose ester film used in the present invention is desirable to be used for a component for a liquid crystal display from points of high water-vapor permeability, dimensional stability, etc. The component for a liquid crystal display is a component used for a liquid crystal display device, and for example, it is preferably used as a protective film for a polarizing plate. Furthermore, it is possible to provide it with functional layers such as an anti reflection layer, a hard coat layer, an anti-glare layer, an anti pollution layer, an optical anisotropic layer, an orientation layer, a liquid crystal layer, a back coat layer, an antistatic layer and a light diffusion layer in proper combination. Especially when it is used for the uppermost surface of a liquid crystal display as a polarizing plate protective film A1, it is desirable to prepare an anti-reflection layer on a film surface.

(Anti-reflection Layer)

The anti-reflection layer owing to optical interference which is employed in the present invention will be described.

(Configuration of Anti-reflection Layer)

The anti-reflection layer may be a single-layer structured low refractive index layer or a multi-layer structured refractive index layer. The hard coat layer is provided on a transparent film support, and the anti-reflection layer can be laminated on the support surface so as to reduce reflectance because of optical interference in consideration of refractive index, thickness, the number of layers, and the order of layers. The anti-reflection layer possesses high refractive index layers having a higher refractive index than that of the support and a low refractive index layer having a lower refractive index than that of the support in combination, but an anti-reflection layer having at least 3 refractive index layers is particularly preferable. It is preferred that a medium refractive index layer (higher refractive index than that of a support or a hard coat layer and lower refractive index than that of a higher refractive index layer), a high refractive index layer and a low refractive index layer are laminated in this order for the three layers of different refractive indices from the support side. A hard coat layer may serve for a high refractive index layer.

Preferable examples of the layer structure in an antireflection film of the present invention are described below. Symbol "/" indicated below means "laminated" here.

back coat layer/support/hard coat layer/low refractive index layer back coat layer/support/hard coat layer/high refractive index layer/low refractive index layer back coat layer/support/hard coat layer/medium refractive index layer/high refractive index layer/low refractive index layer back coat layer/support/antistatic layer/hard coat layer/medium refractive index layer/high refractive index layer/low refractive index layer antistatic layer/support/hard coat layer/medium refractive index layer/high refractive index layer/low refractive index layer/back coat layer/support/hard coat layer/high refractive index layer/low refractive index layer/high refractive index layer/low refractive index layer In order to easily remove stains or fingerprints, an anti-stain layer is preferably provided on the outermost low refractive index layer. A fluorine-containing organic compound is preferably used in the anti-stain layer.

(Actinic Ray Cured Resin Layer)

In the present invention, it is desirable that an actinic ray cured resin layer is coated on a polarizing plate protective film A1. A producing method for an actinic ray cured resin layer used as a hard coat layer is explained hereafter.

An actinic ray cured resin layer is preferably used as a hard coat layer used for a cellulose ester film of the present invention.

An actinic ray cured resin layer refers to a layer mainly comprising a resin which can be cured through a cross-linking reaction caused by irradiating with actinic rays such as UV rays or electron beams. A composition containing ethylenically unsaturated monomers is preferably utilized to form a hard coat layer by hardening the composition with irradiating actinic rays such as UV rays or electron beams. Typical examples of actinic ray curable resins include a UV ray-curable resin and an electron beam curable resin, however, a UV ray-curable resin is more preferably utilized.

The UV curable resin includes, for example: a UV-curable acryl urethane type resin, a UV-curable polyester acrylate type resin, a UV-curable epoxy acrylate type resin, a UV-curable polyol acrylate type resin and a UV-curable epoxy type resin.

The UV-curable urethane acrylate type resin includes compounds which are generally prepared easily by, initially, reacting polyester polyol with a monomer or a prepolymer of isocyanate, followed by further reacting the product with an acrylate type monomer having a hydroxy group such as 2-hydroxyethyl acrylate, 2-hydroxyethyl methacrylate (herinafter, only acrylates are described, however methacrylates are also included) and 2-hydroxypropyl acrylate. For example, a compound disclosed in JP-A 59-151110 is preferably used.

For example, a mixture of 100 weight parts of UNIDIC 17-806 (Dainippon Ink and Chemicals, Inc.) and 1 weight part of COLONATE L (Nippon Polyurethane Industry Co., Ltd.) is preferably used.

The UV-curable polyester acrylate type resins include compounds which are generally prepared easily by reacting a polyester polyol with a 2-hydroxyethyl acrylate type or a 2-hydroxy acrylate type monomer. For example, those disclosed in JP-A 59-151112 are preferably used.

The UV-curable epoxy acrylate type resin includes compounds which are prepared by reacting an epoxy acrylate oligomer with a reactive dilutant and a photoreaction initiator. For example, as disclosed in JP-A 1-105738 are preferably used.

The UV-curable polyol acrylate type resin includes, for example: trimethylol propane triacrylate, ditrimethylol propane tetraacrylate, pentaerythritol triacrylate, pentaerythritol tetraacrylate, dipentaerythritol hexaacrylate and alkyl modified dipentaerythritol pentaacrylate.

The photoreaction initiators include, for example: benzoine including derivatives, acetophenone, benzophenone, hydroxy benzophenone, Michler's ketone, α-amyloxim ester and thioxanthone including derivatives. These compounds may be utilized together with a photo sensitizer. The photoreaction initiator described above can also be utilized as a photo sensitizer. Further, sensitizers such as n-butyl amine, triethyl amine and tri-n-butyl phosphine can be utilized together with an epoxy acrylate type photoreaction agent. The amount of a photoreaction initiator or a photo sensitizer is preferably from 0.1 to 15 weight parts, more preferably from 1 to 10 weight parts in 100 weight parts of the UV-curable resins described above.

Resin monomers include, for example: (i) a monomer having one unsaturated double bond, such as methyl acrylate, ethyl acrylate, butyl acrylate, benzyl acrylate, cyclohexyl acrylate, vinyl acetate and styrene, and (ii) a monomer having two or more unsaturated double bonds, such as ethyleneglycol diacrylate, propyleneglycol diacrylate, divinyl benzene, 1,4-cyclohexyane diacrylate and 1,4-cyclohexyldimethyl diacrylate. Foregoing trimethylolpropane triacrylate and pentaerythritol tetraacrylate ester are also included.

Selected products available on the market as a UV curable resin which can be utilized in the present invention may be: Adekaoptomer KR, BY Series such as KR-400, KR-410, KR-550, KR-566, KR-567 and BY-320B (manufactured by Asahi Denka Co., Ltd.); Koeihard A-101-KK, A-101-WS, C-302, C-401-N, C-501, M-101, M-102, T-102, D-102, NS-101, FT-102Q8, MAG-1-P20, AG-106 and M-101-C (manufactured by Koei Kagaku Co., Ltd.); Seikabeam PHC2210(S), PHC X-9(K-3), PHC2213, DP-10, DP-20, DP=30, P1000, P1100, P1200, P1300, P1400, P1500, P1600, SCR900 (manufactured by Dainichiseika Kogyo Co., Ltd.); KRM7033, KRM7039, KRM7131, UVECRYL29201 and UVECRYL29202 (manufactured by Daicel U. C. B. Co., Ltd.); RC-5015, RC-5016, RC-5020, RC-5031, RC-5100, RC-5102, RC-5120, RC-5122, RC-5152, RC-5171, RC-5180 and RC-5181 (manufactured by Dainippon Ink & Chemicals, Inc.); Olex No. 340 Clear (manufactured by Chyugoku Toryo Co., Ltd.); Sunrad H-601, RC-750, RC-700, RC-600, RC-500, RC-611 and RC-612 (manufactured by Sanyo Kaseikogyo Co., Ltd.); SP-1509 and SP-1507 (manufactured by Syowa Kobunshi Co., Ltd.); RCC-15C (manufactured by Grace Japan Co., Ltd.) and Aronix M-6100, M-8030 and M-8060 (manufactured by Toagosei Co., Ltd.).

Concrete examples include, for example: trimethylol propane triacrylate, ditrimethylol propane tetraacrylate, pentaerythritol triacrylate, pentaerythritol tetraacrylate, dipentaerythritol hexaacrylate and alkyl modified dipentaerythritol pentaacrylate.

The UV curable resin layer can be applied by any method well known in the art, for example: a gravure coater, a dip coater, a reverse coater, a wire bar coater, a die coater and ink jet printing.

Light sources to cure layers of UV curable-resin by photocuring reaction are not specifically limited, and any light source may be used as far as UV ray is generated. For example, a low-pressure mercury lamp, a medium-pressure mercury lamp, a high-pressure mercury lamp, an ultrahigh-pressure mercury lamp, a carbon arc lamp, a metal halide lamp and a xenon lamp may be utilized. The preferable irradiation quantity of light may be changed depending on the type of lamp, however, it is generally from 5 to 150 mJ/cm$^2$, and is more preferably from 20 to 100 mJ/cm$^2$.

Irradiation with ionizing radiation onto the hard coat layer is preferably carried out while tension in the transportation direction is applied to the film, and more preferably it is carried out while tension in the lateral direction is also applied to the file. The tension to be applied is preferably 30-300 N/m. The method to apply the tension is not specifically limited. The tension may be applied to the film transportation direction on a back roll or may be applied to the lateral direction or to the biaxial directions by using a tenter, whereby a film having further improved flatness is obtained.

An organic solvent can be selected from, for example: the hydrocarbon series, the alcohol series (methanol, ethanol, isopropanol, butanol and cyclohexanol), the ketone series (acetone, methyl ethyl ketone and isobutyl ketone), the ester series (methyl acetate, ethyl acetate and methyl), the glycol ether series and other organic solvents. These organic solvents may be also used in combinations. The above mentioned organic preferably contains propyleneglycol monoalkylether (with an alkyl group having 1 to 4 carbon atoms) or propyleneglycol monoalkylether acetate ester (with an alkyl group having 1 to 4 carbon atoms) with a content of 5 percent by weight or more, and more preferably from 5 to 80 percent by weight.

In a coating solution of a UV ray-curable resin, a silicon compound such as a polyether modified silicone oil, is preferably added. The number average molecular weight of a polyether modified silicone oil is preferably from 1,000 to 100,000 and more preferably from 2,000 to 50,000. Addition of a polyether modified silicone oil with a number average molecular weight of less than 1,000 may lower the drying rate of the coating solution, while on the other hand, that of more than 100,000 may result in a difficulty in bleeding out at the surface of the coated film.

Silicon compounds available on the market include, for example: DKQ8-779 (a trade name of Dow Corning Corp.), SF3771, SF8410, SF8411, SF8419, SF8421, SF8428, SH200, SH510, SH1107, SH3771, BX16-034, SH3746, SH3749, SH8400, SH3771M, SH3772M, SH3773M, SH3775M, BY-16-837, BY-16-839, BY-16-869, BY-16-870, BY-16-004, BY-16-891, BY-16-872, BY-16-874, BY22-008M, BY22-012M, FS-1265 (all being trade names of Dow Corning Toray Silicone Co., Ltd.), KF-101, KF-100T, KF351, KF352, KF353, KF354, KF355, KF615, KF618, KF954, KF6004, siliconeX-22-945, X22-160AS (all being trade names of Shin-Etsu Chemical Co., Ltd.), XF3940, XF3949 (both being trade names of Toshiba Silicones Co., Ltd.), DISPARLONLS-009 (a trade name of Kusumoto Chemicals Ltd.), GLANOL410 (a trade name of Kyoeisha Chemicals Co., Ltd.), TSF4440, TSF4441, TSF4445, TSF4446, TSF4452, TSF4460 (all being trade names of GE Toshiba Silicones Co., Ltd.), BYK-306, BYK-330, BYK-307, BYK-341, BYK-361 (all being trade names of BYK-Chemie Japan KK), L Series (L-7001, L-7006, L-7604 and L-9000), Y Series and FZ Series (FZ-2203, FZ-2206 and FZ-2207) (all from Nippon Unicar Co., Ltd.).

These compositions may improve the coating ability of the solution onto a substrate or an under coat layer. If these compounds are used as the top layer of stacked film layers, these compounds may contribute to improve not only water-resistance, oil-resistance and anti-staining properties, but also improve scratch resistance of the film. The content of the added silicon compound is preferably from 0.01 to 3 percent by weight based on the solid composition in the coating solution.

Aforementioned coating methods are preferably also used to coat a solution of UV ray-curable resin. The thickness of a wet film of coated UV-curable resin is preferably from 0.1 to 30 μm and more preferably from 0.5 to 15 μm. The thickness of the dried film of the same is preferably from 0.1 to 10 μm and more preferably from 1 to 10 μm.

A UV ray-curable resin layer is preferably irradiated with UV rays while the layer is being dried, or alternatively after it is dried. The duration of UV ray irradiation of the amount from 5 to 100 mJ/cm$^2$ as mentioned above is preferably from 0.1 seconds to 5 minuets. With respect to working efficiency and hardening efficiency of the UV-curable resin, the duration of the same is more preferably from 0.1 to 10 seconds.

The intensity of the actinic ray is preferably from 50 to 150 mW/m$^2$.

The UV-cured resin layer thus obtained may preferably contain inorganic or organic micro-particles in order to attain the following characteristics: preventing blocking, improving scratch resistance, providing an antiglare property and optimizing the reflective index.

Inorganic particles to be contained in a hard coat layer include, for example: silicon oxide, titanium oxide, aluminum oxide, zirconium oxide, magnesium oxide, calcium carbonate, talc, clay, calcined kaolin, calcined calcium silicate, hydrated calcium silicate, aluminum silicate, magnesium silicate and calcium phosphate. Among these, silicon oxide, titanium oxide, aluminum oxide, zirconium oxide, magnesium oxide are specifically preferable.

Organic particles include, for example: microparticles of polymethacrylic acid methyl acrylate resin, acryl styrene based resin, polymethyl methacrylate resin, silicon based resin, polystyrene based resin, polycarbonate resin, benzoguanamine based resin, melamine based resin, polyolefin based resin, polyester based resin, polyamide based resin, polyimide based resin and polyfluorinated ethylene based resin. Specifically preferable organic particles include, for example: particles of cross-linked polystylene (such as SX-130H, SX-200H and SX-350H manufactured by Soken Chemical & Engineering Co., Ltd.) and polymethyl methacrylate (such as MX150 and MX300 manufactured by Soken Chemical & Engineering Co., Ltd.).

The average particle diameter of these fine particle powder is preferably 0.005-5 μm and specifically preferably 0.01-1 μm. As for the rate of an ultraviolet-rays cured resin composition and fine particles powder, it is desirable to blend it to 100 mass parts of a resin composite so that it may become 0.1-30 mass parts.

It is desirable that an ultraviolet-rays cured resin layer is a clear hard coat layer having a center-line average roughness (Ra) of 1 to 50 nm or an anti-glare layer having Ra of 0.1 to 1 μm. The center-line average roughness (Ra) is measured preferably by means of a surface roughness meter using interference of light, for example, RST/PLUS manufactured by WYKO Co., Ltd.

A UV ray-curable resin layer having a convexo-concave surface is preferably formed by using an emboss roll with a convexo-concave surface, and also a UV ray-curable resin layer exhibiting anti-glare generated via formation of convexoconcave on the surface is preferably employed for a ink-jet method or a printing method.

(Back Coat Layer)

The hard coat film of the present invention having a hard coat layer on one surface of the cellulose ester film is preferably provided with a back coat layer on the other surface of the cellulose ester film. A back coat film is provided on a cellulose ester film to prevent curling which may occur when a hard coat layer or other layers are formed on a cellulose ester film by means of a coating method or by CVD. Namely, by adding a counter force to curl toward the back coat side, the force to curl toward the hard coat layer side may be balanced out. Also, a back coat layer preferably has a feature to prevent blocking. For this purpose, microparticles are preferably added to a coating composition of back coat layer.

Microparticles preferably added to the back coat layer include inorganic microparticles, for example, silicon dioxide, titanium dioxide, aluminum oxide, zirconium oxide, calcium carbonate, talc, clay, calcined kaolin, calcined calcium silicate, tin oxide, indium oxide, zinc oxide, ITO, hydrated calcium silicate, aluminum silicate, magnesium silicate and calcium phosphate. Microparticles containing silicon are preferably used to minimize the haze. Of the above, silicon dioxide is specifically preferable.

Inorganic microparticle available on the market include, for example: AEROSIL R972, R927V, R974, R812, 200, 200V, 300, R202 and OX50 which are manufacture by Nippon Aerosil Co. Ltd. Microparticles of zirconium oxide available on the market include, for example: AEROSIL R976 and R811 manufacture by Nippon Aerosil Co. Ltd.

Microparticles of polymer include, for example: silicone resin, fluorine-contained resin and acryl resin. Among these, silicone resin, especially three dimensionally networked silicone resin is preferably used. Examples of silicone resins available on the market include TOSPERL 103, 105, 108, 145, 3120 and 240, which are manufactured by Toshiba Silicone Co., Ltd.

Among the microparticles listed above, AEROSIL 200V and AEROSIL R972V are particularly preferable with respect to effectively preventing blocking while minimizing haze. The kinetic friction coefficient of the rear side of the hard coat layer in the present invention is preferably less than 0.9 and specifically preferably from 0.1 to 0.9.

The content of microparticles contained in the back coat layer is preferably from 0.1 to 50 percent by weight and more preferably from 0.1 to 10 percent by weight. The increase in haze after the hard coat film is provided with a back coat layer is preferably less than 1 percent, more preferably less than 0.5 percent and specifically preferably from 0.0 to 0.1 percent.

The back coat layer is formed by means of a coating method using a coating solution containing a solvent which dissolves and/or swells cellulose ester. The solvent may occasionally be comprised of a solvent which does not dissolve nor swell cellulose ester. The mixing ratio of these solvents and the amount of the coating solution to be used for forming a back coat layer is appropriately determined depending on the extent of the curl and the type of the resin used for the hard coat film.

In order to have a larger effect to prevent curl in the film, the mixing ratio of type A solvent is increased while the ratio of type B solvent is decreased. The mixing ratio of type A solvent to type B solvent is preferably 10 to 0 through 1 to 9. Examples of type A solvent include: dioxane, acetone, methyl ethyl ketone, N,N-dimethyl formamide, methyl acetate, ethyl acetate, trichloroethylene, methylene chloride, ethylene chloride, tetrachloroethane, trichloroethane and chloroform. Examples of type B solvent include: methanol, ethanol, n-propyl alcohol, i-propyl alcohl, n-butanol and hydrocarbons (such as toluene, xylene and cyclohexane).

The back coat layer is coated by means of, for example: a gravure coater, a dip coater, a reverse coater, a wire-bar coater and a die coater, in a thickness of preferably from 1 to 100 µm and specifically preferably from 5 to 30 µm. Resins utilized as a binder in a back coat layer include, for example: (i) vinyl type homopolymers or copolymers such as a vinyl chloride/vinyl acetate copolymer, a vinyl chloride resin, a vinyl acetate resin, a copolymer of vinyl acetate and vinyl alcohol, a partially hydrolyzed vinyl chloride/vinyl acetate copolymer, a vinyl chloride/vinylidene chloride copolymer, a vinyl chloride/acrylonitrile copolymer, an ethylene/vinyl alcohol copolymer, a chlorinated polyvinylchloride, an ethylene/vinyl chloride copolymer and a ethylene/vinyl acetate copolymer; (ii) cellulose ester type resins such as cellulose nitrate, cellulose acetate propionate, cellulose diacetate, cellulose triacetate, cellulose acetate phthalate and cellulose acetate butylate; (iii) rubber type resins such as a copolymer of maleic acid and/or acrylic acid, a copolymer of acrylate ester, an acrylonitrile/stylene copolymer, a chlorinated polyethylene, an acrylonitrile/chlorinated polyethylene/stylene copolymer, a methylmethacrylate/butadiene/stylene copolymer, an acryl resin, a polyvinylacetal resin, a polyvinylbutyral resin, a polyester polyuretane resin, a polyether polyurethane resin, a polycarbonate polyurethane resin, a polyester resin, a polyether resin, a polyamide resin, an amino resin, a stylene/butadiene resin and a butadiene/acrilonitrile resin; (iv) a silicone type resin; and (v) a fluorine-containing type resin, however, the present invention is not limited thereto. Examples of acryl resins available on the market include homopolymers and copolymers produced from acryl or methacryl monomers, such as: Acrypet MD, VH, MF and V (manufactured by Mitsubisi Rayon Co., Ltd.), Hi Pearl M-4003, M-4005, M-4006, M-4202, M-5000, M-5001 and M-4501 (Negami Chemical Industrial Co., Ltd.), Dianal BR-50, BR-52, BR-53, BR-60, BR-64, BR-73, BR-75, BR-77, BR-79, BR-80, BR-82, BR-83, BR-85, BR-87, BR-88, BR-90, BR-93, BR-95, BR-100, BR-101, BR-102, BR-105, BR-106, BR-107, BR-108, BR-112, BR-113, BR-115, BR-116, BR-117 and BR-118 (manufactured by Mitsubisi Rayon Co., Ltd.). A resin used in the present invention may suitably be selected from the above examples.

Cellulose type resin such as diacetyl cellulose and cellulose acetate propionate is specifically preferable.

The coating order of a back coat layer on a cellulose ester film is not specifically limited, namely, a back coat layer may be formed before or after forming the layers on the opposite surface (hard coat layer and other layers such as antistatic layer), however, when a back coat layer also functions as an antiblocking layer, the back coat layer is preferably formed before the opposite side layers. Coating of a back coat layer may preferably be divided in two or more times. Incidentally, a backcourt layer mentioned here can be coated also on an optical compensation film, whereby the flatness of the optical compensation film can be maintained, and a retardation change can be lessen.

(Low Refractive Index Layer)

The following hollow silica particles are preferably employed for a low refractive index layer preferably used for a polarizing plate protective film A1 of the present invention.

(Hollow Silica Particles)

Hollow particles are (I) complex particles constituted of a porous particle and a cover layer arranged on the surface of said porous particle or (II) hollow particles, the interior of which is hollow and the hollow is filled with contents such as a solvent, a gas or a porous substance. Herein, at least either (I) complex particles or (II) hollow particles is contained in a low refractive index layer, or the both of them may be contained.

Herein, hollow particles are particles the interior of which is hollow, and the hollow is surrounded by a particle wall. The interior of the hollow is filled with the contents such as a solvent, a gas or a porous substance which have been utilized in preparation. The mean particle diameter of such hollow particles is preferably in a range of 5-300 nm and preferably of 10-200 nm. The mean particle diameter of hollow particles utilized is appropriately selected depending on the thickness of the formed transparent cover film and is preferably in a range of 2/3-1/10 of the layer thickness of the transparent cover film of such as a formed low refractive index layer. These hollow particles are preferably utilized in a state of being dispersed in a suitable medium to form a low refractive index layer. As dispersing medium, water, alcohol (such as methanol, ethanol and isopropanol), ketone (such as methyl ethyl ketone and methyl isobutyl ketone) and ketone alcohol (such as diacetone alcohol) are preferable.

A thickness of the cover layer of a complex particle or the thickness of the particle wall of a hollow particle is preferably in a range of 1-20 nm and more preferably in a range of 2-15 nm. In the case of a complex particle, when a thickness of the cover layer is less than 1 nm, a particle may not be completely covered to allow such as silicate monomer or oligomer having a low polymerization degree as a coating component described later to immerse into the interior of the complex particle resulting in decrease of porousness of the interior, whereby an effect of a low refractive index may not be obtained. Further, when a thickness of the cover layer is over 20 nm, the aforesaid silicate monomer or oligomer never immerses into the interior, however, the porosity (a micropour volume) of a complex particle may be decreased, resulting in an insufficient effect of a low refractive index. Further, in the case of a hollow particle, particle shape may not be kept when a thickness of the particle wall is less than 1 nm, while an effect of a low refractive index may not be obtained when a thickness of the particle wall is not less than 20 nm.

The cover layer of a complex particle or the particle wall of a hollow particle is preferably comprised of silica as a primary component. Further, components other than silica may be incorporated and specific examples include such as $Al_2O_3$, $B_2O_3$, $TiO_2$, $ZrO_2$, $SnO_2$, $CeO_2$, $P_2O_5$, $Sb_2O_3$, $MoO_3$, $ZnO_2$, and $WO_3$. A porous particle to constitute a complex particle includes those comprised of silica, those comprised of silica and an inorganic compound other than silica and those comprised of such as $CaF_2$, NaF, $NaAlF_6$ and MgF. Among them, specifically preferable is a porous particle comprised of a complex oxide of silica and an inorganic compound other than silica. An inorganic compound other than silica includes one type or at least two types of such as $Al_2O_3$, $B_2O_3$, $TiO_2$, $ZrO_2$, $SnO_2$, $CeO_2$, $P_2O_5$, $Sb_2O_3$, $MoO_3$, $ZnO_2$ and $WO_3$. In such a porous particle, mole ratio $MO_x/SiO_2$ is preferably in a range of 0.0001-1.0 and more preferably of 0.001-0.3 when silica is represented by $SiO_2$ and an inorganic compound other than silica is represented by an equivalent oxide ($MO_x$). A porous particle having mole ratio $MO_x/SiO_2$ of less than 0.0001 is difficult to be prepared and the pore volume is small to unable preparation of a particle having a low refractive index. Further, when mole ratio $MO_x/SiO_2$ of a porous particle is over 1.0, the pore volume becomes large due to a small ratio of silica and it may be further difficult to prepare a particle having a low refractive index.

A pore volume of such a porous particle is preferably in a range of 0.1-1.5 ml/g and more preferably of 0.2-1.5 ml/g. When the pore volume is less than 0.1 ml/g, a particle having a sufficiently decreased refractive index cannot be prepared, while, when it is over 1.5 ml/g, strength of a particle is decreased and strength of the obtained cover film may be decreased. Herein, the pore volume of such a porous particle can be determined by a mercury pressurized impregnation method. Further, a content of a hollow particle includes such as a solvent, a gas and a porous substance which have been utilized at preparation of the particle. In a solvent, such as a non-reacted substance of a particle precursor which is utilized at hollow particle preparation and a utilized catalyst may be contained. Further, a porous substance includes those comprising compounds exemplified in the aforesaid porous particle. These contents may be those containing single component or mixture of plural components.

As a manufacturing method of such hollow particles, a preparation method of complex oxide colloidal particles, disclosed in paragraph Nos. [0010]-[0033] of Japanese Patent O.P.I. Publication No. 7-133105, is suitably applied.

The refractive index of the resulting hollow particle is low because of the hollow structure, and The refractive index of the resulting hollow particle in the present invention is preferably 1.30-1.50, and more preferably 1.35-1.44.

The content (by weight) of hollow silica particles having an outer layer as well as pores or cavities in a low refractive index layer coating solution is 10-80% by weight, and more preferably 20-60% by weight.

(Tetraalcoxy Silane Compound or Hydrolysate thereof)

A tetraalcoxy silane compound or its hydrolysate as a sol-gel material is preferably contained in a low refractive index layer of the present invention.

As components for the low refractive index layer usable in the present invention, organic group-containing silicon oxides other than the foregoing inorganic silicon oxides are preferably usable. These are generally called sol-gel components. Preferably employed as such sol-gel components may be metal alcolates, and organoalkoxy metal compounds and hydrolysis products thereof. Particularly preferred are alkoxysilane, and hydrolysis products thereof. It is also preferable to use tetraalkoxysilane (tetramethoxysilane and tetraethoxysilane), alkyltrialkoxysilane (methyltrimethoxysilane, and ethyltrimethoxysilane), aryltrialkoxysilane (phenyltrimethoxysilane), dialkyldialkoxysilane, diaryldialkoxysilane, and the like.

It is preferred that the low refractive index layer employed in the present invention contains the foregoing silicon oxide and the following silane coupling agent.

Specific examples of silane coupling agents include methyltrimethoxysilane, methyltriethoxysilane, methyltrimethoxyethoxysilane, methyltriacetoxysilane, methyltributoxysilane, ethyltrimethoxysilane, ethyltriethoxysilane, vinyltrimethoxysilane, vinyltriethoxysilane, vinyltriacetoxysilane, vinyltrimethoxyethoxysilane, phenyltrimethoxysilane, phenyltriethoxysilane, and phenyltriacetoxysilane.

Further, examples of silane coupling agents having two alkyl substituents for silicon include dimethyldimethoxysilane, phenylmethyldimethoxysilane, dimethyldiethoxysilane, and phenylmethyldiethoxysilane.

Specific examples of silane coupling agents produced by Shin-Etsu Chemical Co., Ltd include KBM-303, KBM-403, KBM-402, KBM-1403, KBM-502, KBM-503, KBE-502, KBE-503, KBM-603, KBE-603, KBM-903, KBE-903, KBE-9103, KBM-802 or KBM-803.

It is preferred that the silane coupling agent is hydrolyzed with a predetermined amount of water in advance. When a silane coupling agent is hydrolyzed, the surface of the foregoing silicon oxide particle or the silicon oxide particle containing an organic group is easy to be reactive, resulting in formation of strengthened films. The silane coupling agent which has been hydrolyzed may also be added into a coating solution in advance.

It is also preferable that the low refractive index layer incorporates polymers in an amount of 5-50 percent by weight. The above polymers exhibit functions such that particles are subjected to adhesion and the structure of the above low refractive index layer is maintained. The used amount of the polymers is controlled so that without filing voids, it is possible to maintain the strength of the low refractive index layer. The amount of the polymers is preferably 10-30 percent by weight of the total weight of the low refractive index layer. In order to achieve adhesion of particles employing polymers, it is preferable that (1) polymers are combined with surface processing agents of particles, (2) a polymer shell is formed around a particle used as a core, or (3) polymers are employed as a binder among particles.

Binder polymers are preferably polymers having saturated hydrocarbon or polyether as a main chain, but is more preferably polymers having saturated hydrocarbon as a main chain. The above binder polymers are subjected to crosslinking. It is preferable that the polymers having saturated hydrocarbon as a main chain is prepared employing a polymerization reaction of ethylenic unsaturated monomers. In order to prepare crosslinked binder polymers, it is preferable to employ monomers having at least two ethylenic unsaturated groups. Listed as examples of monomers having at least two ethylenic unsaturated groups are esters of polyhydric alcohol with (meth)acrylic acid (for example, ethylene glycol di(meth)acrylate, 1,4-dicyclohexane diacrylate, pentaerythritol tetra(meth)acrylate, pentaerythritol (meth)acrylate, trimethylolpropane tri(meth)acrylate, trimethylolethane tri (meth)acrylate, dipentaerythritol tetra(meth)acrylate, dipentaerythritol penta(meth)acrylate, pentaerythritol hexa(meth)acrylate, 1,2,3-cyclohexane tetramethacrylate, polyurethane polyacrylate, and polyester polyacrylate); vinylbenzene and derivatives thereof (for example, 1,4-divinylbenzene and 4-vinylbenzoic acid-2-acryloylethyl ester, and 1,4-divinylcyclohexane); vinylsulfones (for example, divinylsulfone); acrylamides (for example, methylenebisacrylamide); and methacrylamides.

The low refractive index layers usable in the present invention may be a low refractive index layer formed by crosslinking of fluorine containing resins (hereinafter referred to as "fluorine containing resins prior to crosslinking") which undergo crosslinking via heating or ionizing radiation.

Preferably listed as fluorine containing resins prior to coating are fluorine containing copolymers which are formed employing a fluorine containing vinyl monomer and a monomer which provides a crosslinking group. Listed as specific examples of the above fluorine containing vinyl monomer units include: fluoroolefins. (for example, fluoroethylene, vinylidene fluoride, tetrafluoroethylene, hexafluoroethylene, hexafluoropropylene, perfluoro-2,2-dimethyl-1,3-dioxol), partially or completely fluorinated alkyl ester derivatives of (meth)acrylic acid (for example, BISCOAT 6FM (produced by Osaka Organic Chemical Industry Ltd.) and M-2020 (produced by Daikin Industries, Ltd.), and completely or partially fluorinated vinyl ethers. Listed as monomers to provide a crosslinking group are vinyl monomers previously having a crosslinking functional group in the molecule, such as glycidyl methacrylate, vinyltrimethoxysilane, γ-methacryloyloxypropyltrimethoxysilane, or vinyl glycidyl ether, as well as vinyl monomers having a carboxyl group, a hydroxyl group, an amino group, or a sulfone group (for example, (meth)acrylic acid, methylol (meth)acrylate, hydroxyalkyl (meth)acrylate, allyl acrylate, hydroxyalkyl vinyl ether, and hydroxyalkyl allyl ether). Japanese Patent O.P.I. Publication Nos. 10-25388 and 10-147739 describe that a crosslinking structure is introduced into the latter by adding compounds having a group which reacts with the functional group in the polymer and at least one reacting group. Listed as examples of the crosslinking group are a acryloyl, methacryloyl, isocyanate, epoxy, aziridine, oxazoline, aldehyde, carbonyl, hydrazine, carboxyl, methylol or active methylene group. When fluorine containing polymers undergo thermal crosslinking due to the presence of a thermally reacting crosslinking group or the combinations of an ethylenic unsaturated group with thermal radical generating agents or an epoxy group with a heat generating agent, the above polymers are of a heat curable type. On the other hand, in cases in which crosslinking undergoes by exposure to radiation (preferably ultraviolet radiation and electron beams) employing combinations of an ethylenic unsaturated group with photo-radical generating agents or an epoxy group with photolytically acid generating agents, the polymers are of an ionizing radiation curable type.

The ratio of each monomer to form the fluorine containing copolymers prior to coating is as follows. The ratio of fluorine containing vinyl monomers is preferably 20-70 mol percent, but is more preferably 40-70 mol percent; the ratio of monomers to provide a crosslinking group is preferably 1-20 mol percent, but is more preferably 5-20 mol percent, and the ratio of the other monomers simultaneously employed is preferably 10-70 mol percent, but is more preferably 10-50 mol percent.

The low refractive index layer of the present invention can be formed via coating, employing a dip coat method, an air knife coat method, a curtain coat method, a roller coat method, a wire bar coat method, a gravure coat method, or an extrusion coat method (U.S. Pat. No. 2,681,294). Two or more layers may be applied simultaneously. The method of simultaneous application is described in, for example, U.S. Pat. Nos. 2,761,791, 2,941,898, 3,508,947, 3,526,528 and "Yuji Harasaki: Coating Engineering, p. 253 (1973), published by Asakura Publishing Co., Ltd."

The low refractive index layer of the present invention preferably has a thickness of 50-200 nm, and more preferably has a thickness of 60-150 nm.

(High Refractive Index Layer and Medium Refractive Index Layer)

In the present invention, a high refractive index layer is preferably arranged between a transparent support and a low refractive index layer. Further, to arrange a medium refractive index layer between a transparent substrate and a high refractive index layer is preferred to reduce the reflectance. A refractive index of a high refractive index layer is preferably 1.55-2.30 and more preferably 1.57-2.20. A refractive index of a medium refractive index layer is adjusted to be an intermediate value between a refractive index of a transparent support and a refractive index of a high refractive index layer. A refractive index of a medium refractive index layer is preferably 1.55-1.80. Thickness of a high refractive index layer and a medium refractive index layer is preferably 5 nm-1 μm, more preferably 10 nm-0.2 μm and most preferably 30 nm-0.1 μm. The haze of a high refractive index layer and a medium refractive index layer is preferably not more than 5%, more preferably not more than 3% and most preferably not more than 1%. The strength of a high refractive index layer and a medium refractive index layer is preferably not less than H based on pencil hardness at a loading weight of 1 kg, more preferably not less than 2H and most preferably not less than 3H.

It is preferable that the medium and high refractive index layers in the present invention are formed in such a manner that a coating solution containing a monomer or oligomer of an organic titanium compound represented by following Formula (1), or hydrolyzed products thereof are coated and subsequently dried, and the resulting refractive index is 1.55-2.5.

$$\text{Ti}(\text{OR}_1)_4 \qquad \text{Formula (1)}$$

where $R_1$ is an aliphatic hydrocarbon group having 1-8 carbon atoms, but is preferably an aliphatic hydrocarbon group having 1-4 carbon atoms. Further, in monomers or oligomers of organic titanium compounds or hydrolyzed products thereof, the alkoxide group undergoes hydrolysis to form a crosslinking structure via reaction such as —Ti—O—Ti, whereby a cured layer is formed.

Listed as prefered examples of monomers and oligomers of organic titanium compounds employed in the present invention are dimers—decamers of $\text{Ti}(\text{OCH}_3)_4$, $\text{Ti}(\text{OC}_2\text{H}_5)_4$, Ti(O-n-$C_3H_7$)$_4$, Ti(O-i-$C_3H_7$)$_4$, Ti(O-n-$C_4H_9$)$_4$, and Ti(O-n-$C_3H_7$)$_4$, and dimers—decamers of Ti(O-n-$C_4H_9$)$_4$. These may be employed singly or in combination of at least two types. Of these, particularly preferred are dimers—decamers of Ti(O-n-$C_3H_7$)$_4$, Ti(O-i-$C_3H_7$)$_4$, Ti(O-n-$C_4H_9$)$_4$, and Ti(O-n-$C_3H_7$)$_4$.

The content of monomers and oligomers of organic titanium compounds employed in the present invention, as well as hydrolyzed products thereof is preferably 50.0-98.0% by weight with respect to solids incorporated in the liquid coating composition. The solid ratio is more preferably 50-90% by weight, but is still more preferably 55-90% by weight. Other than these, it is preferable to incorporate polymers of organic titanium compounds (which are subjected to hydrolysis followed by crosslinking) in a liquid coating composition, or to incorporate titanium oxide particles.

The high refractive index and medium refractive index layers in the present invention may incorporate metal oxide particles as particles and further may incorporate binder polymers.

In the above method of preparing a coating solution, when hydrolyzed/polymerized organic titanium compounds and metal oxide particles are combined, both strongly adhere to each other, whereby it is possible to obtain a strong coating layer provided with hardness and flexibility in evenly coated layer.

The refractive index of metal oxide particles employed in the high.and medium refractive index layers is preferably 1.80-2.80, but is more preferably 1.90-2.80. The weight average diameter of the primary particle of metal oxide particles is preferably 1-150 nm, is more preferably 1-100 nm, but is most preferably 1-80 nm. The weight average diameter of metal oxide particles in the layer is preferably 1-200 nm, is more preferably 5-150 nm, is still more preferably 10-100 nm, but is most preferably 10-80 nm. Metal oxide particles at an average particle diameter of at least 20-30 nm are determined employing a light scattering method, while the particles at a diameter of at most 20-30 nm are determined employing electron microscope images. The specific surface area of metal oxide particles is preferably 10-400 $m^2$/g as a value determined employing the BET method, is more preferably 20-200 $m^2$/g, but is most preferably 30-150 $m^2$/g.

Examples of metal oxide particles are metal oxides containing at least one element selected from the group consisting of Ti, Zr, Sn, Sb, Cu, Fe, Mn, Pb, Cd, As, Cr, Hg, Zn, Al, Mg, Si, P, and S. Specifically listed are titanium dioxide, (for example, rutile, rutile/anatase mixed crystals, anatase, and amorphous structures), tin oxide, indium oxide, zinc oxide, and zirconium oxide. Of these, titanium oxide, tin oxide, and indium oxide are particularly preferred. Metal oxide particles are composed of these metals as a main component of oxides and are capable of incorporating other metals. Main component, as described herein, refers to the component of which content (in percent by weight) is the maximum in the particle composing components. Listed as examples of other elements are Ti, Zr, Sn, Sb, Cu, Fe, Mn, Pb, Cd, As, Cr, Hg, Zn, Al, Mg, Si, P and S.

It is preferable that metal oxide particles are subjected to a surface treatment. It is possible to perform the surface treatment employing inorganic or organic compounds. Listed as examples of inorganic compounds used for the surface treatment are alumina, silica, zirconium oxide, and iron oxide. Of these, alumina and silica are preferred. Listed as examples of organic compounds used for the surface treatment are polyol, alkanolamine, stearic acid, silane coupling agents, and titanate coupling agents. Of these, silane coupling agents are most preferred.

A ratio of metal oxide particles in the high and medium refractive index layers is preferably 5-65% by volume, and more preferably 20-55% by volume.

The above-described metal oxide particles are supplied to a coating solution, which forms a high refractive index layer, in a state of dispersion being dispersed in a medium. As a dispersion medium of metal oxide particles, preferable is a liquid having a boiling point of 60-170° C. Specific examples of a dispersion medium include water, alcohol (such as methanol, ethanol, isopropanol, butanol and benzylalcohol), ketone (such as acetone, methyl ethyl ketone, methyl isobutyl ketone and cyclohexanone), ketone alcohol (such as diacetone alcohol), ester (such as methyl acetate, ethyl acetate, propyl acetate, butyl acetate, methyl formate, ethyl formate, propyl formate and butyl formate), aliphatic hydrocarbon (such as hexane and cyclohexane), hydrocarbon halogenide (such as methylene chloride, chloroform and carbon tetrachloride), aromatic hydrocarbon (such as benzene, toluene and xylene), amide (such as dimethylformamide, dimethylacetamide and n-methylpyrrolidone), ether (such as diethyl ether, dioxane and tetrahydrofuran) and ether alcohol (such as 1-methoxy-2-propanol). Among them, toluene, xylene, methyl ethyl ketone, methyl isobutyl ketone, cyclohexanone and butanol are specifically preferable.

Further, metal oxide particles can be dispersed in a medium by use of a homogenizer. Examples of a homogenizer include a sand grinder mill (for example, a beads mill equipped with a pin), a high speed impeller mill, a baffle mill, a roller mill, an atliter and a colloidal mill. A sand grinder mill and a high speed impeller mill are specifically preferable. Further, a preliminary dispersion may be performed. Examples of a homogenizer utilized in a preliminary dispersion include a ball mill, a three-roll mill, a kneader and an extruder.

In a high refractive index layer and a medium refractive index layer usable in the present invention, polymer having a cross-linked structure (hereinafter, also referred to as cross-linked polymer) is preferably utilized as binder polymer. Examples of cross-linked polymer include cross-linked compounds of polymer provided with a saturated hydrocarbon chain such as polyolefin (hereinafter, generally referred to as polyolefin), polyether, polyurea, polyurethane, polyester, polyamine, polyamide and melamine resin. Among them preferable are cross-linked compounds of polyolefin, polyether and polyurethane, more preferable are cross-linked compounds of polyolefin and polyether, and most preferably are cross-linked compounds of polyolefin.

In the present invention, examples of monomer having at least two ethylenic unsaturated group include ester of polyhydric alcohol and (meth)acrylic acid (such as ethyleneglycol di(meth)acrylate, 1,4-cyclohexane diacrylate, pentaerythritol tetra(meth)acrylate, pentaerythritol tri(meth)acrylate, trimethylolpropane tri(meth)acrylate, trimethylolethane tri(meth)acrylate, dipentaerythritol tetra(meth)acrylate, dipentaerythritol pentatmeth)acrylate, pentaerythritol hexa(meth)acrylate, 1,2,3-cyclohexane tetramethacrylate, polyurethane polyacrylate and polyester polyacrylate), vinylbenzene and derivatives thereof (such as 1,4-divinylbenzene, 4-vinylbenzoic acid-2-acryloyl ethylester, and 1,4-divinylcyclohexanone), vinyl sulfone (such as divinyl sulfone), acrylamide (such as methylene bisacrylamide) and methacrylamide. As monomer having an anionic group and monomer having an amino group or a quaternary ammonium group, monomer available on the market may be utilized. Monomer having an anionic group which is available on the market and preferably utilized includes Kayamar PM-21 and PM-2 (manufactured by Nippon Kayaku Co., Ltd.); Antox MS-60, MS-2N and MS-NH4 (manufactured by Nippon Nyukazai Co., Ltd.);

Anilox M-5000, M-6000 and M-8000 series (manufactured by Toagosei Co., Ltd.); Viscoat #2000 series (manufactured by Osaka Organic Chemical Industry Ltd.); Newfrontier GX-8289 (manufactured by Dai-Ichi Kogyo Seiyaku Co., Ltd.); NK Ester CB-1 and A-SA (manufactured by Shin-Nakamura Chemical Co., Ltd.); and AR-100, MR-100 and MR-200 (manufactured by Dai-Hachi Chemical Industry Co., Ltd.). Further, monomer having an amino group or a quaternary ammonium group which is available on the market and preferably utilized includes DMAA (manufactured by Osaka Organic Chemical Industry Ltd.); DMAEA and DMAPAA (manufactured by Kohjin Co., Ltd.); Blemer QA (manufactured by Nippon Oil & Fat Co., Ltd.); and NewFrontier C-1615 (manufactured by Dai-Ichi Kogyo Seiyaku Co., Ltd.).

As a polymerization reaction of polymer, a photopolymerization reaction or a thermal polymerization reaction can be utilized and the former is specifically preferable. A polymerization initiator is preferably utilized. A polymerization initiator includes the above-described thermal polymerization initiator and photopolymerization initiator utilized to form binder polymer of a hard coat layer.

As a polymerization initiator, those available on the market may be utilized. A polymerization accelerator may be utilized in addition to a polymerization initiator. The addition amount of a polymerization initiator and a polymerization accelerator is preferably in the range of 0.2-10 mass % based on the total amount of monomer.

Added to each of the anti-reflection layers or the liquid coating compositions thereof may be polymerization inhibitors, leveling agents, thickeners, anti-coloring agents, UV absorbents, silane coupling agents, antistatic agents, and adhesion providing agents, other than the foregoing components such as metal oxide particles, polymers, dispersion media, polymerization initiators and polymerization accelerators.

In order to accelerate hydrolysis or curing of a composition containing metallic alkoxide, application of actinic radiation is preferable, after coating a medium or high refractive index layer in the present invention, or a low refractive index layer. Exposure to actinic radiation each time a layer is coated is more preferable.

There is no restriction to the type of the energy source for applying the actinic energy radiation used in the present invention, if it activates the compound by the ultraviolet ray, electron beam or gamma ray. The ultraviolet ray and electron beam are preferably used. The ultraviolet ray is particularly preferred since handling is easy and a high level of energy can be easily obtained. Any light source capable of generating the ultraviolet ray can be used as the light source of the ultraviolet ray for causing photo-polymerization of ultraviolet ray reactive compound. For example, it is possible to use the low voltage mercury lamp, intermediate voltage mercury lamp, high voltage mercury lamp, extra-high voltage mercury lamp, carbon arc light, metal halide lamp and xenon lamp. Further, the ArF excimer laser, KrF excimer laser, excimer lamp and synchrotron radiation can also be used. The conditions on irradiation differs according to each type. The preferred amount of irradiation is 20-10,000 $mJ/cm^2$. The more preferred amount is 100-2000 $mJ/cm^2$, and still more preferred amount is 400-2000 $mJ/cm^2$.

(Polarizing Plate)

The polarizing plate of the present invention and the liquid crystal display device of the present invention, employing the same will now be described.

A polarizing plate of the present invention can be produced by an ordinary method. A film in which the rear side (a side surface to be bonded with a polarizer) of a cellulose ester film Y or an optical compensation film W of the present invention is subjected to an alkali saponification process is bonded with the use of a complete saponification type polyvinyl-alcohol aqueous solution to both surfaces of a polarizer which produced by dipping a processed film in a iodine solution and by stretching the dipped film.

A polarizer, which is a prime element that constructs a polarizing plate, is an element that transmits only light in one certain direction through a polarizing face. Typical polarizer currently known are polyvinyl alcohol type polarizing films, which include those dyed with iodine and those dyed with a dichromatic dye. A currently used polarizer is a polarizer produced in such a way that a polyvinyl alcohol solution is formed into a film, then, the film is uniaxially stretched and then dyed, or the formed film is dyed first and then uniaxially stretched. Thereafter, the film is preferably subjected to durability processing with a boron compound. The thickness of a polarizer is 5 to 40 µm, preferably 5 to 30 µm, more preferably 5 to 25 µm. A polarizing plate is formed by bonding a cellulose ester film Y or an optical compensation film W of the present invention on the surface of the polarizer. Preferably is bonded with a water type adhesive primarily composed of completely saponified polyvinyl alcohol etc. Further, a resin film having a low adptability for saponification other than a cellulose ester film can be bonded to a polarizing plate through a proper adhesive layer.

Since the polarizer is uniaxially (commonly longitudinally) stretched, during its standing at high temperature and high humidity, it contracts in the stretching direction (commonly the longitudinal direction) and elongates in the lateral direction. Specifically, contraction of the polarizing film in the stretching direction is greater. Commonly, adhesion is performed so that the stretching direction of the polarizer and the casting direction (being the MD direction) of the Polarizing Plate Protective Film A are identical. Consequently, when the thickness of the polarizing plate protective film is decreased, it is particularly important to decrease its elongation and contraction ratio in the casting direction. The cellulose ester film of the present invention exhibits excellent dimensional stability, whereby it is appropriately employed as a polarizing plate protective film.

Further, it is possible to constitute a polarizing plate in such a manner that a protective film is adhered onto one side of the polarizing plate and a separate film is adhered to the other side. The protective film and the separate film are employed to protect the polarizing plate during shipment of the polarizing plate and inspection of the products. In such a case, the protective film is adhered to protect the surface of the polarizing plate and is employed on the opposite side to which another polarizing plate is adhered. The separate film is employed to cover the adhesion layer which is adhered to the liquid crystal plate and employed on the side to which the polarizing plate is adhered to the liquid crystal cell. A phase difference film may also be placed between the liquid crystal cell and the polarizing plate. Though the phase difference film is preferably prepared by stretching or contracting polycarbonate, modified polycarbonate, cyclic olefin and the like employing a commonly known method, it is not limited since the method is selected via balancing of a LCD viewing angle, durability and cost.

In a liquid crystal display device in which there are provided a vertical orientation mode liquid crystal cell, a polarizing plate A and a polarizing plate B to sandwich the liquid crystal cell therebetween, the polarizing plate A includes polarizing plate protective films A1 and A2 and the polarizing plate B includes polarizing plate protective films B1 and B2. And, at lease one of the polarizing plate protective films A2 and B2 arranged at a liquid crystal cell side is a cellulose ester film Y of the present invention and at lease one of the polarizing plate protective films A2 and B2 is arranged with an optical compensation film W having an optical anisotropic layer of the present invention, whereby it is characterized to attain the object of the present invention. Further, at least one of the protective films A2 and B2 is the optical compensation film W in which the optical anisotropic layer is formed on the cellulose ester film Y.

On another surface of each polarizing plate, a cellulose ester film Y or an optical compensation film W of the present invention or another polarizing plate protective film may be employed. For Employed as a polarizing plate protective film used on the other surface, in place of a cellulose ester film Y or an optical compensation film W of the present invention, may be commercially available cellulose ester film. For example, preferably employed as commercially available cellulose ester films are KC8UX2, KC4UX, KC5UX, KC4UY, KC8UY, KC12UR, KC8UCR-3, KV8UCR-4, KC8UY-HA, and KC8UX-RHA (all produced by Konica Minolta Opt, Inc.). Also preferably employed are Fujitac TD80UF, Fujitac T80UZ, Fujitac T40UZ, anti-reflection films (CV film Clearview UA, produced by Fuji Photo Film Co., Ltd.).

It is preferable that a polarizing plate protective film applied for another surface, especially a polarizing plate protective film applied on the observed side includes a hard coat layer or an anti-glare film having a thickness of 2-20 μm. Preferably employed are polarizing plate protective films including hard coat layers or anti-glare films described in Japanese Patent O.P.I. Publication 2003-114333, Japanese Patent O.P.I. Publication 2004-203009, Japanese Patent O.P.I. Publication 2004-354699 and Japanese Patent O.P.I. Publication 2004-354828. Further, it is preferred that the polarizing plate protective film includes an anti-reflection layer including at least a low refractive index layer provided on the hard coat layer or the anti-glare film, and particularly preferred that the low refractive index layer contains hollow particles.

(Liquid Crystal Display Device)

By employing a polarizing plate of the present invention into a display device, a liquid crystal display of the present invention excellent in various visibility can be produced. Especially, it can be applied preferably with a VA type (a MVA type, PVA type) liquid crystal display.

A liquid crystal display using a polarizing plate of the present invention can demonstrate the effect of the present invention more especially, when it is used in a multi-domain type liquid crystal display, and more preferably in a multi-domain type liquid crystal display with a birefringence mode.

in not shown

With regard to "multi-domain", it is a mode which divides a liquid crystal cell constituting one pixel further into plurality, and it is suitable also for improvement in viewing angle dependability and for improvement in symmetry of image presentation, and various modes are reported by Okita, Yamauchi "Liquid crystal, 6 (3), 303(2002)". The liquid crystal cell is indicated in "Liquid crystal, 7 (2), 184 (2003) by Yamada, Yamahara", and it is not necessarily limited to these.

In observation by people, it is desirable that the display quality of a display cell is symmetrical. Therefore, when a display cell is a liquid crystal display cell, domain can be made in multi by giving priority to the symmetry at the side of observation. The division of a domain can adopt a well-known method and can determine it in consideration of the nature of a well-known liquid crystal mode by a two divison method or more preferably a four divison method.

The polarizing plate of the present invention can be effectively used in MVA (Multi-domein Vertical Alignment) mode represented by vertical orientation mode, especially MVA mode divided in four, and a well-known PVA (Patterned Vertical Alignment) mode formed into a multi-domain by electrode arrangement.

EXAMPLE

This invention will be described more specifically using the following working examples, but this invention is not to be limited by these examples.

(Preparation of the Cellulose Ester Film A)

(Silicon Dioxide Dispersing Solution A)

| | |
|---|---|
| Aerosil 972 V (Manufactured by Japan Aerosil) (average diameter of primary particles 16 nm, apparent density 90 g/liter) | 12 parts by weight |
| Ethanol | 88 parts by weight |

The substances listed above were agitated and mixed in a dissolver for 30 minutes and then dispersion was performed using Manton Gaulin. 88 parts by weight of methylene chloride were loaded to the silicon dioxide dispersing solution while stirring and the resultant was agitated and mixed for 30 minutes using a dissolver to thereby prepare the silicon dioxide dispersing solution diluent A.

(Preparation of In-line Additive A)

| | |
|---|---|
| TINUVIN 109 (Manufactured by Chiba Specialty Chemicals) | 11 parts by weight |
| TINUVIN 171 (Manufactured by Chiba Specialty Chemicals) | 5 parts by weight |
| Methylene chloride | 100 parts by weight |

The substances above were charged to a sealed container and heated while being stirred so as to be completely dissolved and then filtered.

36 parts by weight of the silicon dioxide dispersing solution diluent A was added to the resultant while stirring and after stirring for a further 30 minutes, 6 parts by weight of cellulose acetate propionate (degree of substitution of acetyl base 1.9, degree of substitution of propionyl base 0.8) was added while stirring, and after stirring for a further 60 minutes, the resultant was filtered. with a polypropylene wind cartridge filter TCW-PPS-1N to thereby prepare inline additive A.

(Preparation of Dope Solution A)

| | |
|---|---|
| Cellulose ester (cellulose triacetate synthesized from linter cotton, Mn = 148,000, Mw = 310,000, Mw/Mn = 2.1, degree of acetyl substitution 2.92) | 100 parts by weight |
| Triphenyl phosphate | 10 parts by weight |
| Biphenyldiphenyl phosphate | 2 parts by weight |
| Methylene chloride | 430 parts by weight |
| Ethanol | 40 parts by weight |

The substances above were charged to a sealed container and completed dissolved by being heated and stirred, and then filtered using Azumi filter paper No. 24 manufactured by Azumi Filter Paper Co., Ltd. to thereby prepare Dopant A.

Dope solution A was filtered using Fine Met NF manufactured by Nippon Seisen Co., Ltd in a film manufacturing line. The inline additive A was filtered in-line by the Fine Met NF manufactured by Nippon Seisen Co., Ltd in the inline additive line. 2 parts by weight of the filtered inline solution were added to 100 parts by weight of the filtered dope solution A and then sufficiently mixed in an inline mixer (Toray static in-tube mixer Hi-Mixer SWJ) and then using a belt casting device, the resultant was evenly cast on a 2-m width stainless steel band support at 35° C. The solvent was evaporated on the stainless steel band support until the remaining solvent amount was 120%, and then peeled from the stainless steel band support. The solvent of web in the peeled cellulose ester was evaporated at 35° C., and slit at 1,650 mm width, and subsequently stretched to 1.1 times by the tenter in the TD direction (direction perpendicular to the film conveyance direction) while drying at a temperature of 135° C. At this time, the remaining solvent amount at the start of stretching by the tenter was 30%.

Subsequently, after being dried at 120° C., the heat treatment is completed while conveying the 135° C. heat treatment zone using multiple rollers, and then slitting was done at 1.5 m width and then knurling processing was carried out at both ends of the film at width 15 mm and average height 10 μm and then wound on a core having an inner diameter of 6 inches at initial winding tension of 220 N/m and end tension of 110 N/m to thereby form the. cellulose ester film A. The stretching ratio in the MD direction (same direction as film conveyance direction immediately after peeling) that is calculated from the rotation speed of the stainless steel band support and the drive speed of the tenter was 1.07 times. The remaining solvent amount in the cellulose ester film A was less than 0.1%, the average film thickness was 80 μm and the winding number was 3,000 m. Ro was 0 nm and Rt was 50 nm.

(Preparation of Cellulose Ester Film 1 to 31)

(Polymer X Synthesis)

40 g of a mixture of monomer Xa and Xb of the types and ratios shown in Table 1, 2 g of mercapto propionic acid which is a chain transfer agent and 30 g of toluene were charged to a glass flask which includes an agitator, 2 pipettes, a gas introducing tube and a thermometer, and the temperature was increased to 90° C. Subsequently, 60 g of a mixture of monomer Xa and Xb of the types and ratios shown in Table 1 were added by dropping over a 3-hour period using one of the pipettes and at the same time, 0.4 g of azobisisobutylonitryl dissolved in 14 g of toluene were added by dropping over a 3-hour period. Subsequently 0.6 g of azobisisobutylonitryl dissolved in 56 g of toluene were further added by dropping over a 2-hour period and the reaction was continued for another 2 hours, and polymer X was thereby obtained. The weight average molecular weight of the polymer X is shown in Table 1 by the measurement methods below. The amount of the chain transfer agent mercapto propionic acid which is added changes the addition speed of the azobisisobutylonitryl and polymers X with different molecular weight are formed.

It is to be noted that MA, MMA, HEA and HMA respectively are abbreviations for the following compounds.
MA: metyl acrylate
MMA: methyl metacrylate
HEA: 2-hydroxyethyl acrylate
HEMA: 2-hydroxyethyl metacrylate (Measurement of Molecular Weight)

The measurement of the weight average molecular weight is done using high speed liquid chromatography.

The conditions for measurement are as follows.
Solvent: methylene chloride
Column: Shodex K806, K805, K803G (Three columns manufactured by Showa Denko K. K, are used consecutively.)
Column temperature: 25° C.
Sample concentration: 0.1 mass %
Detector: RI Model 504 (Manufactured by GL Science)
Pump: L6000 (Manufactured by Hitachi, Ltd.)
Flow rate: 1.0 ml/min
Calibration curve: Standard polystyrene STK standard polystyrene (Manufactured by Tohso) Correction calibration by 13 samples of Mw=1,000,000–500 is used. The 13 samples use substantially equal intervals.

(Synthesis of Polymer Y)

Bulk polymerization was performed using the polymerization methods described in Japanese Patent Application Laid-Open No. 2000-128911. That is to say, methylacrylate or methyl metacrylate was charged as the monomer Ya to a flask which includes an agitator, a nitrogen gas introducing tube a thermometer and charging port, and nitrogen gas was introduced, and the thioglycerol below which is substituted with nitrogen gas in the flask was added while stirring. After addition of the thioglycerol, the temperature of the content was appropriately changed and polymerization was performed for 4 hours, and the temperature of the content was returned to room temperature, and then 20 parts by weight of a tetrahydrofuran solution with 5 mass % of benzoquinone was added and polymerization was stopped. The content was transferred to an evaporator and the tetrahydrofuran and the remaining monomer and remaining thioglycerol were removed and polymer Y in Table 1 was obtained. The weight average molecular weight of the Polymer Y is shown in Table 1 by the measurement methods above.

| | |
|---|---|
| Metacrylate or methyl metacrylate | 100 weight parts |
| Thioglycerol | 5 weight parts |

<Example of Synthesis of Polymer UV Agent P-1>

2(2'-hydroxy-5'-t-butyl-phenyl)-5-carbonate-(2-metacryloyloxy)ethylester-2H-benzotriazole (sample compound MUV-19) is synthesized according to the method described below.

20.0 g of 3-nitro-4-amino-benzoate was dissolved in 160 ml of water and 43 ml of concentrated hydrochloric acid was added. After 8.0 g of sodium nitrite that has been dissolved in 20 ml of water was added at 0° C., the resultant was mixed with the temperature remaining at 0° C. for 2 hours. This solution was added by being dropped into a solution in which 17.3 g of 4-t-butyl phenol was dissolved in 50 ml of water and 100 ml of ethanol while maintaining alkalinity of the solution using calcium carbonate. This solution was kept for 1 hour at 0° C. and then stirred for 1 hour at room temperature. The reaction solution was made acidic using hydrochloric acid, and the precipitate that is created was filtered and then washed well.

The filtered precipitate was dissolved in 500 ml of an aqueous solution of 1 mol/L sodium hydroxide, and after 35 g of zinc powder is added, 110 g of a 40% NaOH aqueous solution was added by dropping. After dropping, the resultant was stirred for 2 hours filtered then washed and then the filtrate was neutralized with hydrochloric acid to become neutral. The deposited precipitate was filtered, washed and dried and then re-crystallized with a mixture of ethyl acetate and acetone to thereby obtain 2(2'-hydroxy-5'-t-butyl-phenyl)-5-carbonate-2H-benzotriazole.

Next 10.0 g of the 2(2'-hydroxy-5'-t-butyl-phenyl)-5-carbonate-2H-benzotriazole and 0.1 g hydroxyquinone, 4.6 g of 2-hydroxyethylmetacrylate and 0.5 g of p-toluene sulfonate were added to 100 ml of toluene and refluxing under heat is performed for 10 hours in a reaction vessel that has an esterification tube. The reaction solution is poured into water and the deposited crystals are filtered, washed and dried and re-crystallized to thereby obtain 2(2'-hydroxy-5'-t-butyl-phenyl)-5-carbonate-(2-metacryloyloxy)ethylester-2H-benzotriazole which is the sample compound MUV-19.

Next a copolymer of 2(2'-hydroxy-5'-t-butyl-phenyl)-5-carbonate-(2-metacryloyloxy)ethylester-2H-benzotriazole and methyl metacrylate (high polymer UV agent P-1) was synthesized according to the method described below.

4.0 g of 2(2'-hydroxy-5'-t-butyl-phenyl)-5-carbonate-(2-metacryloyloxy)ethylester-2H-benzotriazole synthesized in synthesis example 3 above and 6.0 g of methyl metacrylate were added to 80 ml of tetrahydrofuran and next 1.14 g of azoisobutryronitryl were added. The resultant was heated under reflux for 9 hours. The tetrahydrofuran was subjected to reduced pressure distillation, and then added by dropping in excess methanol. The deposited precipitate was filtered then vacuum dried at 40° C. and 9.1 g of gray powder polymer which is high polymer UV agent P-1 was obtained. It was confirmed by GPC analysis using standard polystyrene as a reference, that this copolymer was one with a number average molecular weight of 4,500. In addition, it was also confirmed that the copolymer was a copolymer of 2(2'-hydroxy-5'-t-butyl-phenyl)-5-carbonate-(2-metacryloyloxy)ethylester-2H-benzotriazole and methyl metacrylate using the NMR spectrum and UV spectrum. The compositon of 2(2'-hydroxy-5'-t-butyl-phenyl)-5-carbonate-(2-metacryloyloxy)ethylester-2H-benzotriazole:methyl metacrylate was substantially equal to 40:6.

(Preparation of Cellulose Ester Film Y)

The cellulose ester film Y of this invention was prepared as follows.

(Dopant Preparation)

| | |
|---|---|
| Cellulose ester (cellulose triacetate synthesized from linter cotton, Mn = 148,000, Mw = 310,000, Mw/Mn = 2.1, degree of acetyl substitution 2.92) | 100 parts by weight |
| Polymer X | Amount in Table 1 |
| Polymer Y | Amount in Table 1 |
| Polymer UV-agent P-1 | 3 parts by weight |
| Silicon oxide particles (Aerosil R972V (Manufactured by Japan Aerosil)) | 0.1 parts by weight |
| Methylene chloride | 430 parts by weight |
| Ethanol | 40 parts by weight |

(Cellulose Ester Film Y Formation)

The dopant was prepared with addition ratios of polymer X and polymer Y as shown in Table 1, and then filtered using Fine Met NF manufactured by Nippon Seisen Co. and then uniformly cast on a stainless steel band support having a width of 2 m at a temperature of 22° C. The solvent was evaporated on the stainless steel band support until the amount of remaining solvent is 90% and peeled from the stainless steel support with a peeling tension of 162 Newton/m. The solvent was evaporated from the peeled cellulose ester web at 35° C. and slit at a width of 1.6 m, and subsequently stretched by a tenter in the transverse direction to 1.1 times and then dried at a drying temperature of 135° C. At this time, amount of remaining solvent when stretching has been started at the tenter was 10%. After stretching at the tenter and relaxation was performed for 5 minutes at 130° C., drying was completed by while conveying the web with a plurality of rollers in the 120° C., 130° C. zone and a slit was made at a width of 1.5 m and then knurling processing was carried out at both ends of the film at width 10 mm and a height 5 μm and then wound on a core having an inner diameter of 6 inches at the initial tension of 220 N/m and end tension of 110 N/m to thereby form the cellulose ester films 1-31 which are the cellulose ester films Y of this invention shown in Table 1. The stretching ratio in the MD direction that is calculated from the rotation speed of the stainless steel band support and the drive speed of the tenter was 1.1 times. The remaining solvent amount in the cellulose ester films in Table 1 were less than 0.1% each, the average film thickness was 80 μm and the winding number was 4,000 m.

It is to be noted that the cellulose ester film 30 was prepared in the same manner except that the film thickness was 40 μm, and the cellulose ester film 8 is prepared in the same manner except that the film thickness was 60 μm, and the cellulose ester films 4 and 29 were prepared in the same manner except that the polymer UV agent P-1 was excluded. In addition, the cellulose ester films 30 and 31 were prepared in the same manner except that the polymer UV agent P-1 was replaced by the ultraviolet ray absorbing agent.

| | |
|---|---|
| TINUVIN 109 (Manufactured by Chiba Specialty Chemicals) | 1.5 parts by weight |
| TINUVIN 171 (Manufactured by Chiba Specialty Chemicals) | 0.7 parts by weight |

<Evaluation Method>

The obtained cellulose ester films 1-31 were evaluated as follows.

(Retardation Ro, Rt)

10 locations on the cellulose ester films 1-31 were measured using an automatic birefringence analyzer (KOBRA-21ADH manufactured by Oji Scientific Instruments) under an ambience of 23° C., 55% RH at a wavelength of 590 nm, and the retardation in the plane direction Ro which is shown in Equation (a), and the retardation in the thickness direction Rt which is shown in the Equation (b) are determined. The 10 locations respectively are measured and the average value thereof is shown. It is to be noted that the average refractive index is determined by an Abbe refractive index meter.

$$Ro = (nx - ny) \times d \quad \text{Equation (a)}$$

$$Rt = ((nx + ny)/2 - nz) \times d \quad \text{Equation (b)}$$

(In these equations, Ro is the retardation value in the film plane, Rt is the retardation value in the film thickness direction; nx is the refractive index in the lag phase axis direction inside the film plane, ny is the refractive index in the advance phase axis direction inside the film plane, nz is the refractive index in the thickness direction and d is the film thickness (nm)).

The evaluation results are shown in Table 1.

TABLE 1

| | Polymer X | | | | | Polymer Y | | Amount (Parts by Weight) | | | Cellulose Ester Film | | |
|---|---|---|---|---|---|---|---|---|---|---|---|---|---|
| | Xa | | Xb | | | | | Cellulose | | | Thickness | Rt | Ro |
| *1 | Type | *2 | Type | *2 | *3 | Type | *3 | Ester | Polymer X | Polymer Y | (μm) | (nm) | (nm) |
| 1 | MMA | 80 | HEA | 20 | 5000 | MA | 1000 | 100 | 17 | 0 | 80 | 4 | 1 |
| 2 | MMA | 100 | HEA | 0 | 5000 | MA | 1000 | 100 | 11 | 6 | 80 | 8 | 2 |

TABLE 1-continued

| *1 | Polymer X Xa Type | *2 | Xb Type | *2 | *3 | Polymer Y Type | *3 | Amount (Parts by Weight) Cellulose Ester | Polymer X | Polymer Y | Cellulose Ester Film Thickness (μm) | Rt (nm) | Ro (nm) |
|---|---|---|---|---|---|---|---|---|---|---|---|---|---|
| 3 | MMA | 98 | HEA | 2 | 5000 | MA | 1000 | 100 | 11 | 6 | 80 | 3 | 0 |
| 4 | MMA | 90 | HEA | 10 | 5000 | MA | 1000 | 100 | 11 | 6 | 80 | 1 | 0 |
| 5 | MMA/MA | 80/10 | HEA | 10 | 5000 | MA | 1000 | 100 | 11 | 6 | 80 | 0 | 0 |
| 6 | MMA | 85 | HEA | 15 | 5000 | MA | 1000 | 100 | 10 | 7 | 80 | −1 | 0 |
| 7 | MMA | 80 | HEA | 20 | 5000 | MA | 1000 | 100 | 10 | 7 | 80 | −3 | 0 |
| 8 | MMA | 75 | HEA | 25 | 5000 | MA | 1000 | 100 | 10 | 7 | 60 | −2 | 0 |
| 9 | MMA | 70 | HEA | 30 | 5000 | MA | 1000 | 100 | 11 | 6 | 80 | 4 | 3 |
| 10 | MMA | 60 | HEA | 40 | 5000 | MA | 1000 | 100 | 11 | 6 | 80 | 5 | 2 |
| 11 | MMA | 80 | HEA | 20 | 3000 | MA | 1000 | 100 | 11 | 6 | 80 | −3 | 0 |
| 12 | MMA | 80 | HEA | 20 | 8500 | MA | 1000 | 100 | 11 | 6 | 80 | −2 | 0 |
| 13 | MMA | 80 | HEA | 20 | 12000 | MA | 1000 | 100 | 11 | 6 | 80 | 0 | 0 |
| 14 | MMA | 80 | HEA | 20 | 30000 | MA | 1000 | 100 | 11 | 6 | 80 | 4 | 0 |
| 15 | MMA | 80 | HEA | 20 | 35000 | MA | 1000 | 100 | 11 | 6 | 80 | 9 | 2 |
| 16 | MMA | 80 | HEMA | 20 | 5000 | MA | 1000 | 100 | 11 | 6 | 80 | 0 | 0 |
| 17 | MMA | 90 | HEMA | 10 | 5000 | MA | 1000 | 100 | 11 | 6 | 80 | −5 | 0 |
| 18 | MMA | 90 | HEMA | 10 | 2000 | MMA | 500 | 100 | 13 | 5 | 80 | −10 | 0 |
| 19 | MMA | 80 | HEA | 15 | 5000 | MA | 3000 | 100 | 11 | 5 | 80 | 2 | 0 |
| 20 | MMA | 80 | HEA | 15 | 5000 | MA | 4000 | 100 | 13 | 4 | 80 | 4 | 2 |
| 21 | MMA | 80 | HEA | 15 | 5000 | MA | 1000 | 100 | 15 | 2 | 80 | 4 | 0 |
| 22 | MMA | 80 | HEA | 20 | 5000 | MA | 1000 | 100 | 12 | 2 | 80 | 4 | 0 |
| 23 | MMA | 80 | HEA | 20 | 5000 | MA | 1000 | 100 | 13 | 3 | 80 | 0 | 0 |
| 24 | MMA | 80 | HEA | 20 | 5000 | MA | 1000 | 100 | 12 | 4 | 80 | 0 | 0 |
| 25 | MMA | 80 | HEA | 20 | 5000 | MA | 1000 | 100 | 10 | 6 | 80 | −1 | 0 |
| 26 | MMA | 80 | HEA | 20 | 5000 | MA | 1000 | 100 | 15 | 5 | 80 | −2 | 0 |
| 27 | MMA | 80 | HEA | 20 | 5000 | MA | 1000 | 100 | 5 | 10 | 80 | −4 | 0 |
| 28 | MMA | 80 | HEMA | 5 | 5000 | MA | 1000 | 100 | 10 | 7 | 80 | −4 | 0 |
| 29 | MMA | 80 | HEMA | 10 | 4000 | MA | 1000 | 100 | 10 | 7 | 80 | −3 | 0 |
| 30 | MMA | 80 | HEMA | 15 | 3000 | MA | 1000 | 100 | 11 | 6 | 40 | −3 | 0 |
| 31 | MMA | 80 | HEMA | 20 | 3000 | MA | 1000 | 100 | 11 | 6 | 80 | −2 | 0 |

*1: Cellulose Ester Film No.,
*2: Proportion (%),
*3: Weight Average Molecular Weight (Preparation of Optical Compensation Film W)

<Preparation of Optical Compensation Film 1>

The polyimide (Mw=100,000) formed from the repeating units shown in formula W below was synthesized from 2-2'-bis(3,4-dicarboxyphenyl)hexafluoropropanate dianhydride (6FDA) and 2,2'-bis(trifluoromethyl)-4,4'-diaminobiphenyl (PFMB).

This polyimide was dissolved in a cyclohexanone solution to prepare a 15 mass % polyimide solution. The solution was coated on the cellulose ester film A and was stretched to 1.1 times in the transverse direction with a tenter while being dried at 160° C., and a birefringent optical film was obtained on the stretched TAC film. The polyimide layer had a thickness of 6 μm.

The obtained optical compensation film 1 had Ro of 75 nm and Rt of 260 nm for the entire film.

[Formula 24]

Formula (W)

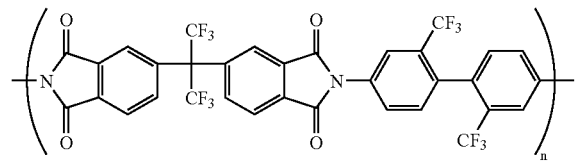

<Optical Compensation Film 2>

The polyimide (Mw=120,000) formed from the repeating units shown in formula W was synthesized from 2-2'-bis(3,4-dicarboxyphenyl)hexafluoropropanate dianhydride (6FDA) and 2,2'-bis(trifluoromethyl)-4,4'-diaminobiphenyl (PFMB).

This polyimide was dissolved in a cyclohexanone solution to prepare a 15 mass % polyimide solution. The solution was coated on the cellulose ester film 4 and was stretched to 1.1 times in the transverse direction with a tenter while being dried at 160° C., and a birefringent optical film was obtained on the stretched TAC film. The polyimide layer had a thickness of 6 μm.

The obtained optical compensation film 2 had Ro of 80 nm and Rt of 220 nm for the entire film.

<Optical Compensation Film 3>

The polyimide (Mw=110,000) formed from the repeating units shown in formula W was synthesized from 2-2'-bis(3,4-dicarboxyphenyl)hexafluoropropanate dianhydride (6FDA) and 2,2'-bis(trifluoromethyl)-4,4'-diaminobiphenyl (PFMB).

This polyimide was dissolved in a cyclohexanone solution to prepare a 15 mass % polyimide solution. The solution was coated on the cellulose ester film 4 and was stretched to 1.1 times in the transverse direction with a tenter while being dried at 160° C., and a birefringent optical film was obtained on the stretched TAC film. The polyimide layer had a thickness of 8 μm.

The obtained optical compensation film 3 had Ro of 100 nm and Rt of 260 nm for the entire film.

<Optical Compensation Film 4>
(Preparation of Oriented Film)

Cellulose ester film 1 as Cellulose ester film Y was coated with a gelatin layer (having a thickness of 0.1 μm), further coated on the gelatin layer with a solution in which one gram of straight chained alkyl modified polyvinyl alcohol (MP203, manufactured by Kuraray Co., Ltd.) was dissolved in 100 ml of a mixture solvent of methanol/water (=1:4) employing a wire bar No. 3, dried at 80° C. employing hot air, and subjected to a rubbing treatment. Thus, an oriented film was obtained.

(Composition of Liquid Crystal Compound Solution)

| | |
|---|---|
| MEK (methylethyl ketone) | 89.5 parts |
| Compound 1 | 2 parts |
| Compound 2 | 4 parts |
| Compound 3 | 3 parts |
| Ilugacure 369 (produced by Ciba Specialty Co., Ltd.) | 1.5 parts |

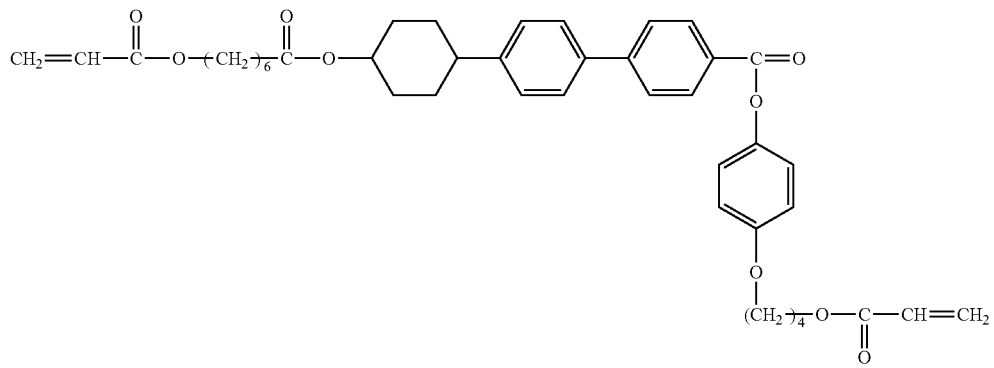

Compound 1

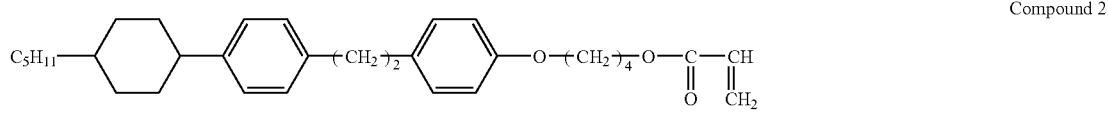

Compound 2

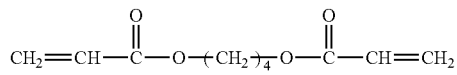

Compound 3

(Preparation of Optical Compensation Film 4)

The liquid crystal compound solution was coated on the above oriented film by employing a wire bar No. 5, dried at 55° C. for 30 seconds, heated at 75° C. for 30 seconds, nitrogen purged at 98 kPa for 60 seconds, and hardened with ultraviolet light of 450 mJ under an oxygen concentration of 0.1%. Thus, optical compensation film 4 was obtained.

Ro and Rt of the optical compensation film 4 were measured using a birefringence analyzer (KOBRA-21ADH manufactured by Oji Scientific Instruments), thereby obtaining Ro=450 nm and Rt=225 nm.

Incidentally, when preparing a polarizing plate, the optical compensation film 4 was arranged such that the slow phase axis of the optical compensation film 4 became perpendicular to the absorption axis of the polarizing plate.

<Optical Compensation Film 5>
(Optical Functional Oriented Film Composition)
Structure of a repetition unit: (I/Z)

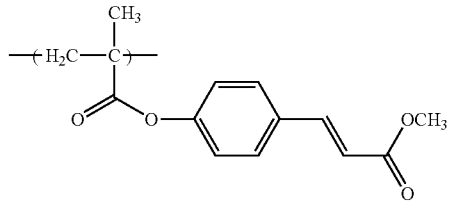

I

-continued

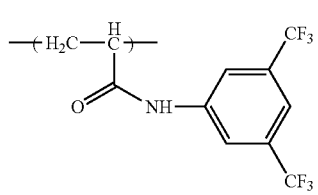

Z

Copolymerization composition ratio (mole %): 95/5
Number average molecular weight: 11000

(Formation of Optical Functional Orientated Film)

The optical functional orientated film having the above-mentioned composition was dissolved by methyl ethyl ketone so as to obtain a solution of 1.5% by mass. This solution was coated to the above-mentioned cellulose ester film A using a spin applicator, and dried for 2 minutes by 80° C. warm air. Ultraviolet rays of the linear polarization having a line spectrum near a wavelength of 313 nm were irradiated from the vertical direction to a film plane, and thereby providing an optical functional orientated film. The amount of illuminating radiation was 500 mJ/cm2, and the surface energy after light irradiation was 45 mJ/cm2.

(Optical Anisotropy Layer)

On the above-mentioned optical functional orientated film, a coating solution of the following compositions was continuously coated using a bar coater. The coating layer was heated for 1 minute at 125° C., and a discotic liquid crystal compound was oriented. At this temperature, ultraviolet rays were irradiated with 600 mJ/cm2 for 4 seconds, the discotheque liquid crystal compound was polymerized, and the orientation state was fixed. Whereby an optical anisotropy layer (thickness of 4.5 micrometers) was formed, and optical compensation film 5 was produced. Ro and Rt of the optical compensation film 5 were measured using a birefringence analyzer (KOBRA-21ADH manufactured by Oji Scientific Instruments), thereby obtaining Ro=412 nm and Rt=225 nm.

(Coating Solution Composition of Discotic Liquid Crystal Compound Layer)

| | |
|---|---|
| Discotic liquid crystal compound shown below | 30% by mass |
| Sensitizer shown below | 0.15% by mass |
| Photopolymerization initiator shown below | 0.45% by mass |
| Orientation control agent shown below | 0.10% by mass |
| Methyl ethyl keton | 69.3% by mass |

Discotic liquid crystal compound

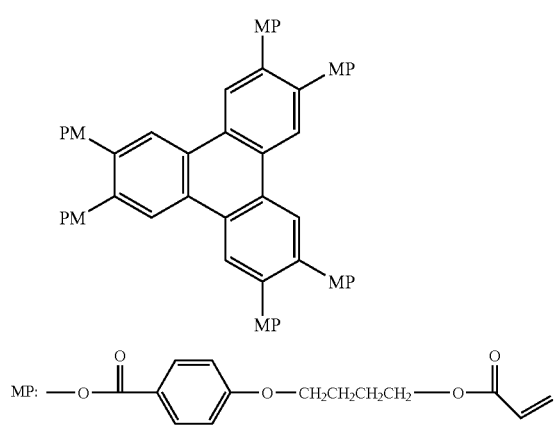

Sensitizer

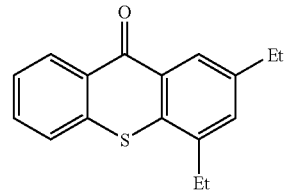

Photopolymerization initiator

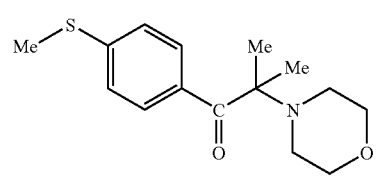

Orientation control agent

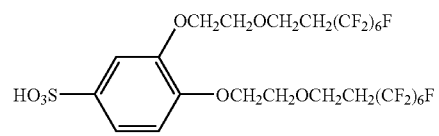

(Preparation of the Antireflection Film A1)

The antireflection layer was coated under the preparation conditions shown below using the cellulose ester film A prepared above to thereby prepare the antireflection film A1.

<Coating of Hard Coat Layer and Back Coat Layer>

The hard coat layer coating solution 1 was filtered using a polypropylene filter having a hole diameter of 0.4 μm to thereby prepare the hard coat layer coating solution 1, and this was coated onto the cellulose ester film A prepared above, using a microgravure coater. After this is dried at 90° C., the coated layer was cured using an ultraviolet lamp in which the luminance of the illumination section is 100 mW/cm² and the amount of illumination is 0.1 J/cm², and a hard coat layer with a dry thickness of 7 μm was formed to thereby prepare a hard coat film.

<Hard Coat Layer Coating Solution 1>

The materials below were stirred and mixed to form the hard coat layer coating solution 1.

Acryl monomer; KAYARAD DPHA (dipentaerythritol

| | |
|---|---|
| Acryl monomer; KAYARD DPH (dipentaerythritol hexaacrylate manufactured by Nippon Kayaku) | 220 parts by weight |
| Irgacure 184 (Manufactured by Chiba Specialty Chemicals) | 20 parts by weight |
| Propylene glycol monomethyl ether | 110 parts by weight |
| Ethyl acetate | 110 parts by weight |

In addition the back coat layer composition was coated using an extrusion coater so as to have a wet thickness of 10 μm and then dried at 85° C. and wound to thereby provide the back coat layer.

<Back Coat Layer Composition>

| | |
|---|---|
| Acetone | 54 parts by weight |
| Methylethyl ketone | 24 parts by weight |
| Methanol | 22 parts by weight |
| Diacetyl cellulose | 0.6 parts by weight |
| Ultra-fine grain silica 2% acetone dispersing solution (Aerosil 200V Manufactured by Japan Aerosil) | 0.2 parts by weight |

<Preparation of the Antireflection Film>

The antireflection layer was coated on the hard coat film 1 prepared above by successively coating the high refractive index layer below and then the low refractive index layer and thereby form the antireflection film A1.

(Preparation of the Antireflection Layer: High Refractive Index layer)

The high refractive index layer coating composition 1 shown below was coated on the hard coat film using an extrusion coater and dried at 80° C. for 1 hour and then irradiated with ultraviolet light at 0.1 J/cm$^2$ to cure and then further subjected to heat curing at 100° C. for 1 minute so as to form the high refractive index layer with a thickness of 78 nm.

The refractive index of the high refractive index layer was 1.62.

<High Refractive Index Layer Coating Composition 1>

| | |
|---|---|
| Isopropyl alcohol solution of metal oxide particles (solid content 20%, ITO particle diameter 5 nm) | 55 parts by weight |
| Metal Compound: Ti(OBu)$_4$ (tetra-n-butoxytitan) | 1.3 parts by weight |
| Ionizing radiation cure type ester: dipentaerythritol hexaacrylate | 3.2 parts by weight |

Polymerization initiating agent

| | |
|---|---|
| Irgacure 184 (Manufactured by Chiba Specialty Chemicals) | 0.8 parts by weight |
| 10% propylene glycol monomethyl ether solution of straight chain dimethyl silicone-EO block copolymer (FZ-2207, Manufactured by Nippon Unicar Company Limited) | 1.5 parts by weight |
| Propylene glycol monomethyl ether | 120 parts by weight |
| Isopropyl alcohol | 240 parts by weight |
| Methylethyl ketone | 40 parts by weight |

(Preparation of the Antireflection Layer: Low Refractive Index layer)

The low refractive index layer coating composition 1 shown below was coated on the high refractive index layer using an extrusion coater and dried at 100° C. for 1 hour and then irradiated with ultraviolet light at 0.1 J/cm$^2$ to cure and then further subjected to heat curing at 120° C. for 5 minutes so as to provide the low refractive index layer with a thickness of 95 nm. The antireflection film A1 was thereby prepared. It is to be noted that the refractive index of the low refractive index layer was 1.37.

(Preparation of Low Refractive Index Layer Coating Composition 1)

<Preparation of Tetraetoxysilane Hydrolysate A>

289 g of tetraetoxysilane hydrolysate and 553 g of ethanol were admixed and the resultant was added to 157 g of 0.15% acetate solution aqueous solution and then stirred for 30 hours in a 25° C. water bath to thereby prepare the hydrolysate A.

| | |
|---|---|
| Tetraetoxysilane hydrolysate A | 110 parts by weight |
| Hollow silica particle dispersing solution | 30 parts by weight |
| KBM503 (silane coupling agent, manufactured by Shin-Etsu Chemicals) | 4 parts by weight |
| 10% propylene glycol monomethyl ether solution of straight chain dimethyl silicone-EO block copolymer (FZ-2207, Manufactured by Nippon Unicar Company Limited) | 3 parts by weight |
| Propylene glycol monomethyl ether | 400 parts by weight |
| Isopropyl alcohol | 400 parts by weight |

<Preparation of Hollow Silica Particle Dispersing Solution>

A mixture of 100 g silica sol having an average particle diameter of 5 nm and SiO$_2$ concentration of 20 mass % and 1,900 g pure water was heated to 80° C. The pH of this reaction mother liquor is 10.5, and 9,000 g of 0.98 mass % of an aqueous solution of sodium silicate which is SiO$_2$ and 9,000 g of 1.02 weight percent of an aqueous solution of sodium aluminate which is Al$_2$O$_3$ were added simultaneously. During this time, the temperature of the reaction solution was kept at 80° C. The pH of the reaction solution was increased to 12.5 immediately after the addition and subsequently there was little or no changes in pH. After addition, the reaction solution was cooled to room temperature and then washed by the ultrafiltration membrane to thereby prepare a SiO$_2$.Al$_2$O$_3$ core particles dispersing solution with 20 mass % of solid content concentration (Step (a)).

1,700 g of pure water are added to 500 g of the core particle solution and heated to 98° C., and 3,000 g of silicate solution (SiO$_2$, concentration 3.5 mass %). which was obtained by removing alkali the sodium silicate solution using anion exchanged ester while maintaining the temperature, and a first silica coating layer is formed and the core particles dispersing solution is thereby obtained. (Step (b)).

Next, 1,125 g of pure water was added to 500 g of the core particle dispersing solution which form the first silica coating layer which was washed at the ultrafiltration membrane to have a solid content concentration of 13 mass %, and then concentrated hydrochloric acid (35.5%) was added by dropping to make the pH 1.0 and the aluminum removal process was performed. Next, the dissolved aluminum salt at the ultrafiltration membrane was separated while adding 10 L of an aqueous solution of hydrochloric acid having a pH of 3 and 5 L of water. The SiO$_2$.Al$_2$O$_3$ porous particle dispersing solution from which a portion of structural components of the core. particles forming the first silica coating layer is removed, is prepared (Step (c)). A mixture of 1,500 g of the porous particle dispersing solution, 500 g of pure water, 1,750 g ethanol and 626 g of 28% ammonia water were heated to 35° C. and then 104 g of ethyl silicate (SiO$_2$ 28 mass %) were added and the surface of the porous particles on which the first silica coating layer is formed was coated with hydrolysis and condensation product of ethyl silicate and the second silica coating layer was thereby formed. Next, a hollow silica particle dispersing solution having 20 mass % solid content concentration in which the solvent was substituted with ethanol was prepared using the ultrafiltration membrane.

The thickness of the first silica coating layer of hollow silica particles is 3 nm, the average particle diameter is 47 nm, MOx/SiO$_2$ (mole ratio) is 0.0017, and the refractive index is 1.28. Here, the average particle diameter is measured by a dynamic light dispersion method.

(Reflectance)

The spectral reflectivity of the antireflection film that was prepared was measured at an angle of incidence of 5° in the 380-780 nm wavelength region, using a spectrometer (U-4000 manufactured by Hitachi). Because the antireflection function is good to the extent that the reflectance is small over a wide wavelength region, the lowest reflectance is obtained in the 450-650 nm range from the measured values. The measurement is done by subjecting the back surface of the viewing side to roughening treatment and then performing light absorption using black spray and preventing reflectance of light on the film back surface and then measuring the reflectance.

As a result, the antireflection film A1 has a reflectance of 0.4%.

(Preparation of the Polarizing Plate and Liquid Crystal Display Device)

The cellulose ester film A, the antireflection film A1, the cellulose ester films 1-31, the optical compensation films 1-5, the Konica Minolta TAC KC8UX2MW (Ro: 0 nm, Rt: 55 nm) and the Konica Minolta TAC KC8UX-RHA (both manufactured by Konica Minolta Opto, Inc.) are used to prepare the polarizing plate.

<Preparation of the Viewing Side Polarization Plate>

A polyvinyl alcohol film of 75 μm was uniaxially stretched (temperature 110° C., stretching ratio: 5 times). The film was immersed in an aqueous solution of 0.075 g iodine, 5 g potassium iodide, and 100 g water for 60 seconds, and then immersed in a 68° C. aqueous solution of 6 g potassium iodide, 7.5 g boric acid and 100 g water. The film was washed and dried to obtain the polarizing film.

The polarizing films of steps 1-5 below, the antireflection film A1, the cellulose ester films 1-31, the optical compensation films 1, the Konica Minolta TAC KC8UX2MW and the Konica Minolta TAC KC8UX-RHA are adhered according to the components in Table 2 to thereby prepare the polarizing plate.

Step 1: The polarizing film was immersed for 90 seconds in a 60° C. 2 mol/L sodium hydroxide solution and then washed and dried and the antireflection film A1, the cellulose ester films 1-31, the optical compensation films 1, the Konica Minolta TAC KC8UX2MW and the Konica Minolta TAC KC8UX-RHA in which the side to which the polarizing element is to be pasted is saponified, was obtained.

Step 2: The polarizing film was immersed in solid content 2 mass % polyvinyl alcohol adhesive tank for 1-2 seconds.

Step 3: Excess adhesive which attached to the polarizing film in Step 2 was gently wiped off and then the polarizing film was placed on the antireflection film A1, the cellulose ester films 1-31, the optical compensation films 1, the Konica Minolta TAC KC8UX2MW and the Konica Minolta TAC KC8UX-RHA that were processed in Step 1.

Step 4: The antireflection film A1, the cellulose ester films 1-31, the optical compensation film 1, the Konica Minolta TAC KC8UX2MW and the Konica Minolta TAC KC8UX-RHA which were stacked in Step 3 were pasted together at a pressure of 20-30 N/cm$^2$ and a conveyance speed of approximately 2 m/minute.

Step 5: The samples pasted with the antireflection film A1, the cellulose ester films 1-31, the optical compensation films 1, the Konica Minolta TAC KC8UX2MW and the Konica Minolta TAC KC8UX-RHA that were prepared in Step 4 were dried for 2 minutes in a dryer at 80° C. and the viewing side polarizing plates A1-A39 are thereby prepared.

<Preparation of the Backlight Side Polarizing Plate B>

The polarizing film prepared above, the optical compensation films 1-5, the cellulose ester film A, and the Konica Minolta TAC KC8UX2MW were used to prepare the backlight side polarizing plates B1-B39 according to Steps 1-5 with the composition of Table 2. It is to be noted that the optical compensation film is pasted to the polarizing film such that the polymer layer is at the outside.

<<Preparation of the Liquid Crystal Display Device>>

The liquid crystal display panel was prepared as follows and properties as a liquid crystal display device were evaluated. Only the polarizing plates pasted on both surfaces of the liquid cell of a commercially available vertical alignment type liquid crystal display device (VA type) AQ-32AD5 (manufactured by Sharp) were carefully peeled off, and then the surfaces of the prepared polarizing plate (A) and the polarizing plate (B) respectively were pasted together such that the polarizing axis of the polarizing plates that are pasted together are the same and the liquid crystal display devices 1-39 of this invention and for comparison are thereby prepared.

TABLE 2

| Cellulosic ester film number | Plasticizer 1 | Amount to be added (parts by mass) | Plasticizer 2 | Amount to be added (parts by mass) | Cellulosic ester | Amount to be added (parts by mass) | Film thickness (μm) | Rt (nm) | Ro (nm) |
|---|---|---|---|---|---|---|---|---|---|
| 1 | AC5 | 5 | ATBC | 5 | TAC | 100 | 40 | 20 | 5 |
| 2 | AC7 | 15 | ATBC | 10 | TAC | 100 | 40 | −5 | 1 |
| 3 | AC5 | 10 | AC8 | 5 | TAC | 100 | 40 | −3 | 0 |
| 4 | AC5 | 10 | E1 | 3 | TAC | 100 | 40 | 10 | 3 |
| 5 | AC5 | 10 | AC8 | 5 | CAP | 100 | 40 | 2 | 1 |
| 6 | TPDO | 5 | TPT | 5 | TAC | 100 | 40 | 5 | 2 |
| 7 | TPDO | 5 | ATBC | 10 | TAC | 100 | 70 | −3 | 2 |
| 8 | TPDO | 10 | AC5 | 5 | TAC | 100 | 80 | −5 | 3 |
| 9 | TPDO | 10 | AC8 | 10 | TAC | 100 | 60 | −15 | 5 |
| 10 | TPDO | 5 | TPT | 5 | CAP | 100 | 40 | 5 | 3 |
| 11 | AC1 | 10 | AC8 | 5 | TAC | 100 | 40 | 0 | 1 |
| 12 | AC2 | 5 | AC7 | 5 | TAC | 100 | 40 | 3 | 2 |
| 13 | AC5 | 10 | AC8 | 5 | TAC | 100 | 80 | −10 | 3 |
| 14 | AC4 | 15 | ATBC | 5 | TAC | 100 | 25 | −2 | 5 |
| 15 | AC6 | 10 | ATBC | 15 | TAC | 100 | 80 | −30 | 10 |

TABLE 2-continued

| | | Polarizing Plate A | | | | Polarizing Plate B | | |
|---|---|---|---|---|---|---|---|---|
| *1 | No. | Polarizing Plate Protective Film A1 | Polarizing Plate Protective Film A2 | Liquid Crystal Cell | No. | Polarizing Plate Protective Film B2 | Polarizing Plate Protective Film B1 | Remarks |
| 22 | A22 | *2 | ** 22 | VA Type | B22 | *3 | ** A | Inv. |
| 23 | A23 | *2 | ** 23 | VA Type | B23 | *3 | ** A | Inv. |
| 24 | A24 | *2 | ** 24 | VA Type | B24 | *3 | ** A | Inv. |
| 25 | A25 | *2 | ** 25 | VA Type | B25 | *3 | ** A | Inv. |
| 26 | A26 | *2 | ** 26 | VA Type | B26 | *3 | ** A | Inv. |
| 27 | A27 | *2 | ** 27 | VA Type | B27 | *3 | ** A | Inv. |
| 28 | A28 | *2 | ** 28 | VA Type | B28 | *3 | ** A | Inv. |
| 29 | A29 | *2 | ** 29 | VA Type | B29 | *3 | ** A | Inv. |
| 30 | A30 | *2 | ** 30 | VA Type | B30 | *3 | ** A | Inv. |
| 31 | A31 | *2 | ** 31 | VA Type | B31 | *3 | ** A | Inv. |
| 32 | A32 | *2 | ** A | VA Type | B32 | *3 | ** A | Comp. |
| 33 | A33 | Konica Minolta TAC KC8UX-RHA | *3 | VA Type | B33 | ** 4 | Konica Minolta TAC KC8UX2MW | Inv. |
| 34 | A34 | Konica Minolta TAC KC8UX-RHA | ** 4 | VA Type | B34 | *3 | Konica Minolta TAC KC8UX2MW | Inv. |
| 35 | A35 | Konica Minolta TAC KC8UX-RHA | ** 4 | VA Type | B35 | Optical Compensation Film 2 | Konica Minolta TAC KC8UX2MW | Inv. |
| 36 | A36 | Konica Minolta TAC KC8UX-RHA | ** A | VA Type | B36 | Optical Compensation Film 3 | Konica Minolta TAC KC8UX2MW | Inv. |
| 37 | A37 | Konica Minolta TAC KC8UX-RHA | Konica Minolta TAC KC8UX2MW | VA Type | B37 | *3 | Konica Minolta TAC KC8UX2MW | Comp. |
| 38 | A38 | Konica Minolta TAC KC8UX-RHA | ** A | | B38 | Optical Compensation Film 4 | Konica Minolta TAC KC8UX2MW | Inv. |
| 39 | A39 | Konica Minolta TAC KC8UX-RHA | ** A | | B39 | Optical Compensation Film 5 | Konica Minolta TAC KC8UX2MW | Inv. |

TPP: triphenyl phosphate,
BDP: bisphenyl diphenyl phosphate
TPT: trimethylol propane triacetate
TPDO: trimethylol propane diacetate octanoate
ATBC: acetyl tributyl citrate
TMPB: trimethylol propane tribenzoate
EPEG: ethyl phthalyl ethyl glycolate
*1: Liquid Crystal Display Device,
*2: Antireflection Film A1,
**: Cellulose Ester Film,
*3: Optical Compensation Film 1
Inv.: Invention,
Comp.: Comparative example <<Evaluation>>

<Evaluation of Viewing Angle Characteristics>

In order to evaluate viewing angle, the amount of transmitted light was determined on a black display as well as on white display using an EZ-Contrast, manufactured by ELDIM Ltd. Viewing angle characteristics were evaluated while calculating contrast=(the amount of transmitted light on a white display: cd/cm$^2$)/the amount of transmitted light on a black display: cd/cm$^2$).

The results show that the contrast was 20 or more for all the regions with 160° viewing angle.

Evaluation of Black Contrast Unevenness (Including Corner Unevenness)

The device obtained by peeling the polarizing plate that was adhered to the Sharp liquid crystal television AQ-32AD5 and then pasting a polarizing plate of this invention was subjected to adhering and autoclave processing for 100 hours at 50° C. and 95% RH, and then conditioned for 24 hours at room temperature (23° C., 55% RH), and then the backlight was shone with the maximum brightness setting and after two hours the light leakage and contrast of the black display were observed and the unevenness evaluated. Unevenness was measured for the entire surface from the distance within the field of view using the Konica-Minolta Sensing Model CA-1500.

A: No light leakage was observed

B: There was small amount of unevenness over entire surface in the black display, but this was very weak and not problematic for practical use.

C: There was small amount of unevenness over entire surface in the black display, and weak light leakage at the corners D: There was light leakage over entire surface in the black display and strong light leakage at the corners and this is problematic for practical use.

<Color Evaluation>

Conditioning was performed for 24 hours at 23° C. and 55% RH, and then the backlight was shone with the maximum brightness setting and after two hours EZ-Contrast 160D manufactured by ELDIM Co., Ltd. was used to calculate ΔE* for the incline angles of 60° and 70° with the front direction as reference, and evaluation was done at the maximum value. More specifically, the L*U*V* (CIE 1976) when observation was done from the normal direction was determined. This was called $L_1^*$, $U_1^*$, $V_1^*$. In addition, the L*U*V* when observation was done at a prescribed angle is determined and this was called $L_2^*$, $U_2^*$, $V_2^*$. Using this in the formula below, the value of ΔE* for the incline angles of 60° and 70° with the front direction as reference was calculated at all points, and evaluation was done at the maximum value. $\Delta E^* = \sqrt{((L_2^*-L_1^*)^2 + (U_2^*-U_1^*)^2 + (V_2^*-V_1^*)^2)}$ In addition, the color changes in the black display were visually observed at the incline angles of 60° and 70° and general evaluation was done based on the results. Furthermore, similar measurements were done after endurance processing under the above conditions.

A: ΔE* is less than 6 and favorable
B: ΔE* is 6-10
D: ΔE* exceeds 10 and color variation is large and
A: No changes noticed by visual evaluation in black initially and after endurance
B: No changes in visual evaluation of black initially, and slight changes after endurance but there are no problems for practical use
C: No changes in visual evaluation of black initially, and somewhat outstanding changes after endurance
D: Large changes in black initially The above evaluation results are shown in Table 3

TABLE 3

| Liquid Crystal Display No. | Black Contrast Unevenness | ΔE* at all points | Color Change of Black display | Remarks |
|---|---|---|---|---|
| 1 | A | B | B | Inv. |
| 2 | B | C | C | Inv. |
| 3 | A | A | A | Inv. |
| 4 | A | A | A | Inv. |
| 5 | A | A | A | Inv. |
| 6 | A | A | A | Inv. |
| 7 | A | A | A | Inv. |
| 8 | A | A | A | Inv. |
| 9 | A | B | B | Inv. |
| 10 | A | B | B | Inv. |
| 11 | A | A | A | Inv. |
| 12 | A | A | A | Inv. |
| 13 | A | A | A | Inv. |
| 14 | A | B | B | Inv. |
| 15 | B | C | C | Inv. |
| 16 | A | A | A | Inv. |
| 17 | A | A | A | Inv. |
| 18 | A | C | C | Inv. |
| 19 | A | A | A | Inv. |
| 20 | A | B | B | Inv. |
| 21 | A | B | B | Inv. |
| 22 | A | B | B | Inv. |
| 23 | A | A | A | Inv. |
| 24 | A | A | A | Inv. |
| 25 | A | A | A | Inv. |
| 26 | A | A | A | Inv. |
| 27 | A | A | A | Inv. |
| 28 | A | A | A | Inv. |
| 29 | A | A | A | Inv. |
| 30 | A | A | A | Inv. |
| 31 | A | A | A | Inv. |
| 32 | D | D | D | Comp. |
| 33 | A | A | A | Inv. |
| 34 | A | A | A | Inv. |
| 35 | A | A | A | Inv. |
| 36 | A | A | A | Inv. |
| 37 | D | D | D | Comp. |
| 38 | A | A | A | Inv. |
| 39 | A | A | A | Inv. |

Inv.: Invention,
Comp.: Comparative example

It can be seen from the table above that the liquid crystal display devices 1-31 and 33-36, 38-39 which have the structure of this invention have excellent black contrast unevenness and color compared to the liquid crystal display devices of the comparative examples 32 and 37.

What is claimed is:

1. A liquid crystal display device, comprising:
   a liquid crystal cell operable in a vertical alignment mode;
   a polarizing plate A including a protective film A1, a protective film A2 and a polarizer sandwiched between the protective films A1 and A2;
   a polarizing plate B including a protective film B1, a protective film B2 and a polarizer sandwiched between the protective films B1 and B2;
   wherein the polarizing plates A and B are provided to sandwich the liquid crystal cell therebetween in such a way that the protective films A2 and B2 are positioned respectively at a liquid crystal cell side to face the liquid crystal cell,
   wherein at least one of the protective films A2 and B2 is a cellulose ester film Y that satisfies both conditions that a film in-plane retardation value Ro is 0 to 10 nm and a film thickness direction retardation value Rt is −20 to 20 nm, the retardation values Ro and Rt are defined by Formulas (a) and (b), and at least one of the protective films A2 and B2 is an optical compensation film W having an optical anisotropic layer, $$Ro = (nx - ny) \times d \quad \text{Formula (a)}$$

$$Rt = ((nx + ny)/2 - nz) \times d \quad \text{Formula (b)}$$

in the formulas, nx is a refractive index in a slow phase axis direction in the film plane, ny is a refractive index in a fast phase axis direction in the film plane, nz is a refractive index in a film thickness direction and d is the film thickness (nm), and the refractive indexes are measured with light having a wavelength of 590 nm.

2. The liquid crystal display device of claim 1, wherein the protective film A2 is arranged at an observation side from which the liquid crystal cell is observed and the protective film B2 is arranged at a back light side to face a back light, and wherein the cellulose ester film Y is arranged at the observation side as the protective film A2 and the optical compensation film W is arranged at the back light side as the protective film B2.

3. The liquid crystal display device of claim 1, wherein at least one of the protective films A2 and B2 is the optical compensation film W in which the optical anisotropic layer is formed on the cellulose ester film Y.

4. The liquid crystal display device of claim 1, wherein the cellulose ester film Y includes a polymer obtained by polymerization of an ethylenic unsaturated monomer and having a weight average molecular weight of from 500 to 30000.

5. The liquid crystal display device of claim 4, wherein the cellulose ester film Y contains an acryl type polymer having a weight average molecular weight of from 500 to 30000.

6. The liquid crystal device of claim 5, wherein the acryl type polymer contains an acrylate methyl ester monomer unit in the range of 30 mass % or more.

7. The liquid crystal device of claim 5, wherein the acryl type polymer contains an acrylate ester monomer or a metacrylate ester monomer each having a hydroxyl group in the range of 2 to 20 mass %.

8. The liquid crystal device of claim 5, wherein the acryl type polymer includes a polymer X having a weight average molecular weight of from 2,000 to 30,000 and a polymer Y having a weight average molecular weight of from 500 to 3,000.

9. The liquid crystal device of claim 1, wherein the optical anisotropic layer includes a layer formed by a liquid crystal compound or a layer formed by stretching a polymer made from at least one of a polyether ketone, a polyamide, a polyester, a polyimide, a polyamide imide, and a polyester imide.

* * * * *